(12) United States Patent
Muramatsu

(10) Patent No.: US 8,335,014 B2
(45) Date of Patent: Dec. 18, 2012

(54) IMAGE FORMING APPARATUS, CONTROL METHOD, AND PROGRAM FOR COPY-FORGERY-INHIBITED DOT PATTERN CALIBRATION

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 844 days.

(21) Appl. No.: 12/464,166

(22) Filed: May 12, 2009

(65) Prior Publication Data

US 2009/0284775 A1    Nov. 19, 2009

(30) Foreign Application Priority Data

May 14, 2008    (JP) .................. 2008-127377

(51) Int. Cl.
*G06K 1/00*    (2006.01)
*G06K 9/00*    (2006.01)

(52) U.S. Cl. ........ 358/1.9; 358/2.1; 358/3.09; 358/3.23; 358/3.26; 358/3.28; 358/1.13; 358/1.14; 358/1.15; 358/1.18; 358/524; 358/406; 358/411; 358/448; 358/450; 382/100; 382/135; 382/137; 382/160; 382/162; 382/165; 382/171; 382/172; 382/173; 382/174; 382/175; 382/195; 382/232; 382/248; 382/250; 382/274; 382/284; 380/22; 380/43; 380/51; 380/54; 380/201; 380/203; 380/205; 380/223; 380/226; 380/278; 713/155; 713/161; 713/168; 713/176

(58) Field of Classification Search ........................ None
See application file for complete search history.

(56) References Cited

U.S. PATENT DOCUMENTS

| | | | | |
|---|---|---|---|---|
| 7,085,399 | B2 * | 8/2006 | Suzaki ........................ | 382/100 |
| 7,509,060 | B2 * | 3/2009 | Yaguchi et al. ................. | 399/15 |
| 2006/0067759 | A1 * | 3/2006 | Osaka ........................... | 399/366 |
| 2007/0003294 | A1 * | 1/2007 | Yaguchi et al. ................. | 399/15 |
| 2008/0232363 | A1 * | 9/2008 | Wang et al. ................... | 370/389 |

FOREIGN PATENT DOCUMENTS

JP    2007-043656    2/2007

* cited by examiner

*Primary Examiner* — Steven Kau
(74) *Attorney, Agent, or Firm* — Fitzpatrick, Cella, Harper & Scinto

(57) ABSTRACT

A test pattern containing plurality of patches recorded using small dot patterns and large dot patterns is printed. The dot sizes arranged in the patches are different between patches. Then the test patterns are read. The detection rate and average density of additional information embedded in each large dot pattern are obtained. A large dot pattern whose detection rate and average density fall within a reference range and are closest to ideal values is determined. The average density of each small dot pattern is obtained. A small dot pattern whose average density falls within a reference range and is closest to the average density of the determined large dot pattern is determined. A copy-forgery-inhibited pattern image is generated using these dot patterns and combined with a print target image.

7 Claims, 41 Drawing Sheets

FIG. 3

| AREA | PURPOSE | ANALYSIS SPEED | DATA SIZE |
|---|---|---|---|
| FIRST AREA | REAL-TIME DETECTION INFORMATION SUCH AS COPY PROHIBITION INFORMATION | ALMOST THE SAME AS SCAN SPEED | SMALL SIZE |
| SECOND AREA | NON-REAL-TIME DETECTION INFORMATION SUCH AS TRACKING INFORMATION | RELATIVELY LOW SPEED | LARGE SIZE |

FIG. 4
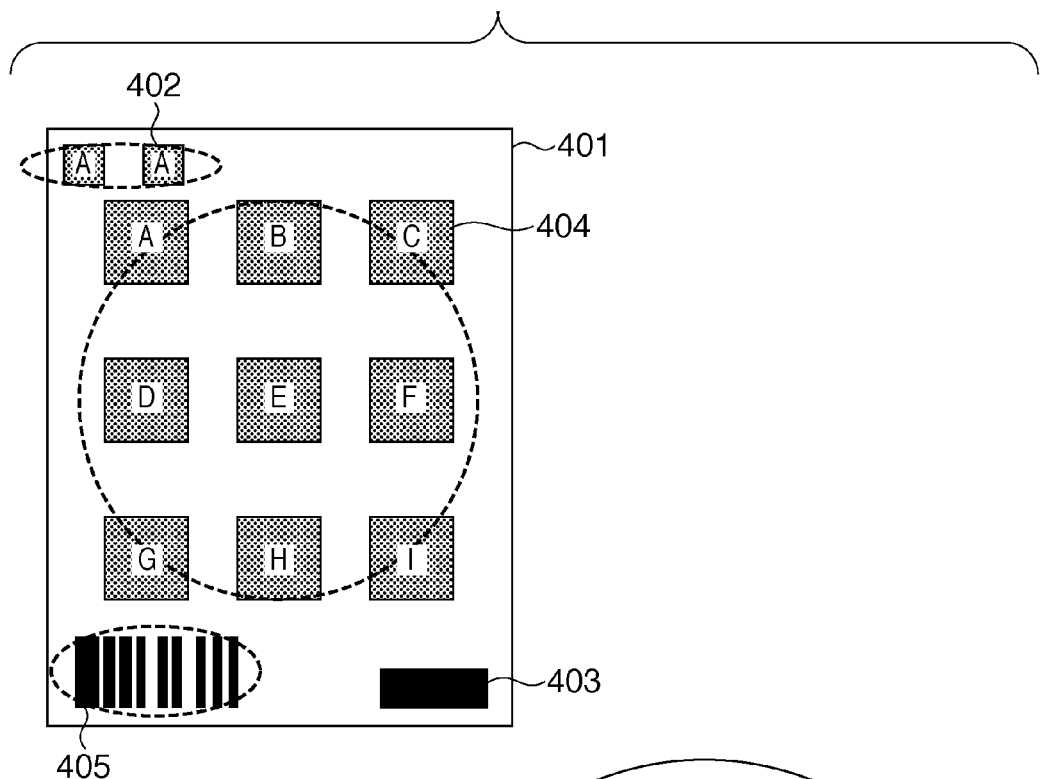
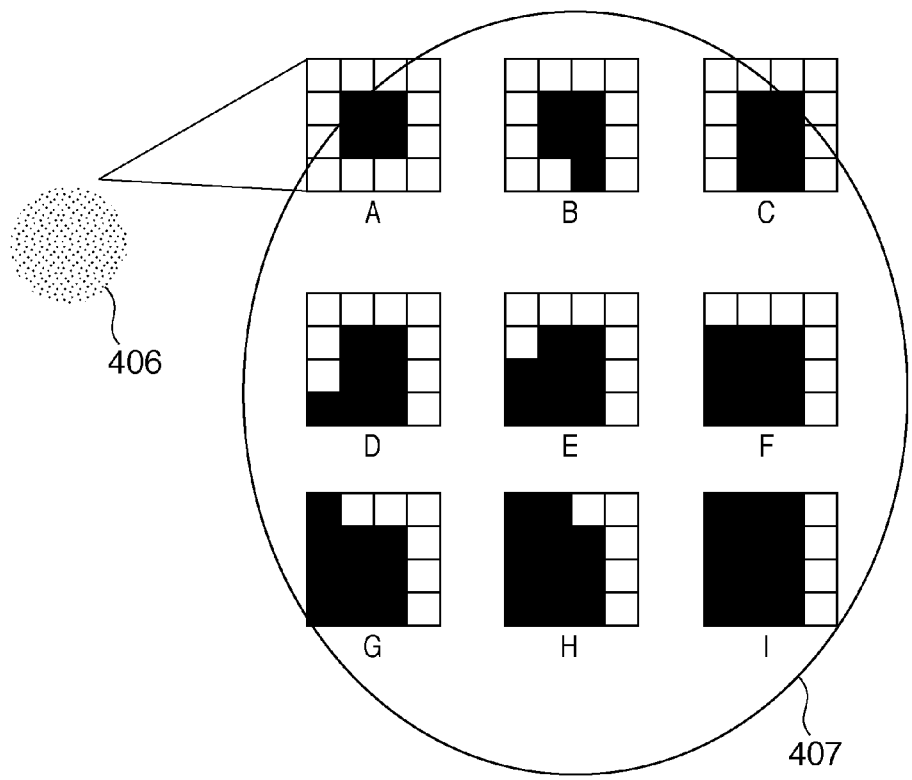

FIG. 8
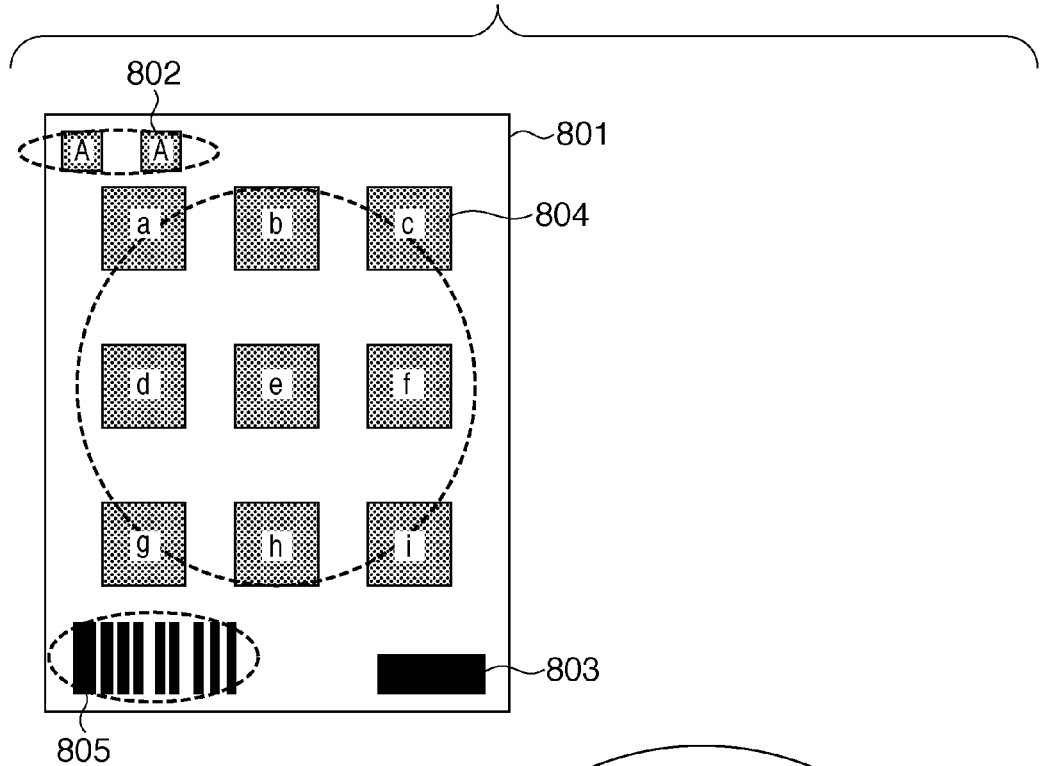
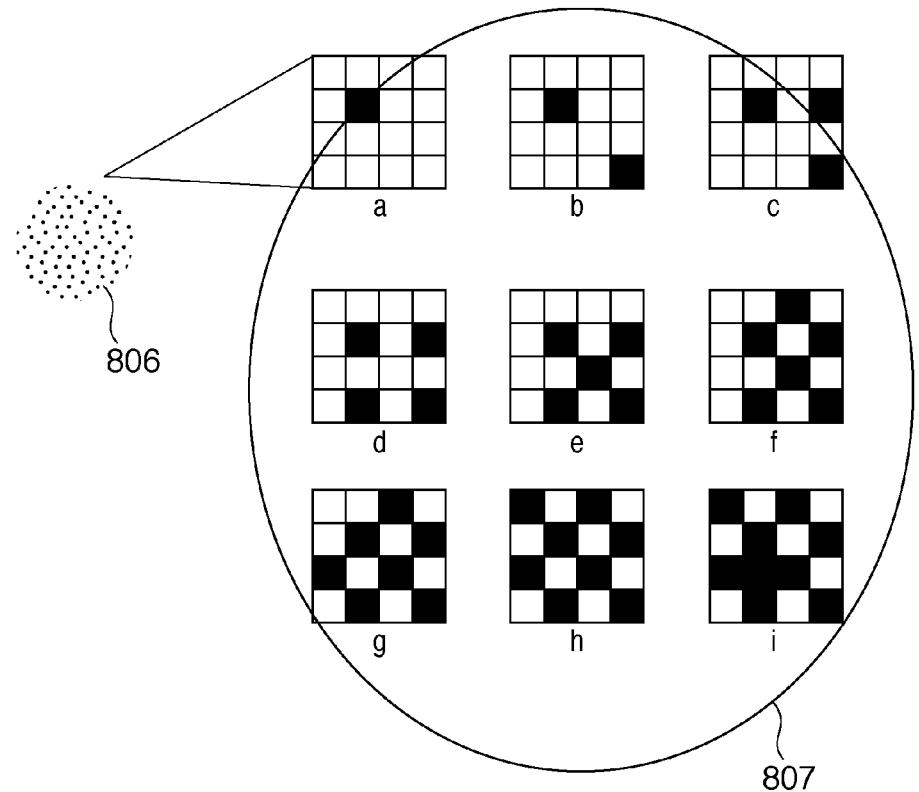

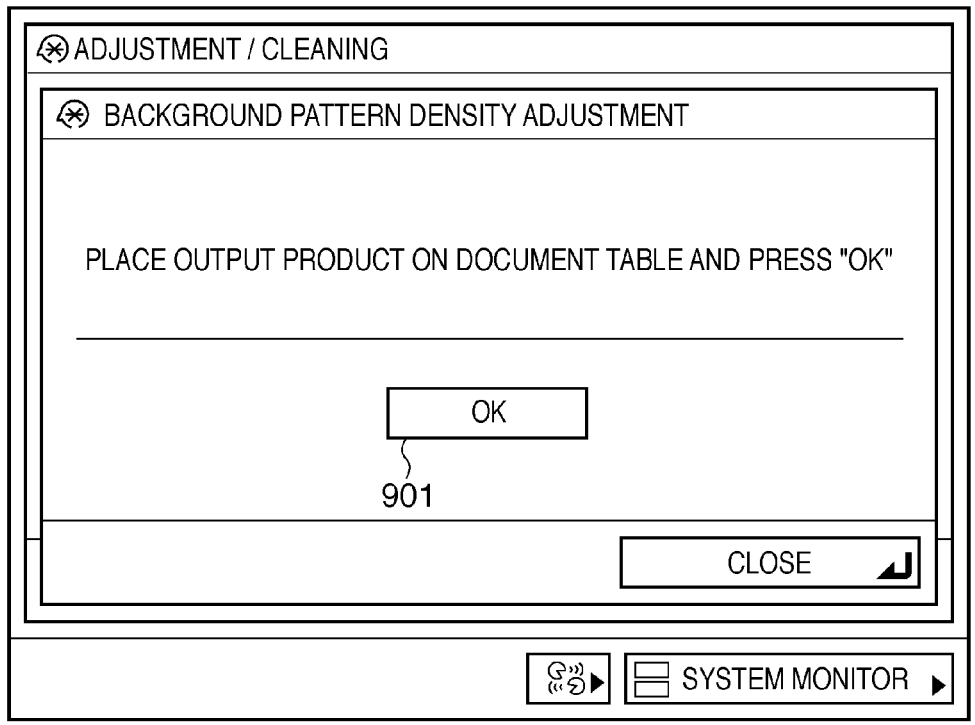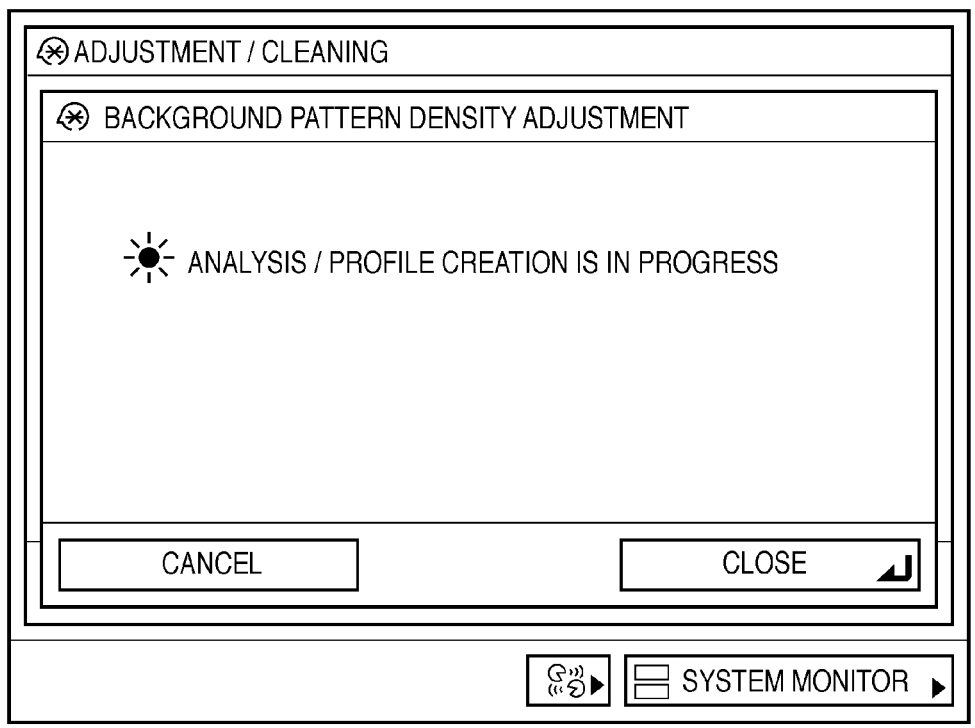

F I G. 14

| PATCH NO. | AVERAGE DENSITY | RECOGNITION RATE | DETERMINATION RESULT |
|---|---|---|---|
| A | 0.12 | 70% | NG |
| B | 0.13 | 95% | OK |
| C | 0.14 | 95% | OK |
| D | 0.15 | 85% | OK |
| E | 0.16 | 85% | OK |
| F | 0.17 | 80% | NG |
| G | 0.17 | 90% | OK |
| H | 0.18 | 95% | NG |
| I | 0.19 | 98% | NG |

| PATCH NO. | AVERAGE DENSITY | DETERMINATION RESULT |
|---|---|---|
| A | 0.108 | NG |
| B | 0.115 | NG |
| C | 0.120 | NG |
| D | 0.125 | NG |
| E | 0.135 | OK |
| F | 0.145 | OK |
| G | 0.165 | OK |
| H | 0.170 | OK |
| I | 0.190 | NG |

010, 111, 110, 011 = 2, 7, 6, 3

FIG. 38
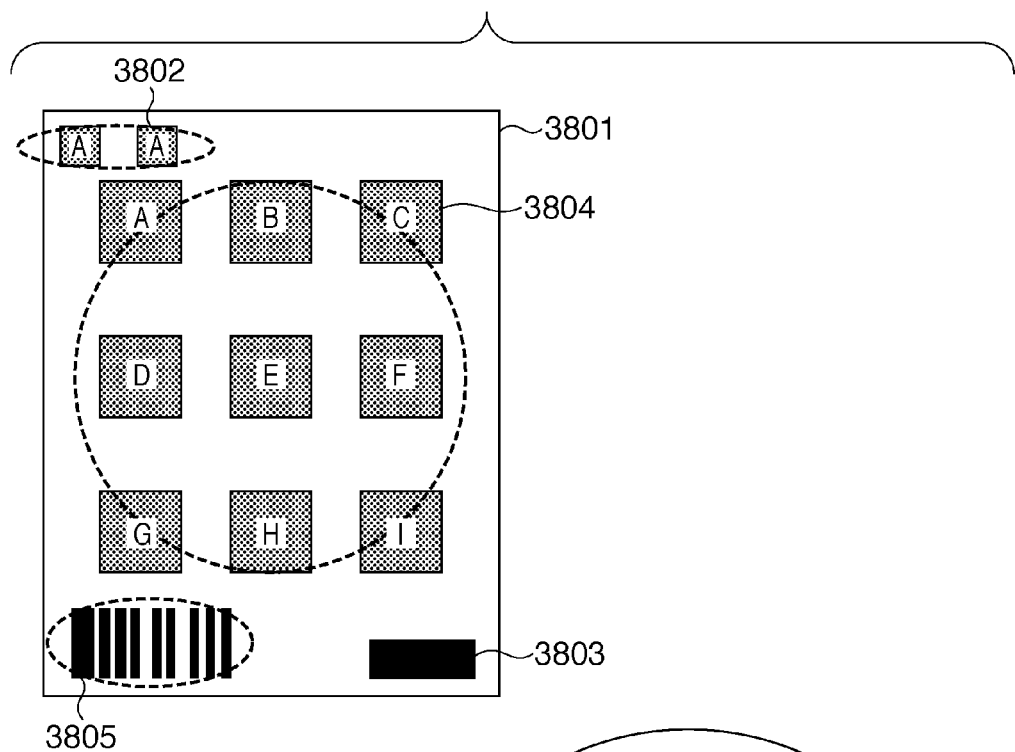
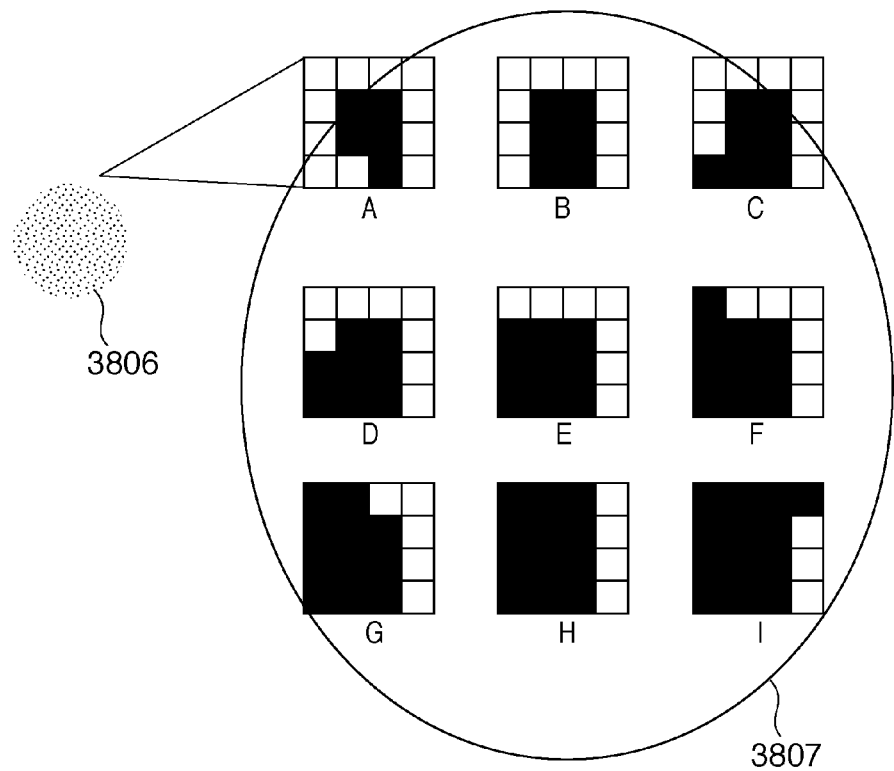

2, 7, 6, 3= 010, 111, 110, 011

IMAGE FORMING APPARATUS, CONTROL METHOD, AND PROGRAM FOR COPY-FORGERY-INHIBITED DOT PATTERN CALIBRATION

BACKGROUND OF THE INVENTION

1. Field of the Invention

The present invention relates to an image forming apparatus, a dot pattern calibration method, and a program and, for example, to an image forming apparatus having a duplicate deterrence function, a dot pattern calibration method, and a program.

2. Description of the Related Art

It is possible to guard digitized confidential information by deciding a supervisory policy for access to it and carrying out the policy. However, once the confidential information is printed on paper, restricting duplication or removal of the printed confidential information is more difficult than restricting access to the digitized confidential information. This makes security protection more difficult.

To retain the security of printed confidential information, image processing methods are becoming popular which embed restriction information to, for example, permit or prohibit copying under a specific condition, in print target image information. Restriction information is embedded in image information by encoding processing that allows decoding of the restriction information by some type of decoding processing. This processing is also used to prevent image alteration. Hence, the restriction information to be embedded is called code information or encoded information. Examples of code information are a digital watermark and an LVBC to be described later in the embodiments. These are two-dimensional code information two-dimensionally embedded in image information. The LVBC will be described later in a section <LVBC Embedding Method>.

No user can directly recognize the contents of printed code information. A user can recognize the code information only when a reading apparatus reads image data from the printed image, and the code information is decoded by decoding processing corresponding to encoding processing of the information. In general, the read image data is sent to a computer and decoded using an application program that operates in the computer. Instead, a cellular phone that supports two-dimensional codes can also read code information and decode it in the device. Alternatively, a copying machine having a plurality of functions can internally decode code information.

Once the image containing encoded code information is printed, the code information is hardly lost even if the image is repeatedly duplicated. The code information can be decoded even from the duplicated image. This enables control to, for example, prohibit a copying machine from copying an image based on decoded code information. Additionally, when, for example, information to identify a user who has printed or duplicated an image is used as code information in addition to restriction information, the user who has brought out the printed product can be identified. In this way, code information embedded in an image serves as a deterrent against duplication and alteration of printed products or bring-out of printed products by unauthorized persons.

It is understood that delicate dot thickening or thinning in a print device that prints an image including embedded code information greatly affects the code information recognition accuracy, that is, the reproducibility of decoded code information. To improve the code information reproducibility, it is necessary to use an appropriate dot size when printing an image of code information.

On the other hand, there is a technique of combining an image called a copy-forgery-inhibited pattern with a print target image in order to prohibit or deter copy in an environment where a device incapable of decoding code information from an image including the embedded code information is used. The copy-forgery-inhibited pattern is sometimes called a copy restraint pattern. A copy-forgery-inhibited pattern image is recognized by a human eye as a mere pattern or background image in an original (a printed product output by a printer based on image data) but appears as a character or image in an image obtained by copying the original by a copying machine. The original can provide the same restraint effect as anti-forgery paper. A copy-forgery-inhibited pattern image includes a portion, that is, a latent image that appears as an image upon duplication and another portion, that is, a background corresponding to the background of the latent image. The latent image and the background have almost the same average density and are hard to visually identify. The background is formed from small dots that are unreadable or are removed as noise in a duplicate. The latent image is formed from dots having a size to enable clear duplication by a copying machine. It is necessary to appropriately decide the density of the copy-forgery-inhibited pattern image, and a technique for it has also been proposed (e.g., Japanese Patent Laid-Open No. 2007-043656).

A technique has recently received a great deal of attention, which protects security in both a device which can decode code information and a device which cannot by using code information as a copy-forgery-inhibited pattern image. In this technique, a dot pattern containing code information is embedded in an image as a copy-forgery-inhibited pattern. When printing is performed using this technique, it is possible to make the dot pattern appear as a copy-forgery-inhibited pattern upon copying the original, and also recognize the dot pattern and decode the code information from it. Hence, a device capable of decoding code information executes control based on the code information decoding result. On the other hand, a device incapable of decoding code information can make a predetermined character or image appear on a duplicate.

In Japanese Patent Laid-Open No. 2007-043656, a base portion is called a background portion. In this specification, a copy-forgery-inhibited pattern image including code information is called a background image, as will be described later. Hence, the background portion of a copy-forgery-inhibited pattern is called a base or a base portion.

In the above-described code information embedding with a copy-forgery-inhibited pattern function, it is essential to simultaneously obtain an effect of a copy-forgery-inhibited pattern image and a high recognition rate of a dot pattern formed as code information. More specifically, a copy-forgery-inhibited pattern is required to include large dots and small dots, in which the small dots disappear in a duplicate, and the latent image area and the background area have almost the same average density in the original. That is, the average density range is limited to a range (also referred to as a density range) that satisfies those conditions. On the other hand, code information is required to include dots that achieve a high dot pattern recognition rate and a low visibility.

For these reasons, when priority is given to the code information recognition rate, the dot size needs to be large, and the average density of the dot pattern does not always fall within the density range required for the copy-forgery-inhibited pattern. When priority is given to the density range of the copyforgery-inhibited pattern, the dot size of the dot pattern containing the embedded code information needs to be small, resulting in a low code information recognition rate.

SUMMARY OF THE INVENTION

The present invention has been made in consideration of the above-described problems, and provides an image forming apparatus which can decide a dot pattern capable of simultaneously obtaining an effect of a copy-forgery-inhibited pattern image and a high code information recognition rate and combine it with an image, a dot pattern calibration method, and a program.

An image forming apparatus according to the present invention has the following arrangement.

According to an aspect of the present invention, there is provided an image forming apparatus for generating a copy-forgery-inhibited pattern which includes a latent image area drawn using a large dot pattern and a background area drawn using a small dot pattern, the latent image being encoded and embedded in the copy-forgery-inhibited pattern image as an additional information, comprising: a large dot pattern decision unit, configured to read a test pattern image printed using a plurality of large dot patterns, recognizes encoded additional information embedded in each test pattern by decoding the additional information, obtains a recognition rate of the additional information and an average density of each test pattern, and decides, as a large dot pattern for recording, a large dot pattern used for a test pattern whose recognition rate and average density fall within a predetermined range and are close to predetermined reference values; a small dot pattern decision unit, configured to read a test pattern image printed using a plurality of small dot patterns, obtains an average density of each test pattern, and decides, as a small dot pattern for recording, a small dot pattern used for a test pattern whose average density falls within a predetermined range and is close to the average density of the large dot pattern for recording; and a print image generator, configured to generate a copy-forgery-inhibited pattern image by drawing a foreground using the large dot pattern for recording which is decided by the large dot pattern decision unit and contains predetermined encoded additional information and drawing a background using the small dot pattern for recording which is decided by the small dot pattern decision unit, and combines the copy-forgery-inhibited pattern image with a print target image.

According to the present invention, it is possible to decide a dot pattern capable of simultaneously obtaining an effect of a copy-forgery-inhibited pattern image and a high code information recognition rate and combine it with an image. This enables deterring duplication, editing, and alteration of an image.

Further features of the present invention will become apparent from the following description of exemplary embodiments with reference to the attached drawings.

BRIEF DESCRIPTION OF THE DRAWINGS

FIG. 3 is a table for explaining the difference in characteristics between a first area and a second area;

FIG. 4 is a view showing an example of an LVBC dot pattern test print according to the first embodiment;

FIG. 8 is a view showing an example of a small dot pattern test print according to the first embodiment;

FIG. 9 is a view showing a GUI displayed upon pressing a start key;

FIG. 10 is a view showing a GUI displayed upon pressing an OK key 901 shown in FIG. 9;

FIG. 14 is a view showing an example of patch numbers and determination results obtained from the LVBC dot pattern test print in FIG. 4;

FIG. 38 is a view showing an example of an LVBC dot pattern test print regenerated in step S3208 of FIG. 32;

DESCRIPTION OF THE EMBODIMENTS

First Embodiment

An embodiment to practice the present invention will now be described with reference to the accompanying drawings.
<Overall Arrangement of System>

Figure 44:
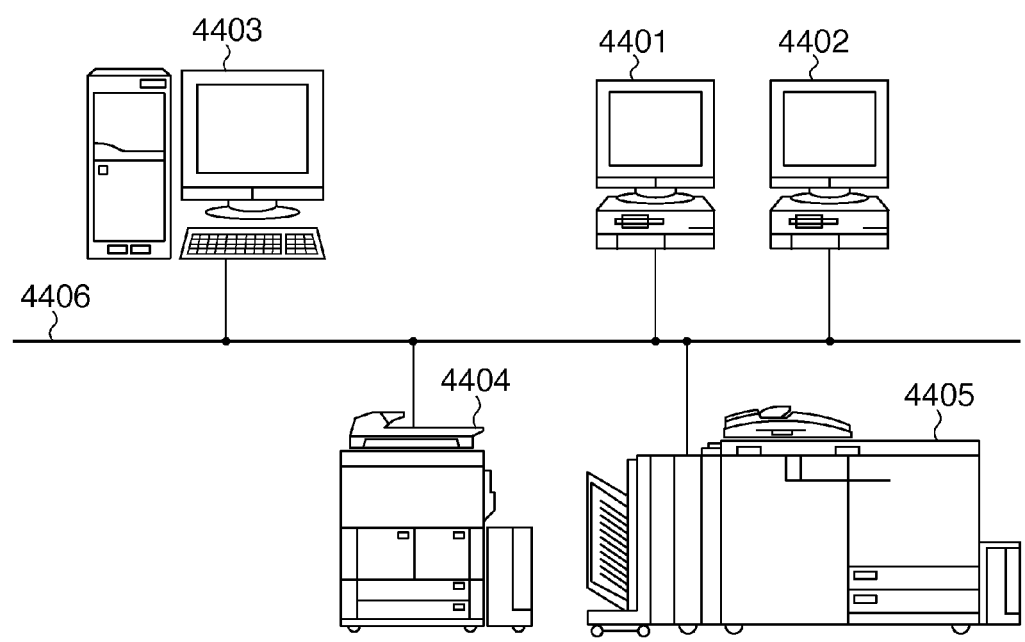
FIG. 44 is a view showing the overall arrangement of a system according to an embodiment of the present invention.

FIG. 44 is a view for explaining the overall arrangement of a system according to an embodiment of the present invention. Referring to FIG. 44, when a user operates a client PC 4401 or 4402, the client PC 4401 or 4402 generates print data and sends it to a print server 4403 connected via a LAN 4406. The print server 4403 retransfers the received print data to an image forming apparatus 4404 or 4405 connected via the LAN 4406. The image forming apparatus 4404 or 4405 interprets and converts the received print data into an image, and prints it on a paper sheet, thereby generating a printed product.

The above-described arrangement is merely an example. The print server 4403 is not necessarily included. In this case, the client PC 4401 or 4402 directly sends print data to the image forming apparatus 4404 or 4405.

<Instruction to Embed Information to Prohibit Copy or Track Print Output and Copy Prohibition Operation>

The overall operation of the system will briefly be described. Assume that a user gives the instruction to embed, in a print output, information to prohibit copy or track the print output when operating the client PC 4401 or 4402 in the arrangement shown in FIG. 44. The image forming apparatus 4404 or 4405 embeds, in a print output to be generated, information to prohibit copy or track the print output and generates the print output.

Figure 2:
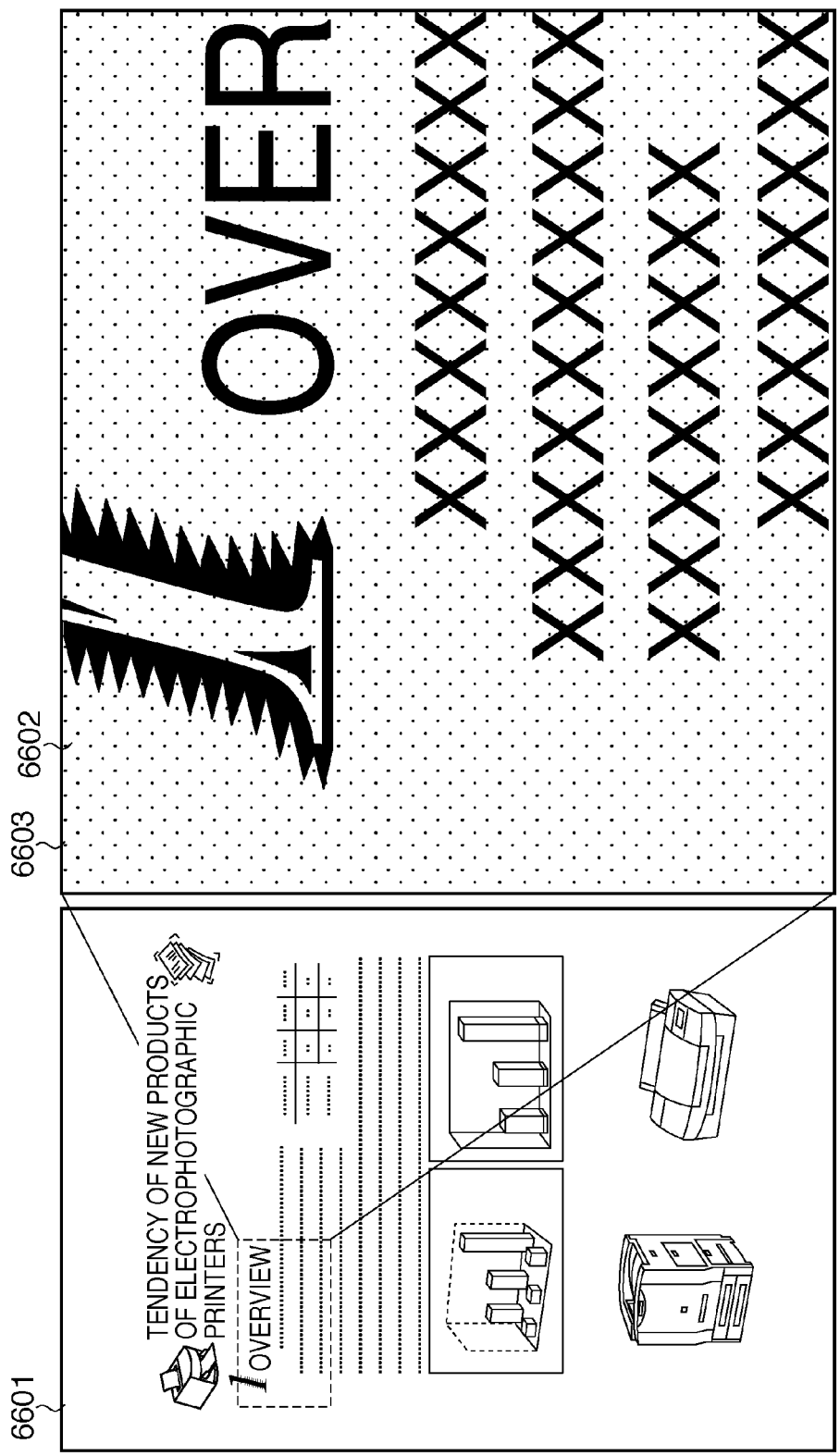
FIG. 2 is a view showing an example of a document with an LVBC embedded.

FIG. 2 shows an example of a print output including a background image. FIG. 2 is a view showing an example of a document with an LVBC (Low Visibility Bar Code) embedded. An image (to be referred to as a target image) combined with a background image is printed on a sheet 6601. Reference numeral 6602 denotes an enlarged image of the image printed on the sheet 6601. In addition to the image (target image) to be drawn on the document, the enlarged image 6602 includes a number of, for example, dots 6603 that are apparently embedded at random. An LVBC serving as additional information is embedded in the dot image. The LVBC is a barcode having a low visibility and embedded throughout an image. The LVBC has an information amount smaller than that of the target image and therefore hardly degrades image quality. The LVBC is also resistant (robust) to factors that hinder code information extraction, such as rotation, enlargement, reduction, and partial deletion of a document, signal weakening, and contamination upon copy. Extraction processing (decoding processing) can be done in a short time. For these reasons, the LVBC is employed as code information in this embodiment. Any code other than the LVBC is also usable if it has the above-described properties.

When a user is going to copy the document including the copy prohibition information shown in FIG. 2 using the image forming apparatus 4404 or 4405, the image forming apparatus 4404 or 4405 detects that the document includes the copy prohibition information and stops the copy operation. This prevents copy of important documents.

Even if the image forming apparatus 4404 or 4405 is an apparatus incapable of detecting that a document includes copy prohibition information, it is possible to deter and restrain copy of an output image because the dot image serves as a copy-forgery-inhibited pattern.

The operation of the entire system has been described above briefly. How to perform the series of operations will be described below in more detail.

<Arrangement of Client PC>

Figure 46:
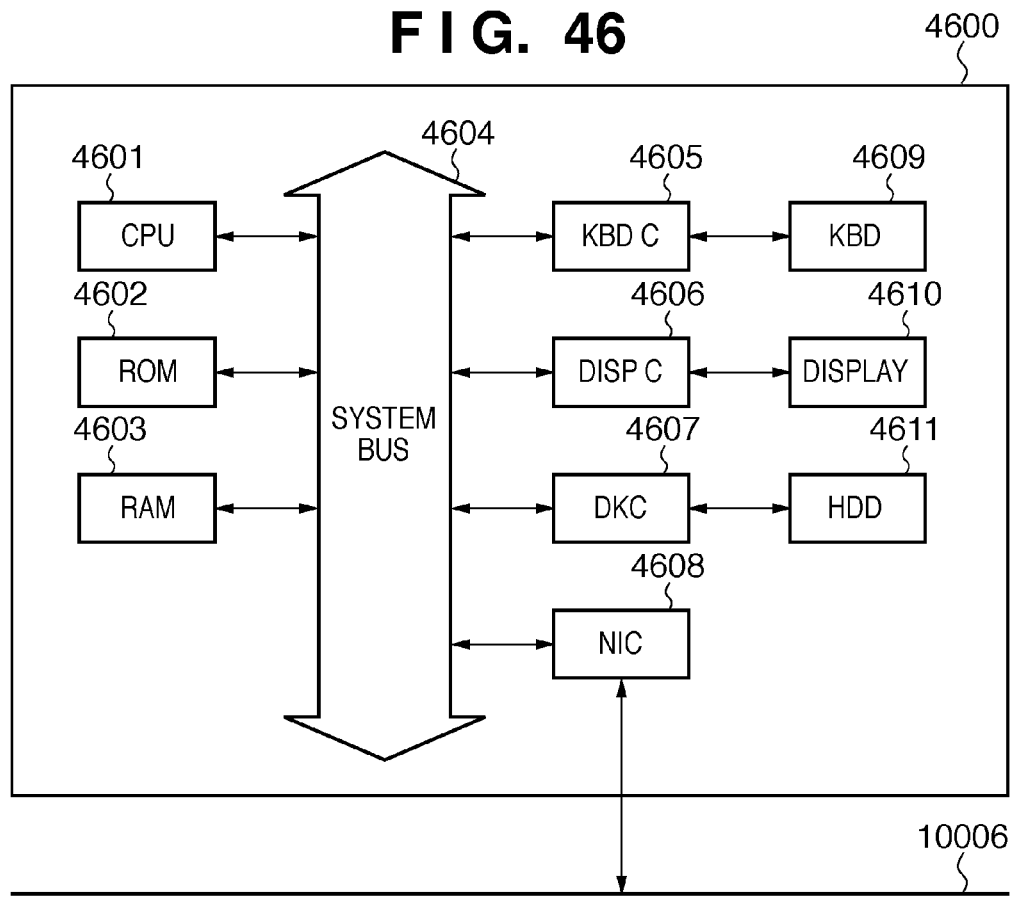
FIG. 46 is a block diagram showing the internal arrangement of a client PC.

FIG. 46 is a block diagram showing an example of the internal arrangement of the client PC 4401 or 4402 or the server PC 4403. Referring to FIG. 46, a PC 4600 includes a CPU 4601 which executes software stored in a ROM 4602 or a mass storage device 4611 such as a hard disk. The CPU 4601 comprehensively controls devices connected to a system bus 4604. A RAM 4603 functions as, for example, the main memory or work area of the CPU 4601. A keyboard controller (KBD C) 4605 controls instruction inputs from a keyboard 4609 provided on the PC 4600. A display controller (DISP C) 4606 controls display on a display module (DISPLAY) 4610 formed from, for example, a liquid crystal display. A disk controller (DKC) 4607 controls the hard disk drive (HDD) 4611 serving as a mass storage device. A network interface card (NIC) 4608 bidirectionally exchanges data with another device via the LAN 4406.

<Outer Appearance of Image Forming Apparatus>

Figure 47:
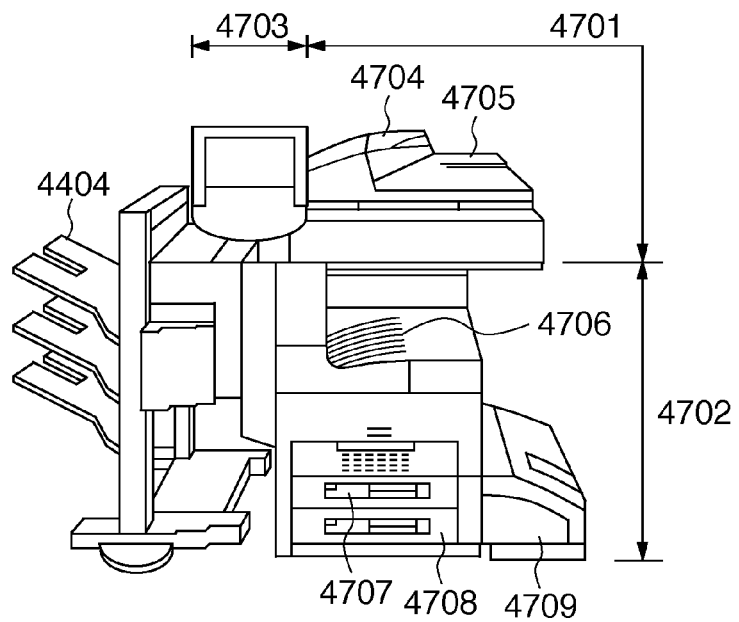
FIG. 47 is a view showing the outer appearance of an image forming apparatus.

FIG. 47 shows the outer appearance of the image forming apparatus 4404 or 4405. The image forming apparatus 4404 is divided into an image reader unit 4701 which reads a document image, a printer unit 4702 which reproduces the read image data, and an operation unit 4703 which designates various kinds of operation settings of the image forming apparatus 4404. The image reader unit 4701 exposes and scans an image on a document to obtain reflected light, and inputs it to a CCD, thereby converting image information into an electrical signal. The image reader unit 4701 then converts the electrical signal into luminance signals of RGB colors, and outputs, as image data, the luminance signals to a controller 5100 to be described later with reference to FIG. 51.

The document to be read is set on a tray 4704 of a document feeder 4705. When the user inputs a reading start instruction from the operation unit 4703, the controller 5100 supplies a document reading instruction to the image reader unit 4701. Upon receiving the instruction, the image reader unit 4701 performs a document reading operation while feeding the document sheets from the tray 4704 of the document feeder 4705 one by one. Note that the document reading may be done not by the automatic feeding method of the document feeder 4705 but by placing the document on a glass plate (not shown) and moving an exposure unit to scan the document.

The printer unit 4702 is an image forming device which forms, on a paper sheet, the image data received from the controller 5100. In this embodiment, the image forming method is an electrographic method using a photosensitive drum and a photosensitive belt. However, the present invention is not limited to this. For example, an inkjet method is also applicable, which discharges ink from a tiny nozzle array and prints on a paper sheet. The printer unit 4702 includes a plurality of paper cassettes 4707, 4708, and 4709 which enable to select different paper sizes or different paper orientations. Printed paper sheets are discharged onto a discharge tray 4706.

The image processing apparatus of this embodiment provides a function of adjusting the density of a pattern to be embedded when embedding an LVBC as additional information.

<Detailed Explanation of Controller>

Figure 51:
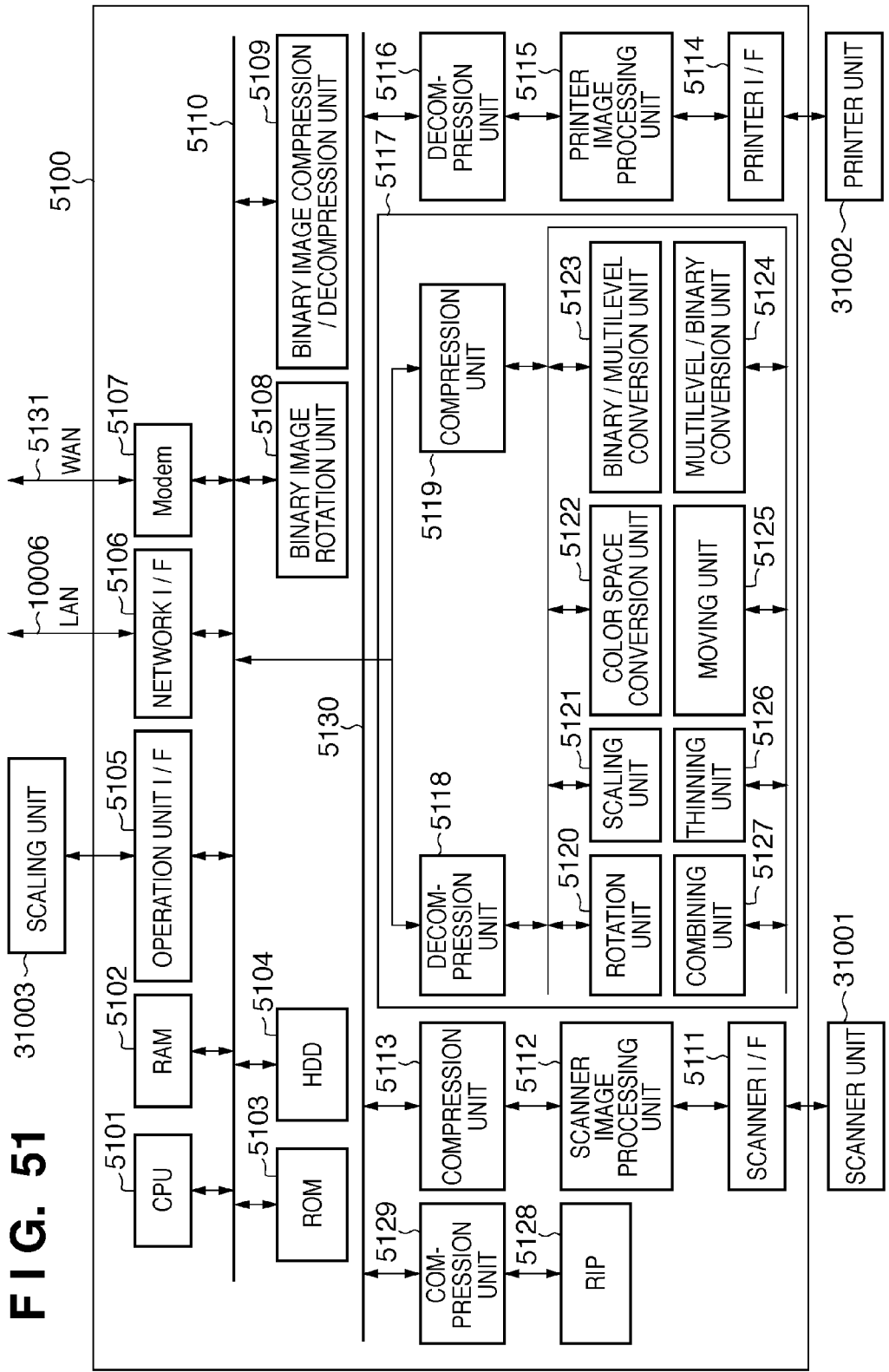
FIG. 51 is a block diagram showing the internal arrangement of the image forming apparatus.

FIG. 51 is a block diagram for explaining the arrangement of the controller 5100 of the image forming apparatus 4404 or 4405 in more detail. The controller 5100 is electrically connected to a scanner unit 31001 and a printer unit 31002. The controller 5100 is also connected to the print server 4403 and an external apparatus via a LAN 10006 and a WAN 5131. This enables input/output of image data and device information.

A CPU 5101 comprehensively controls access to various kinds of connected devices based on, for example, a control program stored in a ROM 5103, and also comprehensively controls various kinds of processing executed in the controller. A RAM 5102 serves as a system work memory for the operation of the CPU 5101, and also serves as a memory for temporarily storing image data. The RAM 5102 includes an SRAM which holds stored contents even after power-off, and a DRAM which erases stored contents after power-off. The ROM 5103 stores the boot program of the apparatus, and the like. An HDD 5104 (Hard Disk Drive) can store system software and image data.

An operation unit I/F 5105 is an interface unit to connect a system bus 5110 to an operation unit 31003. The operation unit I/F 5105 receives image data to be displayed on the operation unit 31003 from the system bus 5110 and outputs the image data to the operation unit 31003, and also outputs information received from the operation unit 31003 to the system bus 5110. A network I/F 5106 is connected to the LAN 10006 and the system bus 5110 to input/output information. A modem 5107 is connected to the WAN 5131 and the system bus 5110 to input/output information. A binary image rotation unit 5108 converts the direction of image data before transmission. A binary image compression/decompression unit 5109 converts the resolution of image data before transmission into a predetermined resolution or a resolution according to the capability of a partner device. Note that compression and decompression are done using a method such as JBIG, MMR, MR, or MH. An image bus 5130 is a transmission path to exchange image data and is formed from a PCI bus or IEEE1394.

A scanner image processing unit 5112 corrects, manipulates, and edits image data received from the scanner unit 31001 via a scanner I/F 5111. Note that the scanner image processing unit 5112 determines whether received image data is a color document or monochrome document, or a character document or photo document. The determination result accompanies the image data. The accompanying information is called attribute data. Processing to be executed by the scanner image processing unit 5112 will be described later in detail.

A compression unit 5113 receives image data and segments it into blocks each having 32×32 pixels. Image data including 32×32 pixels will be referred to as tile data. In a document (paper medium before reading), each area corresponding to tile data will be referred to as a tile image. Note that tile data includes header information representing the average luminance of the 32×32 pixel block and the coordinate positions of the tile image on the document. The compression unit 5113 also compresses the image data including the plurality of tile data. A decompression unit 5116 decompresses the image data including the plurality of tile data, rasterizes it, and sends it to a printer image processing unit 5115.

The printer image processing unit 5115 receives the image data sent from the decompression unit 5116, and processes the image data while referring to attribute data accompanying it. The processed image data is output to the printer unit 31002 via a printer I/F 5114. Processing to be executed by the printer image processing unit 5115 will be described later in detail.

An image conversion unit 5117 performs predetermined conversion processing for image data. This processing unit includes the following processing units. A decompression unit 5118 decompresses received image data. A compression unit 5119 compresses received image data. A rotation unit 5120 rotates received image data. A scaling unit 5121 performs resolution conversion processing (e.g., from 600 dpi to 200 dpi) for received image data. A color space conversion unit 5122 converts the color space of received image data. The color space conversion unit 5122 can perform known under-color removal processing, known LOG conversion processing (RGB→CMY), and known output color correction processing (CMY→CMYK) using a matrix or a table. A binary/multilevel conversion unit 5123 converts received image data having two tones into image data having 256 tones. Conversely, a multilevel/binary conversion unit 5124 converts received image data having 256 tones into image data having two tones using a method such as error diffusion processing.

A combining unit 5127 combines two received image data to generate one image data. Two image data are combined using a method of calculating the average value of the luminance values of combining target pixels as a combined luminance value or a method of applying the luminance value of a pixel that is brighter in terms of luminance level as the luminance value of a combined pixel. The luminance value of a darker pixel may be applied as the luminance value after combining. Alternatively, the luminance value after combining may be decided by ORing, ANDing, or exclusive-ORing the combining target pixels. All these combining methods are known. A thinning unit 5126 converts the resolution by thinning out the pixels of received image data, thereby generating, for example, ½, ¼, or ⅛ image data. A moving unit 5125 adds/removes a margin to/from received image data.

An RIP 5128 receives intermediate data generated based on PDL code data transmitted from the print server 4403 and generates bitmap data (multilevel).

<Designation of Copy Control Information or Tracking Information in Client PC>

Figure 45:
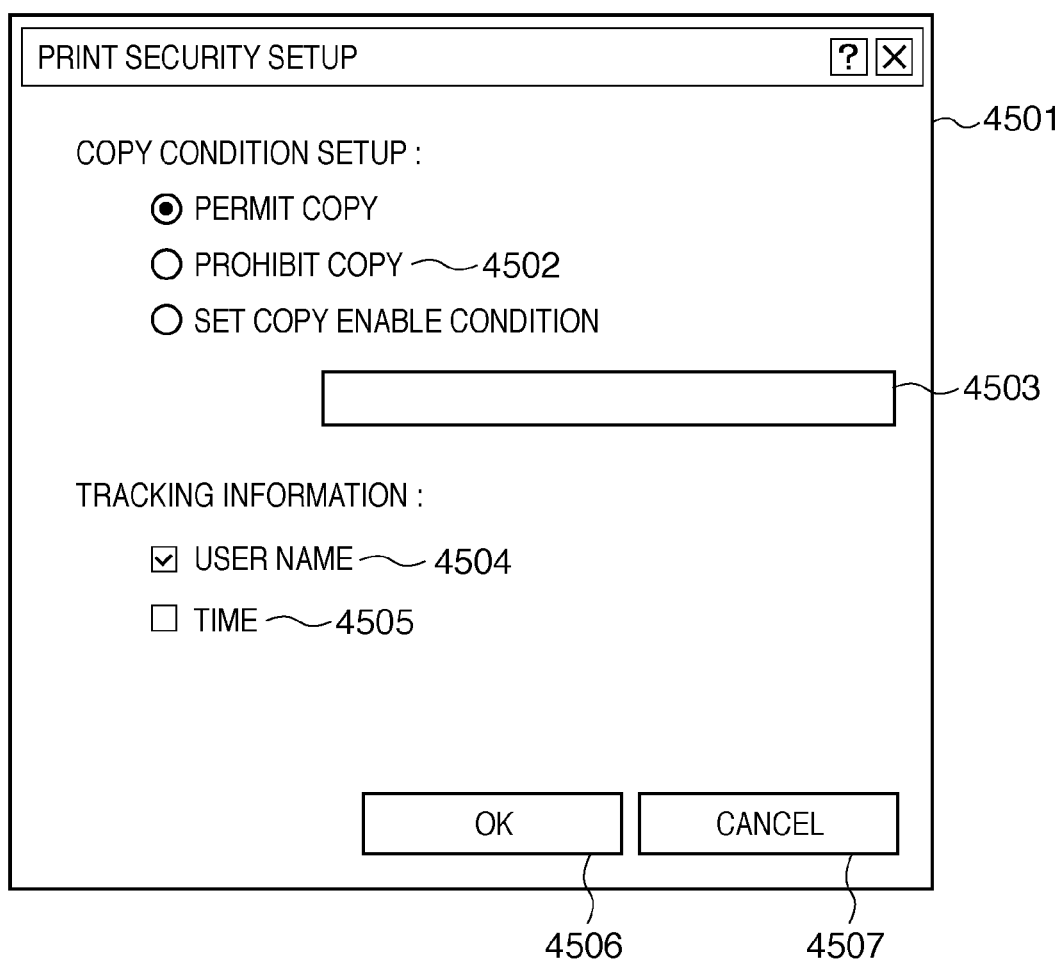
FIG. 45 is a view showing an example of a printer driver setup window.

FIG. 45 shows one of printer driver setup windows on the client PC 4401 or 4402. Referring to FIG. 45, a dialogue 4501 is a print security setup window. The user sets security to be embedded in a print output by operating the dialogue. The print security setup dialogue 4501 is roughly divided into two portions. The upper half portion sets copy prohibition, and the lower half portion sets tracking information.

The upper half portion to set copy prohibition will be described first. In this embodiment, the user operates a radio button 4502 and selects one of three options "permit copy", "always prohibit copy", and "cancel copy prohibition by password input". When the user has selected the third option "cancel copy prohibition by password input", a password input field 4503 is enabled so that the user can input a password to cancel copy prohibition.

The lower half portion of the print security setup dialogue 4501 to set tracking information will be described next. In this embodiment, two check boxes, "user name" 4504 and "time" 4505 are arranged. The user can give the instruction to embed a user name or time information by checking a corresponding check box.

In this embodiment, the user name information or time information selected as tracking information is embedded in a copy-forgery-inhibited pattern image as additional information.

<LVBC>

In the above-described example, an LVBC is used as a preferable example of the meta information embedded image to be embedded as a copy-forgery-inhibited pattern image. The LVBC is a technique of embedding, in an image, a desired digital code hard for a human to visually recognize by encoding target image data in accordance with a predetermined procedure. In this case, "embed" indicates not embedding a code in a specific area of an image but associating a code with the position of a dot of an image so that the desired information is expressed by image data. The meta information embedded image is an image formed by combining desired information as a system in addition to an image which should actually be printed on an image forming medium (to be referred to as a sheet hereinafter) such as a paper sheet or an OHP sheet by a printing apparatus or a copying machine. For example, an image encoded by the LVBC using meta information as code information corresponds to the meta information embedded image. Requirements of a general meta information embedded image are as follows.

A meta information embedded image needs to be able to embed, in a sheet, data having a sufficient information amount necessary for information embedding.

A meta information embedded image needs to allow to reliably extract, as digital information, information embedded in a sheet using a color material (e.g., toner or ink).

A meta information embedded image needs to have resistance to some extent to factors that hinder information extraction, such as rotation, enlargement, reduction, and partial deletion of a document, signal weakening, and contamination upon copy.

A meta information embedded image needs to ensure real-time processing or equivalent high-speed processing, which allows extraction upon copy to prevent copy of a copy-prohibited document.

General requirements of a meta information embedded image have been described above. The LVBC will be described later in a section <LVBC Embedding Method>.

<Two Areas>

Two areas, that is, first and second areas where pieces of additional information such as tracking information and copy prohibition information are embedded will be described next. In this embodiment, pieces of additional information are encoded and embedded in the two image areas. FIG. 3 is a table for explaining the difference in characteristics between the first area and the second area. The pieces of additional information are selectively embedded, in an independently extractable form, in the two kinds of areas having different characteristics depending on how to use them.

The first area stores information such as information representing copy prohibition which is required to be quickly extracted at the time of a copy operation by normal scanning. The image forming apparatus (including a copying machine or MFP) according to this embodiment executes additional information extraction processing for any document, and delay of extraction processing influences the overall copy speed. Hence, analysis processing needs to end in, for example, almost the same time as the scanning processing. On the other hand, copy prohibition information requires only a very small information amount, and the data size of additional information to be embedded can be small.

Tracking information such as a user identification name is embedded in the second area. Tracking information is extracted when an administrator executes analysis processing in case of revelation of information leakage. It need not be extracted in a normal copy operation. For this reason, tracking information need not necessarily ensure real-time processing. The processing speed can lower to some degree because it does not affect the overall copy speed. Since tracking information requires embedding a large quantity of data, the data size must be relatively large. Examples of information to be embedded as tracking information are the personal name or organization name of a user who has created a document, and the device number, IP (Internet Protocol) address, or MAC (Media Access Control) address of an apparatus that has performed image formation. An installation location, or a print date or print time that allows specifying the point of time of printing may be used as tracking information.

The LVBC used in this embodiment can embed additional information in both the first and second areas to meet these different requirements. It is therefore possible to select extraction from only the first area, extraction from only the second area, or extraction from both areas in accordance with a case of use. When extracting from only the first area, the extraction processing can be done so quickly that the analysis processing speeds up without any adverse effect on the productivity of the copy operation.

Figure 7:
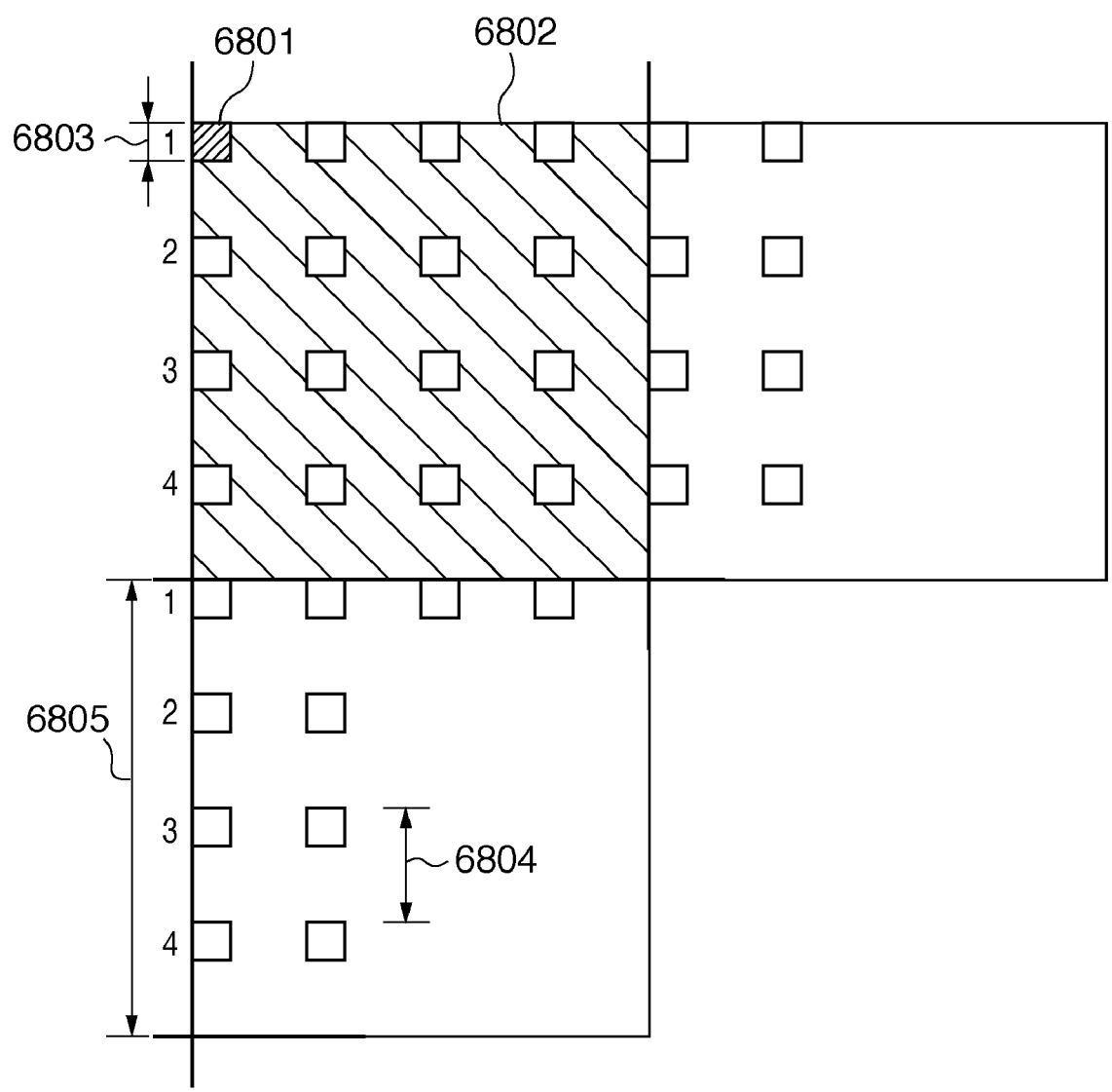
FIG. 7 is a schematic view showing the arrangement of the first and second areas when embedding information in a sheet.

FIG. 7 is a schematic view showing the arrangement of the first and second areas when embedding information in a sheet. Each rectangular area 6801 represents the first area. Identical rectangular areas are periodically embedded to store the same data. Repeatedly embedding the first area increases the redundancy and improves the reliability against noise and errors. The spatial period at which the first area appears will be referred to as a repetitive period. An area 6802 represents the second area. As the second area as well, rectangular areas are periodically embedded. The information of the second area is not embedded in the first area. The pieces of information are exclusively embedded. Reference numeral 6803 denotes a size of the first area; 6804, a repetitive period of the first area; and 6805, a size of the second area. The repetitive period of the second area matches its size.

LVBC Embedding Method>

An LVBC embedding method will be explained next. In the LVBC, a dot pattern called a grid is printed to embed additional information, in addition to an image to be printed on a sheet. The dots 6603 in FIG. 2 form a grid. The grid itself is an aggregate of vertical and horizontal dots which are spaced apart from each other at equal intervals. One dot is placed on one grid point although it is displaced by an amount to be described with reference to FIG. 23. Hence, dots are arranged in accordance with grid points.

Additional information is input as binary data within a predetermined size. Additional information implements information embedding by displacement (shift from the center) in eight directions including the upper, lower, left, and right directions with respect to the dots of a grid.

Figure 23:
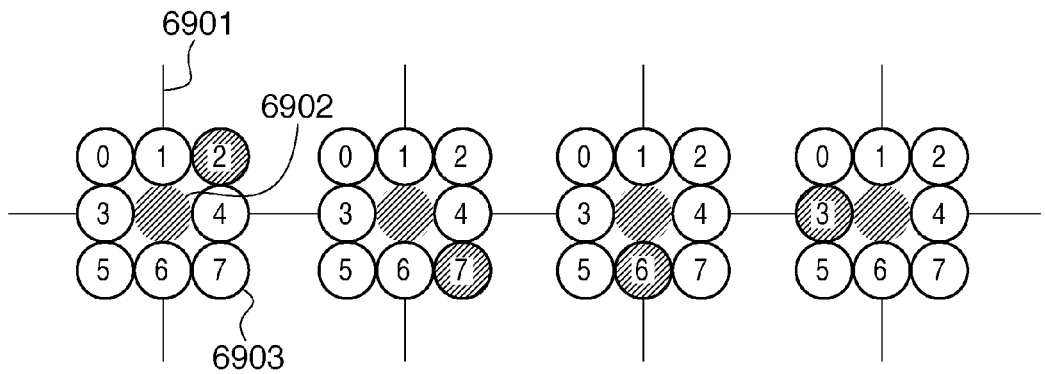
FIG. 23 is a view showing an example in which binary data 010111110011b is embedded as security additional information.

FIG. 23 is a view showing an example in which binary data 010111110011b is embedded as additional information. Referring to FIG. 23, vertical and horizontal lines 6901 are virtual guidelines indicating the position of a grid point. When grid points are connected by lines in the shortest course, a grid pattern appears. Reference numeral 6902 denotes a center where no dot is placed. A dot is displaced and arranged at, for example, a position 6903 spaced apart from the center 6902.

The value 010111110011b is divided into 3-bit data 010b, 111b, 110b, and 011b. The 3-bit data are converted into 2, 7, 6, and 3 by decimal conversion. As shown in FIG. 23, each dot of a grid is represented by displacement in one of eight directions corresponding to eight values 0 to 7, including the upper, lower, left, and right directions. In this case, shift directions corresponding to 2, 7, 6, and 3 are upper right, lower right, lower, and left. Dots displaced in these directions are arranged at corresponding grid points, thereby embedding the information. The LVBC allows embedding additional information in an amount of about 2,000 bytes in the image of one page by repeating such processing. When dots expressing additional information are embedded at a plurality of portions of a sheet, reliability against misrecognition of an image or contamination, wrinkles, and partial destruction of a sheet can be improved. This will be described later in detail in association with an LVBC analysis method.

When analyzing the LVBC, it is necessary to accurately check the positions of grid points. A dot displacement preferably appears with an equal probability in the eight directions. However, data to be embedded sometimes includes a lot of specific data such as 0, so the data may not appear at an equal probability in this state. To prevent this, in this embodiment, lossless scrambling processing (e.g., common key encryption) is executed for information to be embedded so that the dots are displaced at random and embedded. LVBC embedding uses D/A conversion to convert additional information as digital data into analog data and record it on a sheet, and can therefore be implemented by a relatively simple mechanism.

Image embedding in the above-described two areas is executed by applying the embedding method using the phase shift of dot positions in a grid. The first area 6801 and the second area 6802 shown in FIG. 7 are combined when forming data to be embedded, and the combining result is handled as one embedded data. In this method as well, data is converted into the displacement of each dot and embedded, as shown in FIG. 23. When the two areas shown in FIG. 7 are enlarged to the dot size, information is embedded by displacing each dot, as shown in FIG. 23.

<LVBC Analysis Method>

Figure 24:
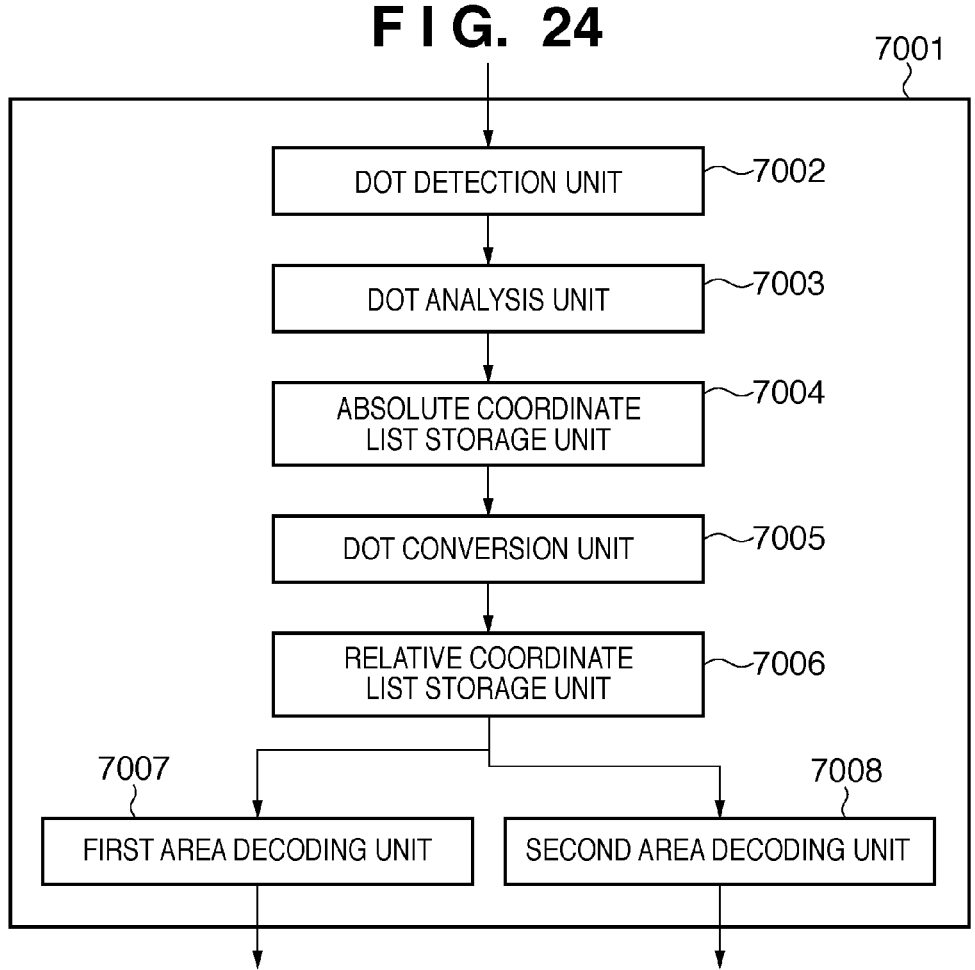
FIG. 24 is a block diagram of an embedded information analysis unit 7001 which analyzes an LVBC.

An LVBC analysis method will be described next. FIG. 24 is a block diagram of an embedded information analysis unit 7001 which analyzes an LVBC. The embedded information analysis unit 7001 is implemented by causing the control processor of an MFP to execute a program for image data read by, for example, a scanner. The embedded information analysis unit 7001 may be implemented by a general-purpose computer, as a matter of course. Referring to FIG. 24, a dot detection unit 7002 detects dots from an image including embedded additional information (including both target image information and additional information), and specifies the coordinates of each detected dot. A dot analysis unit 7003 removes unnecessary dots such as halftone dots from the dots detected by the dot detection unit 7002. An absolute coordinate list storage unit 7004 stores a list of the absolute coordinates of the dots except for those removed by the dot analysis unit 7003. Absolute coordinates indicate a coordinate system uniquely given to the entire analysis target image. A dot conversion unit 7005 converts the absolute coordinates of each dot stored in the absolute coordinate list storage unit 7004 into relative coordinates from a grid point position by detecting the rotation angle and grid interval with respect to the center of the grid point.

A relative coordinate list storage unit 7006 records the relative coordinates of the plurality of dots from their grid point positions, which are analyzed by the dot conversion unit 7005. A first area decoding unit 7007 extracts the first area from the embedded additional information, and outputs the extraction result to the succeeding stage. Decision of the first area position will be described later in a section <Decision of First Area>.

A second area decoding unit 7008 extracts the second area from the embedded additional information, and outputs the extraction result to the succeeding stage. Decision of the second area position will be described later in a section <Decision of Second Area>. The "succeeding stage" indicates a functional module using additional information. The functional module stops printing if, for example, copy prohibition information is extracted as additional information, or displays sheet owner information on the operation display if tracking information is extracted.

<Dot Detection>

The dot detection unit 7002 will be described next. The dot detection unit 7002 receives an image read by an optical scanner as a multilevel monochrome image. Information embedding of the LVBC is done by embedding monochrome binary dots, as indicated by the dots 6603 in FIG. 2. However, the signal to be received weakens slightly due to the influence of, for example, the toner fixed state upon embedding, sheet handling, and the optical system during scanning. In the LVBC, to eliminate the influence, the received dots are detected, and the center of gravity of each received dot is recognized as coordinates, thereby increasing the extraction accuracy.

Figure 25:
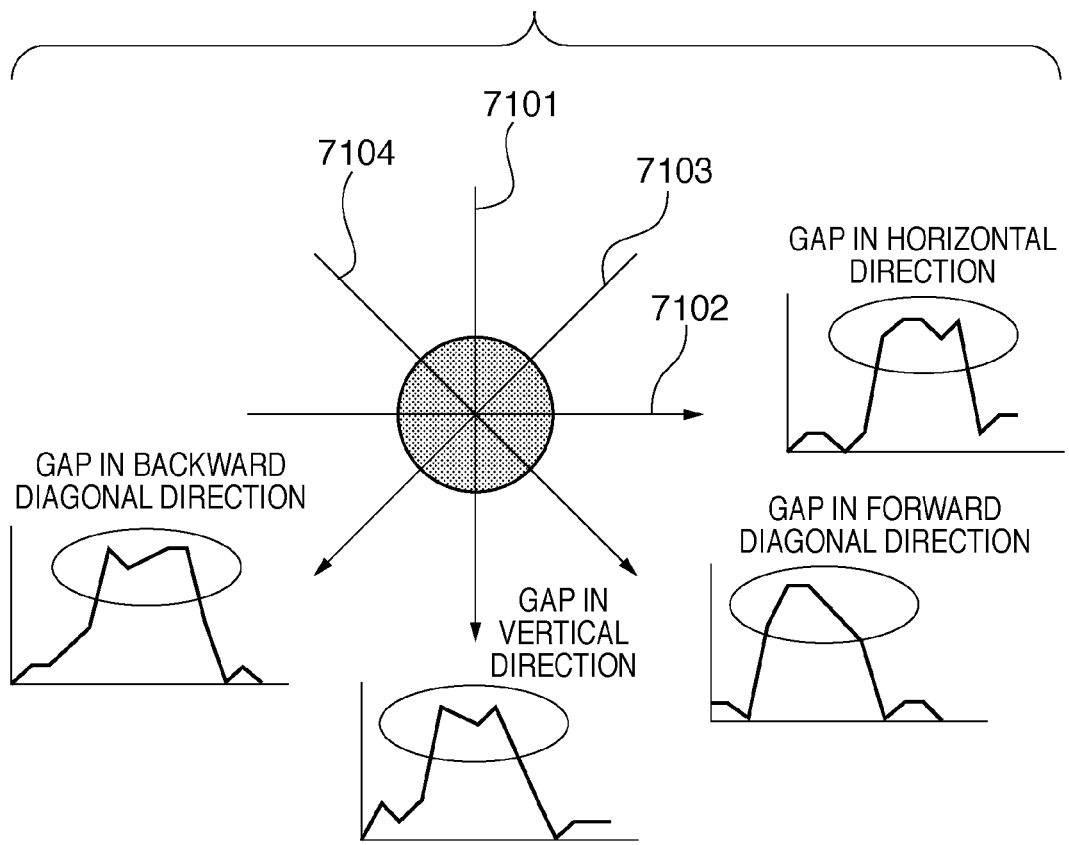
FIG. 25 is a conceptual view for explaining dot detection by a dot detection unit 7002.

FIG. 25 is a conceptual view for explaining dot detection by the dot detection unit 7002. To check an isolated point on an image, gap check is performed from four directions on the image. Reference numerals 7101 to 7104 denote directions in which the presence/absence of an isolated point is checked. For example, if a check result obtained by sampling the image in the vertical direction 7101 indicates "white", "white", "black", "black", "white", and "white", the black portions may be included in an isolated point. However, it is undeniable that the black portions are part of a horizontal line. Similarly, a portion which is determined to be an isolated point only by check in the horizontal direction 7102 may be part of a vertical line. In this embodiment, the dot detection unit 7002 performs isolated point check in the four directions 7101 to 7104, thereby improving the check accuracy. If the condition is satisfied in an area simultaneously in all the directions 7101 to 7104, it can be determined that an isolated point exists at the position.

<Dot Analysis>

Processing of the dot analysis unit 7003 will be described next. Dots detected by the dot detection unit 7002 may be dots except those of an LVBC. Examples of such dots are a dot pattern to express a halftone included in a document image, and isolated points (e.g., voiced sound symbols of hiragana characters) included in a document from the first. It is necessary to execute halftone removal to delete such isolated points outside the LVBC.

Figure 26:
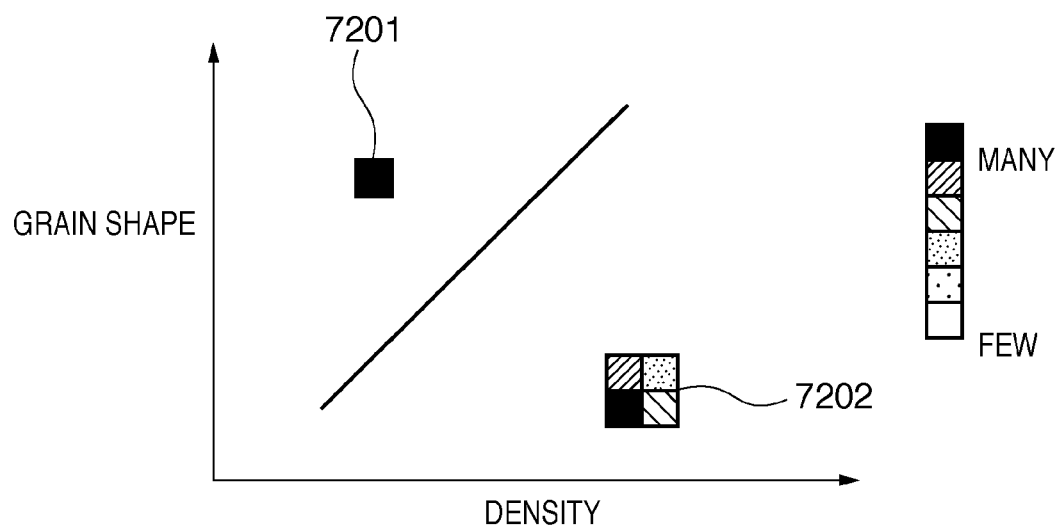
FIG. 26 is a graph for explaining halftone removal.

FIG. 26 is a graph for explaining halftone removal. This graph includes an ordinate representing the dot grain shape, an abscissa representing the density, and a histogram indicating a dot frequency by point density. The denser (darker) the dots are, the higher the appearance frequency is. In the LVBC, dots having almost the same grain shape and density are embedded. Hence, the appearance frequency of the LVBC has the peak in a narrow area 7201 of the graph in FIG. 26. On the other hand, the grain shapes and densities of halftone dots are not standardized. Hence, the halftone dots sparsely appear in a wide area of the graph at a relatively low frequency. Using this characteristic, a position at which the appearance frequency has the peak in a narrow area is identified as an LVBC dot and stored in the absolute coordinate list storage unit 7004. The remaining dots are eliminated. With this processing, almost only LVBC dots are recorded in the absolute coordinate list storage unit 7004.

<Dot Conversion>

Processing of the dot conversion unit 7005 will be described next. An LVBC dot embedding angle at the time of printing is different from the angle in a scanned image because of a change in the orientation of the document placed on the scanner or a slight angle change at analog level. It is therefore necessary to detect and correct the rotation angle. In the LVBC, information is embedded as a displacement from a grid point to which a dot belongs. Since the grid needs to be reproduced, it is necessary to correctly decide the grid interval.

Figure 39:
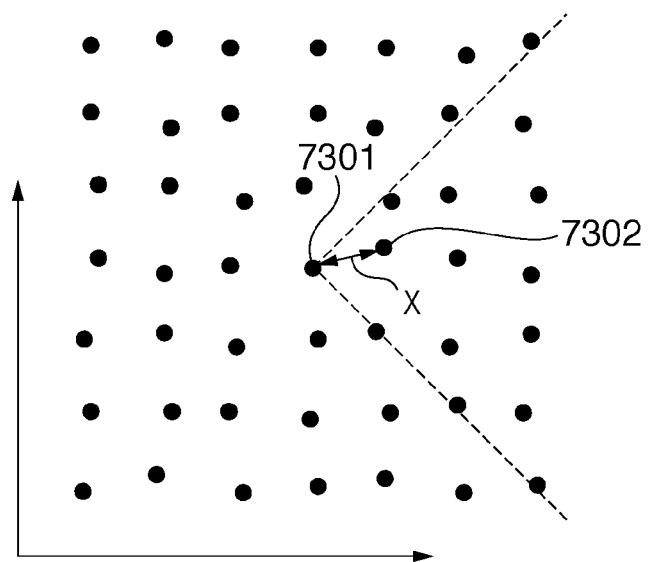
FIG. 39 is a schematic view for explaining a method of measuring a grid interval.

FIG. 39 is a schematic view for explaining a method of measuring a grid interval. A distance X from a point 7301 of interest to a closest point 7302 is similar to the grid interval. Points closest to the point of interest exist at four positions on the upper, lower, left, and right sides. To reduce the calculation amount, the closest point search range is set to only a 90° range on the right side of the dot 7301 of interest. More specifically, the 90° range on the right side of the dot of interest can be determined in the following way. For an arbitrary dot (a,b) other than the dot (x,y) of interest, if $$a-x \leq 0, \text{ or } |a-x| \leq |b-y|$$

the dot (a,b) is excluded from the calculation target. Out of the dots within the search target range, the dot (a,b) whose distance to the dot (x,y) of interest is shortest is defined as a neighboring dot. The distance X between the dot of interest and the neighboring dot is a candidate of the grid interval.

Since both the dot 7301 of interest and the neighboring dot 7302 are displaced from the centers of grid points to embed information, the distance may have a value different from the actual grid interval. In addition, a dot recognized as an LVBC dot may be a dot of a halftone pattern the dot analysis unit 7003 has failed to remove. Hence, for all points (x,y) of interest, the distance between the grid points is measured by the above-described technique, and a histogram representing the frequency of each of the grid point distances concerning all points of interest is created.

Figure 40:
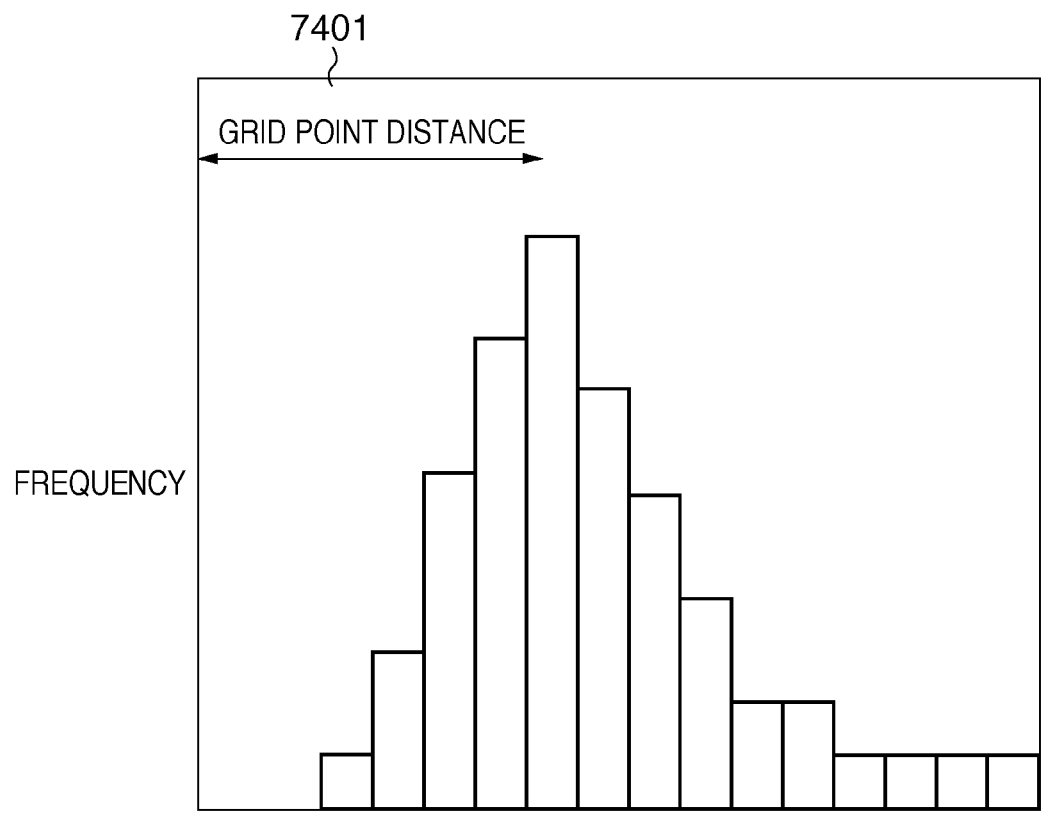
FIG. 40 is a graph showing an example of a histogram representing the frequency of each grid point distance.

FIG. 40 shows an example of a histogram representing the frequency of each grid point distance. The abscissa represents the value of the distance X as a candidate of the grid point distance, and the ordinate represents the frequency of measurement of the distance X for the point (x,y) of interest. In FIG. 40, a grid point distance 7401 exhibits the highest frequency. If the appearance probability of the displacement position of each of the dot 7301 of interest and the neighboring dot 7302 from the corresponding grid point is the same in the vertical and horizontal directions, the grid point distance 7401 corresponding to the mode can be determined as the grid interval based on the histogram of a number of dots of interest.

Figure 41:
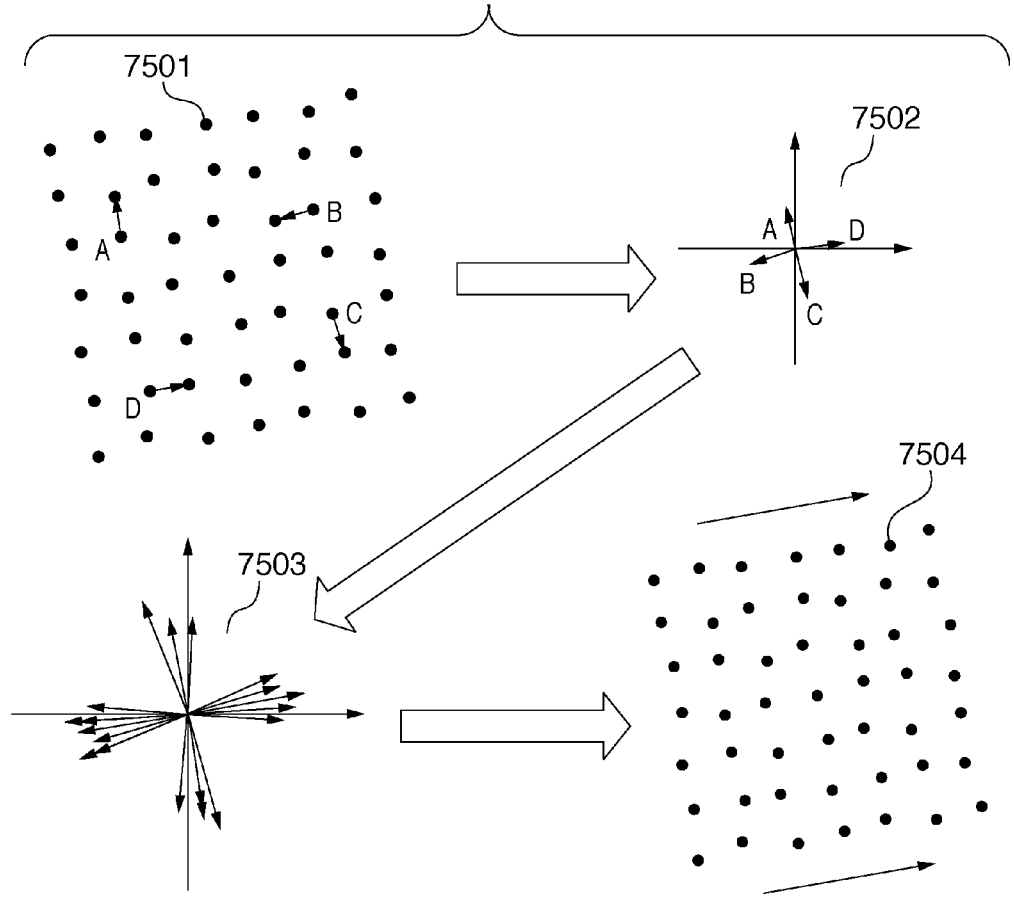
FIG. 41 is a view for explaining grid rotation angle correction.

FIG. 41 is a view for explaining grid rotation angle correction. In a dot pattern 7501, the angle between each dot and a neighboring dot is measured. The angle of the grid point center of a neighboring dot with respect to that of a dot of interest should be 0°, 90°, 180°, or 270°. It is therefore possible to decide the rotation angle by correcting the shift of the measured angle. Let (dx,dy) be the vector formed from a point of interest and a neighboring point. The angle of a neighboring dot with respect to a dot of interest, that is, an argument θ is given by θ=atan 2(dy,dx). The function atan 2(y,x) is rewritten to atan(y/x) when x≧0, or Πsign(y)+atan(y/x) when x<0, where sign(y) is a function that returns the sign of y. That is, the function atan 2 gives the direction of the vector (x,y), that is, argument when the x-axis direction is defined as 0°.

Vectors 7502 are vectors to neighboring points A, B, C, and D. In fact, both the dot of interest and the neighboring dots are slightly displaced from the grid point positions to embed information. Hence, an argument vθ of each dot of interest with respect to a neighboring dot is measured in a similar way. If the appearance probability of the displacement position of each of the dot 7301 of interest and the neighboring dot 7302 from the corresponding grid point is the same in the vertical and horizontal directions, the grid rotation angle can be measured on average by adding the shifts of arguments for all points of interest. Vectors 7503 indicate vectors of several points. As is apparent, these angles can be approximated to the grid rotation angle by compositing them.

More specifically, a reference vector corresponding to the argument θ of each dot of interest is calculated. The reference vectors of all dots of interest are composited, and a total angle φ is obtained from the result. More specifically, let i be the identification number of a neighboring dot, and (A,B) be the vector obtained by compositing the calculated reference vectors. Approximation can be done by $$A = \Sigma \cos(4\theta_i)$$

$$B = \Sigma \sin(4\theta_i) \text{(for } \Sigma \text{ is for all i)}$$

The grid rotation angle φ can be approximated by $$\varphi = \text{atan } 2(B,A)$$

The absolute coordinates in the list stored in the absolute coordinate list storage unit 7004 are rotated in the reverse direction by the grid rotation angle, thereby correcting the grid angle. In this case, the coordinate system of each dot of the image data is converted into a coordinate system parallel to the grid.

The rotation angle correction is done every 90°. In fact, the rotation angle is not narrowed down to the four angles 0° (correct), 90°, 180°, and 270°. This narrow-down will be described later.

Figure 42:
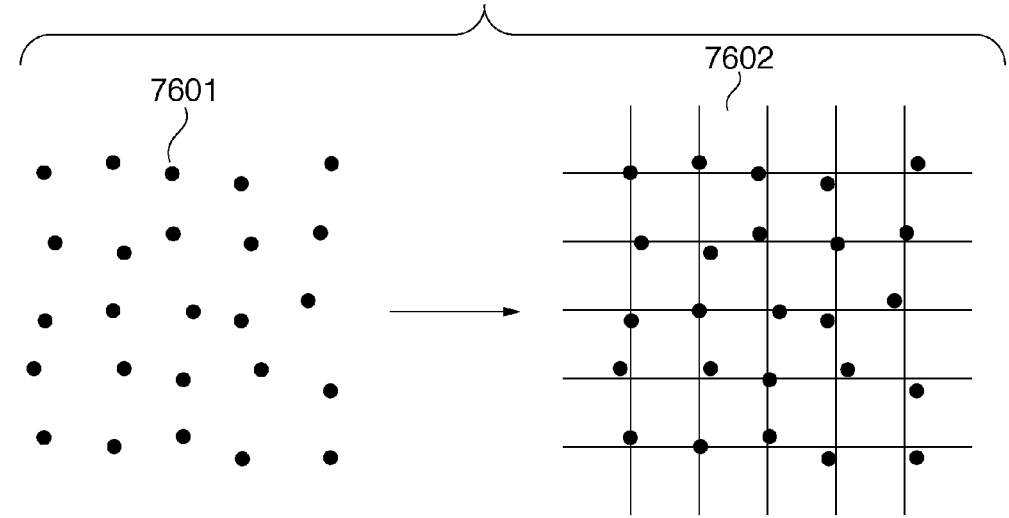
FIG. 42 is a view for explaining a rotation correction result and drawn grid lines.

FIG. 42 is a view for explaining a rotation correction result and obtained grid point positions. Referring to FIG. 42, dots 7601 are LVBC dots after rotation correction. These dots are defined by the absolute coordinate list stored in the absolute coordinate list storage unit 7004. As indicated by a grid 7602, the dot conversion unit 7005 draws virtual lines in the X and Y directions at the grid interval obtained by the method described with reference to FIG. 40, and defines the intersections of these lines as grid points. The displacement of each actually recorded dot is measured based on the position of a corresponding grid point.

Figure 43:
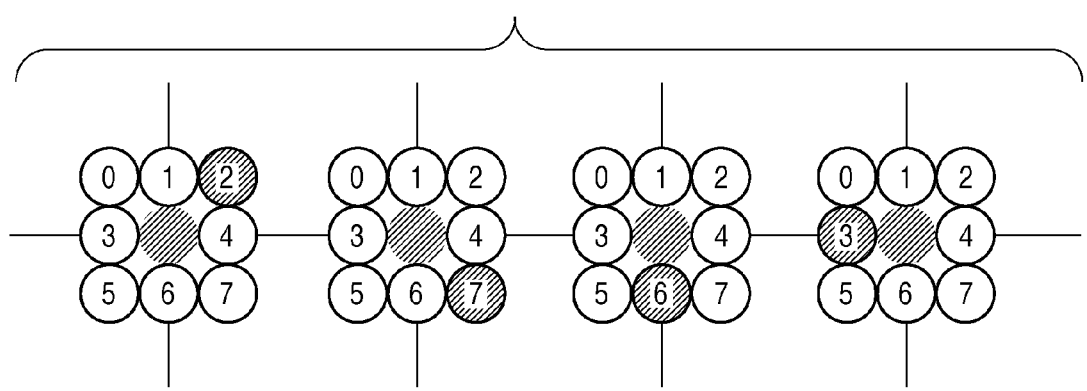
FIG. 43 is a view for explaining conversion of a grid point displacement to actual data.

FIG. 43 is a view for explaining conversion of a grid point displacement to actual data. Displacements from a grid point are expressed by binary numbers of 0 to 7 in eight directions including the upper, lower, left, and right directions. In the example shown in FIGS. 43, 2, 7, 6, and 3 are extracted. These values are converted into 3-bit binary numbers and concatenated to obtain 010111110011b. This value represents embedded data extracted from the dots in FIG. 43. Executing such extraction processing for all dots enables to embed data of several ten to several thousand bytes.

<Decision of First Area>

Decision of the first and second areas will be explained next. The size 6803, repetitive period 6804, and position of the first area described with reference to FIG. 7, which are unknown, are decided. First, the repetitive period 6804 of the first area 6801 is decided. The first area 6801 stores the same data periodically. An autocorrelation value is calculated while changing an offset value in the vertical direction. The autocorrelation level rises when the offset value matches the repetitive period 6804. It is therefore possible to decide the repetitive period 6804.

Figure 48:
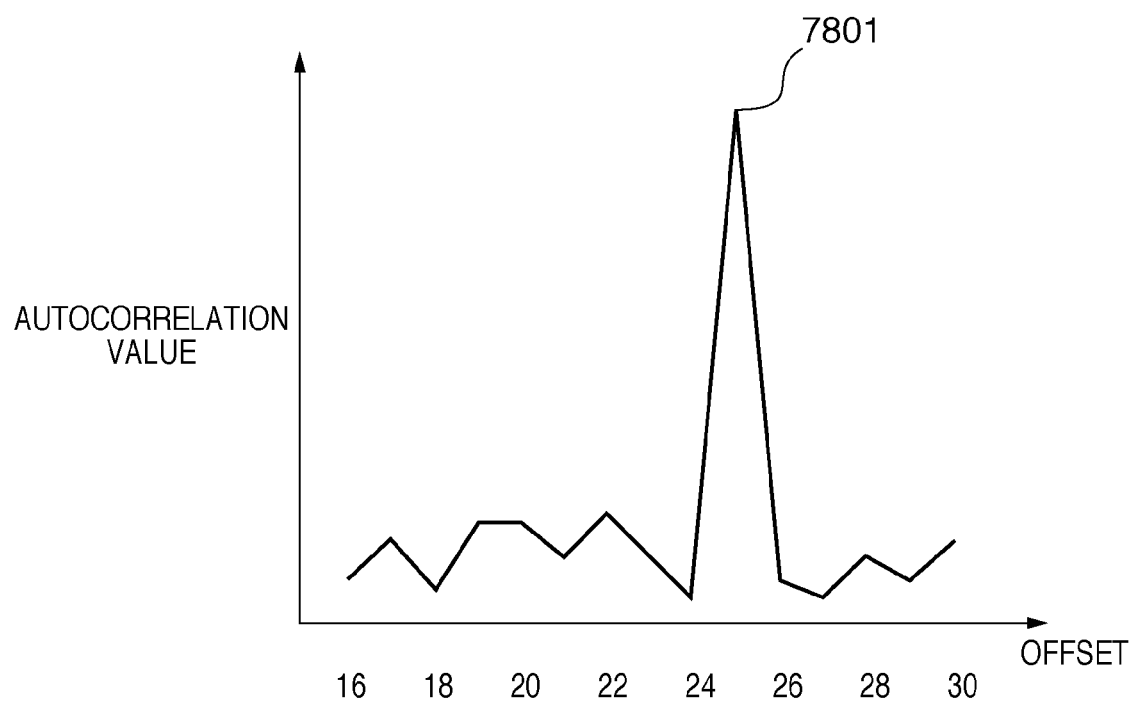
FIG. 48 is a graph showing an example of calculation of an autocorrelation value corresponding to an offset value in the first area.

FIG. 48 is a graph showing an example of calculation of an autocorrelation value corresponding to an offset value. Autocorrelation is a technique of evaluating the periodical appearance frequency of specific embedded data. An autocorrelation value is a numerical value to evaluate the similarity of embedded data with respect to a specific offset value. An autocorrelation function COR(A,B) to calculate the autocorrelation value is given by $$COR(A,B) = \text{bitcount}(\text{not}(A \text{ xor } B))$$

where xor is the exclusive OR of two terms, not represents negation, and bitcount(X) is a function to count the number of "1"s in a bit sting X. If bit strings A and B completely match each other, a bit string in which all bit data are 1 is generated by the operation (not(A xor B)).

For example, when A=010b, and B=011B, not(A xor B)=not(001b)=110b, and the value of the function bitcount is 2. Assume that the first area is a matrix having predetermined width and height, and the bit string to evaluate the first area is CELL(x,y) where x and y are vertical and horizontal coordinates. The first area is assumed to have a width=8 (dots) and a height=8 (dots). In the first area whose upper left corner is defined as the position (x,y), the bit string CELL(x,y) has a length of 3 bits×8×8=192 bits.

The autocorrelation value of a bit string CEL(x,y) for a offset value Offset is given by $$\text{autocorrelation value(Offset)} = \Sigma\Sigma COR(CEL(x,y), CELL(x,y\text{-offset}))$$

where the first Σ is the sum concerning x, and the second Σ is the sum concerning y. More specifically, all coordinate positions in the image are sequentially defined as a position of interest, and the sum of the correlation values between areas associated with the positions of interest and areas spaced from those areas by a distance offset in the y direction is calculated. The obtained value is the autocorrelation value (offset). This calculation requires the area size which is unknown when calculating the autocorrelation. Hence, a minimum size is determined in advance for the first area, and the autocorrelation is obtained using the minimum size as the temporary size of the first area.

For example, the autocorrelation value is calculated assuming that the size 6803 of the first area is 8 (dots), and the repetitive period 6804 is 8×3=24. The autocorrelation value has the peak when the offset=24, as shown in FIG. 48. The offset=24 at this time can be decided as the repetitive period 6804.

Next, the position and actual size of the first area 6801 are decided. The repetitive period of the first area is decided by calculating the autocorrelation value. It is then necessary to decide the position of the first area in the repetitive period and the size of the first area.

Figure 49:
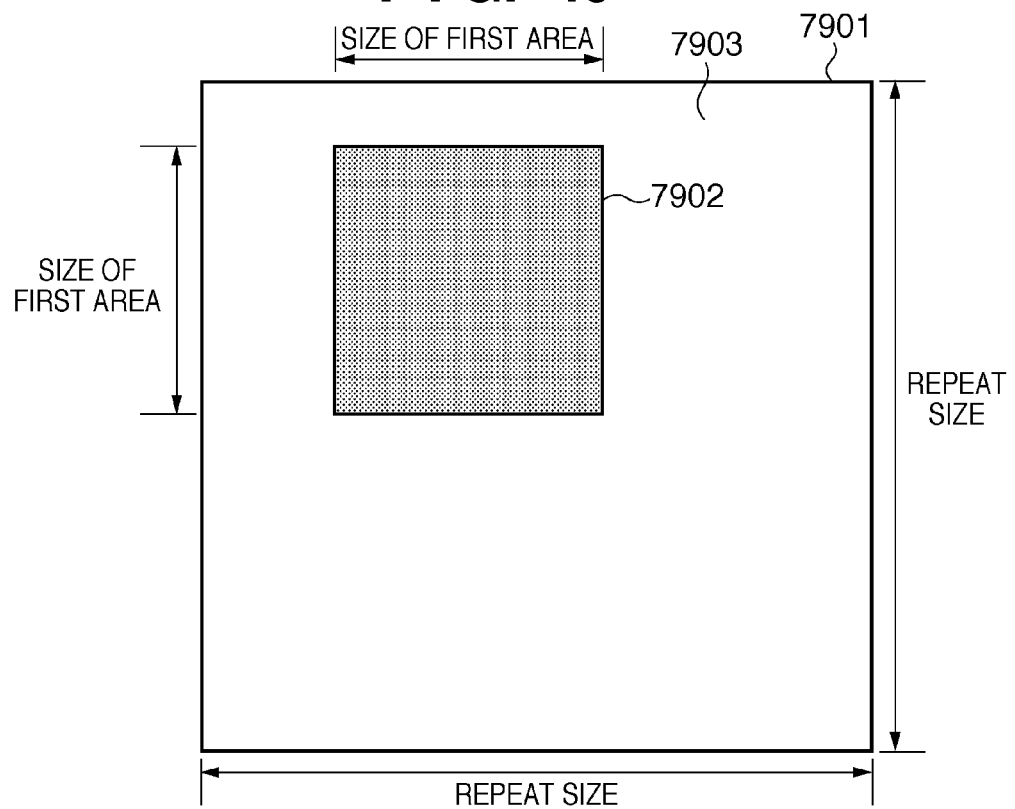
FIG. 49 is a schematic view showing a method of deciding the position of the first area.

FIG. 49 is a schematic view showing a method of deciding the position of the first area. Since the repetitive period is already decided, an area (height=width) corresponding to an arbitrary number of repetitive periods is extracted from the relative coordinate list storage unit 7006. The correlation value between the area and an adjacent area is calculated. Then, the correlation value with respect to the second adjacent area is calculated. This calculation is repeated. In a first area 7902, the same data appears at the repetitive period, and the correlation level is high. In a second area 7903 outside the first area, the same data does not appear at the repetitive period, and the correlation level is low. Using this characteristic, the start position of the high correlation portion can be specified as the start position of the first area. The size up to the end of the high correlation portion can be decided as the size of the first area.

<Decoding of First Area>

Data in the first area is decoded based on the thus determined position and size of the first area. In a single area, a measurement error or a determination error caused by noise may occur. To prevent this, the positions of dots written in all first areas are totaled, a mode is employed, and the occurrence probability of the value is calculated.

Figure 50:
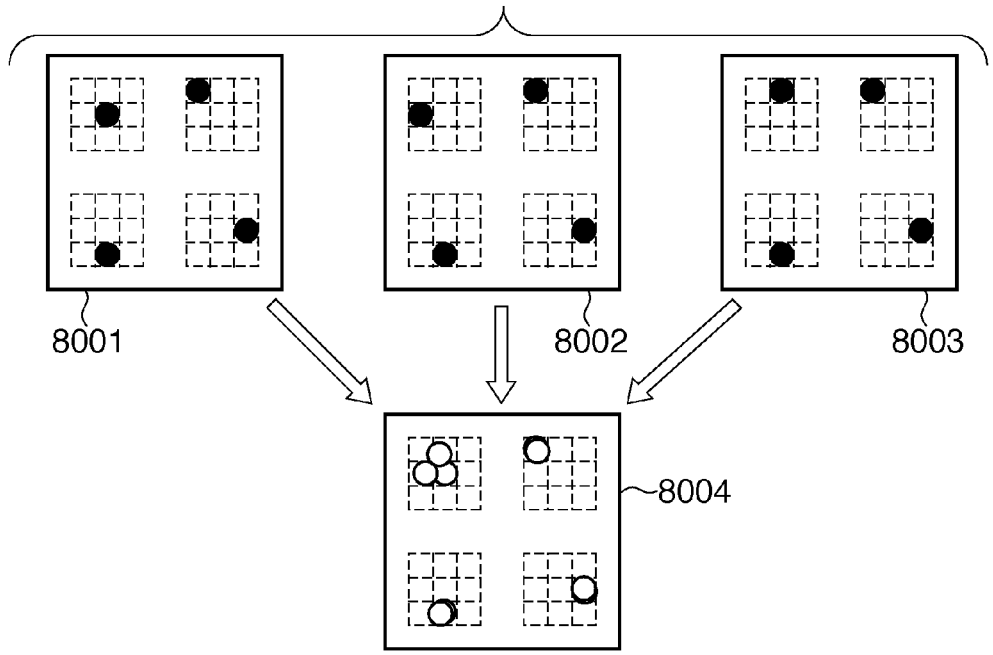
FIG. 50 is a schematic view for explaining totalization of the first area.

FIG. 50 is a schematic view for explaining first area totalization. Areas 8001 to 8003 are first areas written at different positions. These are superimposed to obtain a result 8004. Although shifts are generated by noise or errors, a mode that is decided by the totalization result of all areas can be employed.

Next, actual decoding is executed. Since the influence of noise and errors cannot be eliminated at this stage, error correction processing is performed for a decoding result. First, as described with reference to FIG. 43, displacements from grid points are extracted and converted into data corresponding to the displacement positions, thereby extracting a data sequence embedded in the first area. In addition copy prohibition data to be actually used, the data sequence includes an error correction code which is recorded upon embedding to detect data destruction and, if possible, recover the data. Many known methods are used for an error correction code. LDPC (Low Density Parity Check) is used here. The LDPC is known to have a very high error correction capability and exhibit a characteristic close to the Shannon limit. A detailed description of the LDPC will be omitted. Any method other than the LDPC is also usable if it has the characteristic of an error correction code. Use of an error correction code makes it possible to extract embedded data even when extracted grid points contain errors and noise to some extent.

As described in association with rotation angle correction, rotation angle correction processing is performed every 90°. Extracted data can be one of four kinds of data, that is, correct data or data obtained by rotating correct data by 90°, 180°, or 270°. Decoding with error correction by the LDPC is performed by estimation for the extracted data that is rotated by 0°, 90°, 180°, and 270°. Only at a correct rotation angle, the error correction code functions, and the data can normally be extracted.

Figure 52:
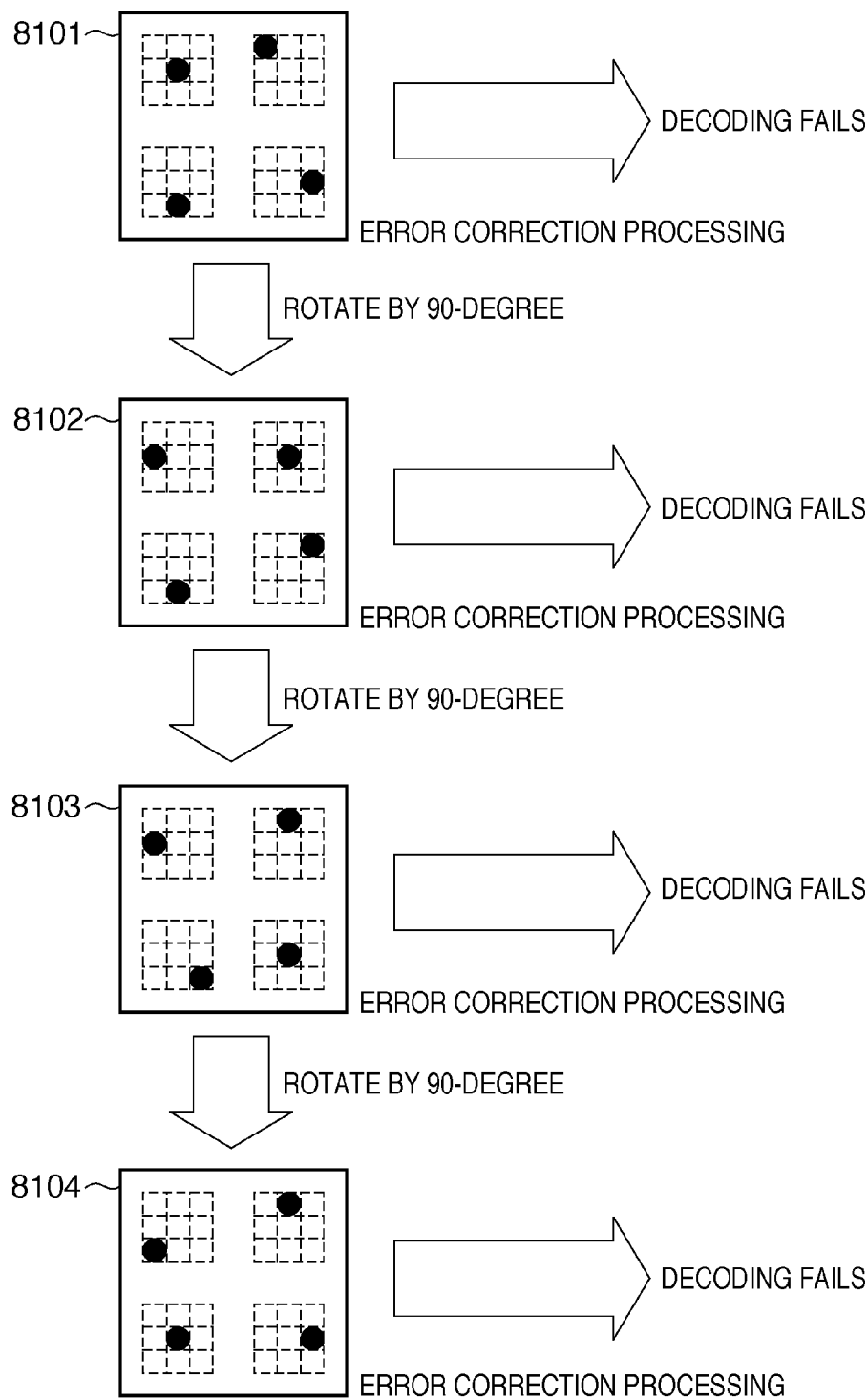
FIG. 52 is a view for explaining decoding processing with error correction considering rotation.

FIG. 52 is a view for explaining decoding processing with error correction considering rotation. Referring to FIG. 52, assume that a result rotated from correct data by 270° is extracted. In a pattern 8101, error correction processing is directly performed for the extracted data. Correct data includes an error correction code. However, the data is insignificant after rotation and cannot be error-corrected. In a pattern 8102, error correction processing is performed for data obtained by rotating the pattern 8101 by 90°. Error correction fails even in this case, and the data cannot be extracted. In a pattern 8103, error correction processing is performed for data obtained by rotating the pattern 8102 by 90°. Error correction still fails, and the data cannot be extracted. Finally, in a pattern 8104, error correction processing is performed for data obtained by rotating the pattern 8103 by 90°. Since the data is correct, error correction processing succeeds, and the data can be employed as extracted data. If error correction processing fails in the pattern 8104, data extraction may fail due to, for example, a lot of errors or noise. The above-described method enables to extract embedded data stored in the first area.

<Decision of Second Area>

The second area is used to register tracking information or the like which is not always necessary in a copy operation. If the information is unnecessary, decoding of the second area is omitted, thereby preventing slowdown of whole processing. A method of deciding the second area will be explained below.

Figure 53:
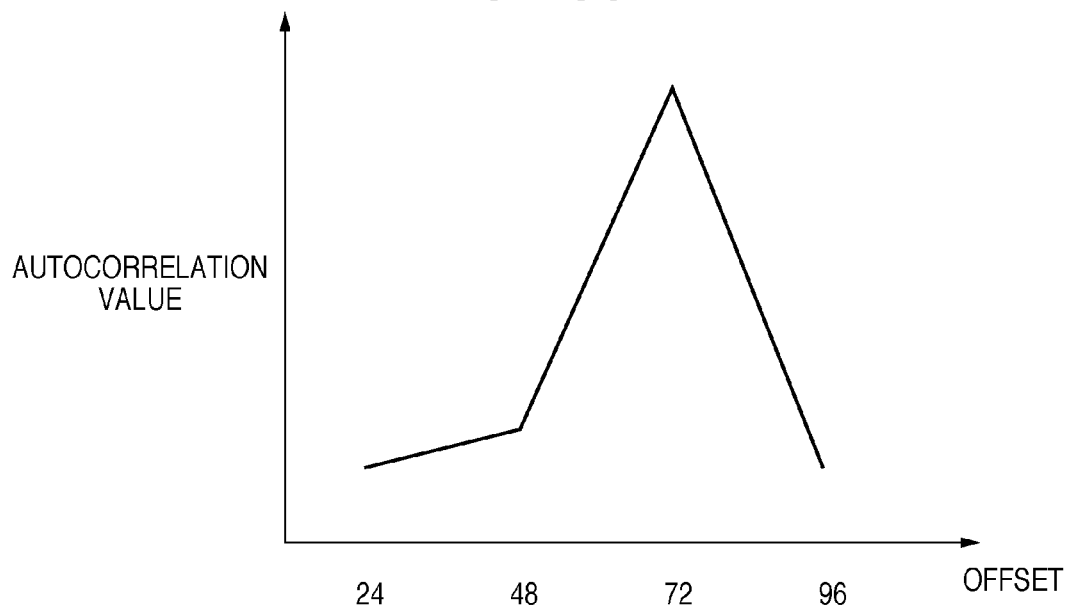
FIG. 53 is a graph showing an example of calculation of an autocorrelation value corresponding to an offset value in a second area.

Like the first area, the autocorrelation value of the second area is calculated first. The second area is embedded at a multiple of the repetitive period of the first area. Since an autocorrelation value can be calculated for each of the multiples (24, 48, 72, . . . in the example) of the repetitive count of the first area, the calculation can be omitted. The size of the second area equals the repetitive period. FIG. 53 is a graph showing an example of calculation of an autocorrelation value corresponding to an offset value in the second area. Finally, the start position of the second area is specified. Since the start position of a first area and that of the second area are synchronized at the time of embedding, the start position of the second area can be detected at one of the start positions of the first areas. To decide the position of the second area, an error correction code is used. Like the first area, the second area includes an error correction code in addition to embedded data. Since the size of the second area is known, error correction processing is sequentially performed by estimation from the start position of the first area.

Figure 54:
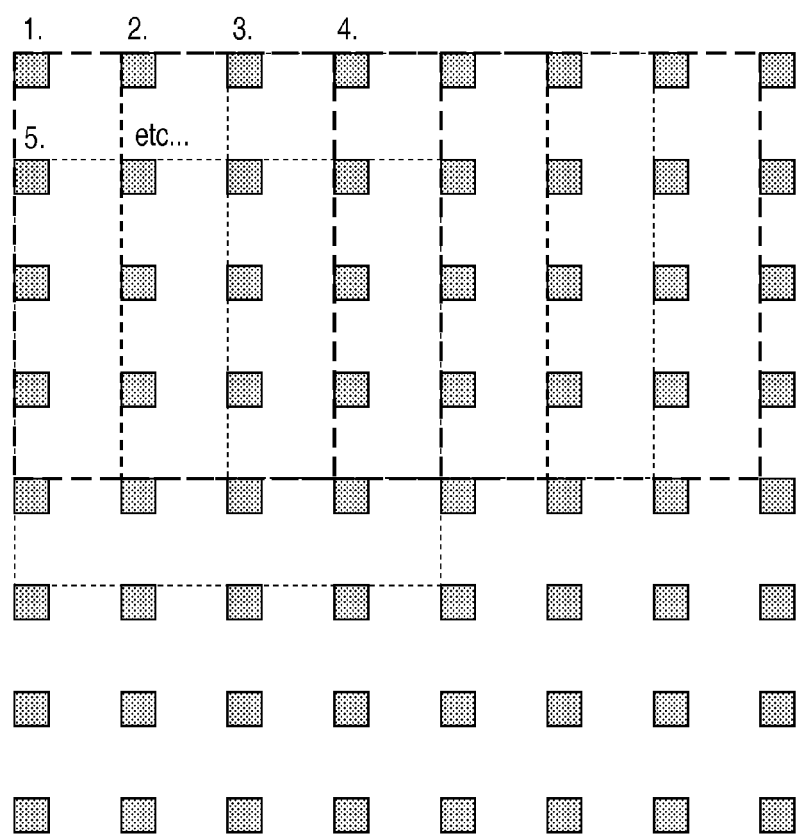
FIG. 54 is a schematic view for explaining a method of deciding the position of the second area.

FIG. 54 is a schematic view for explaining a method of deciding the position of the second area. FIG. 54 shows that the size of the second area is four times the repetitive period of the first area based on autocorrelation. One of 4×4=16 positions is the start position of the second area. Error correction processing is applied while shifting the position to 1, 2, 3, 4, 5, . . . . When error correction processing succeeds, that position can be employed as the start position of the second area. The above-described method enables to extract embedded data stored in the second area.

<Automatic Meta Information Embedded Copy-Forgery-Inhibited Pattern (Copy-Forgery-Inhibited Pattern Attached LVBC Pattern) Density Setting>

Figure 1:
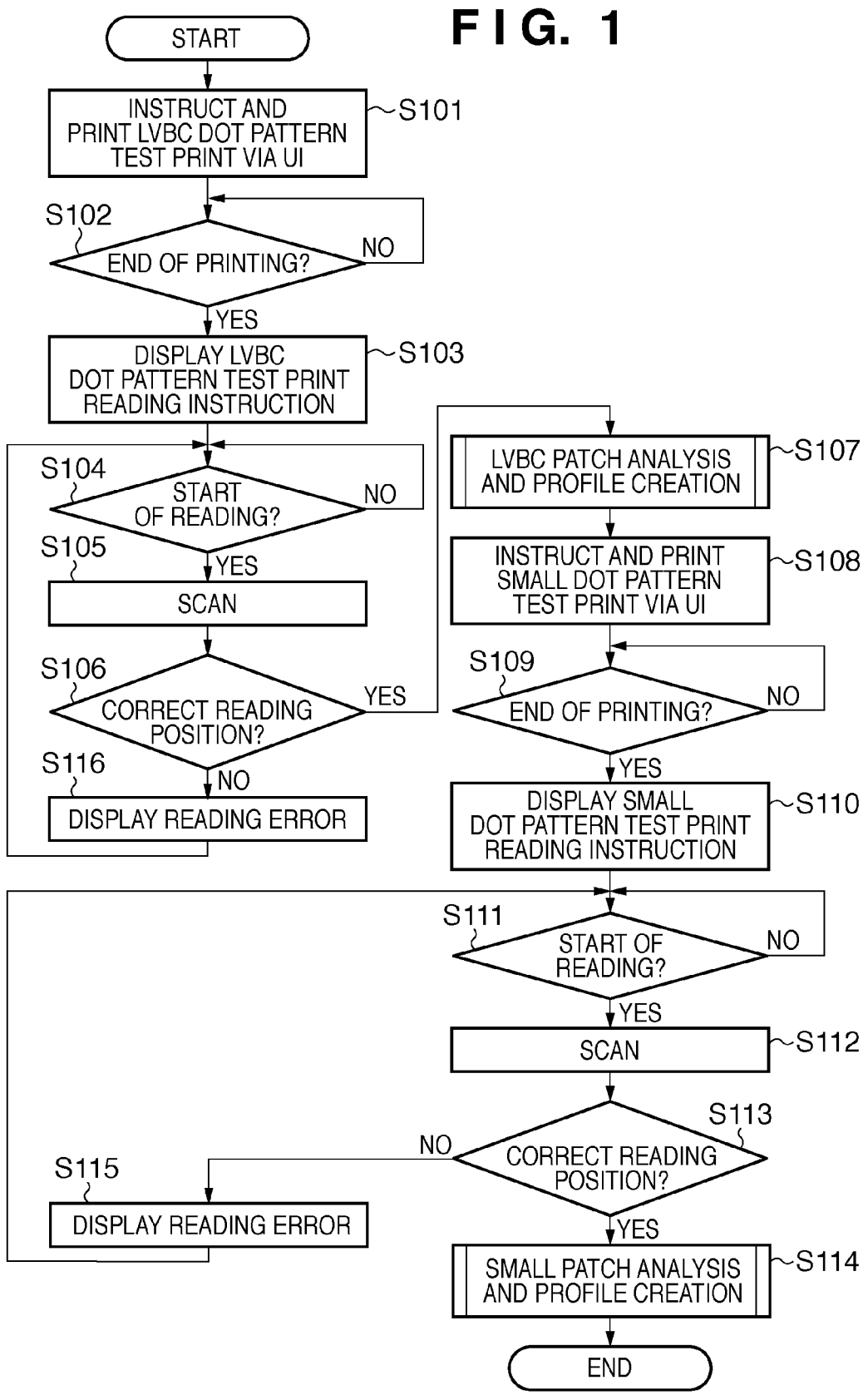
FIG. 1 is a flowchart for explaining an outline of an operation of executing automatic copy-forgery-inhibited pattern attached LVBC pattern density setting processing according to the first embodiment.

Automatic meta information embedded copy-forgery-inhibited pattern (to be referred to as a copy-forgery-inhibited pattern attached LVBC pattern hereinafter) density setting as the core of the present invention will be described below in detail. FIG. 1 is a flowchart for explaining an outline of an operation of executing automatic copy-forgery-inhibited pattern attached LVBC pattern density setting processing. A control program to implement the processing in FIG. 1 is stored in the ROM 5103 in FIG. 51 and executed by the CPU 5101.

In step S101, the user inputs an instruction via a UI to perform LVBC dot pattern test print.

An image 401 indicates the entire test print image. Patches 402 and 403 are used to determine whether a document is correctly placed. The two patches are detected, and the top/bottom of the image is determined based on the shape difference between the patches 402 and 403. If an inverted document is scanned, the image (image data) is rotated by 180°, thereby reading a correct test print image. A test pattern 404 indicates a test print image obtained by printing LVBC dot patterns 406 with different dot sizes. An LVBC dot pattern is a dot pattern used to print image data encoded by LVBC as an image. The test pattern includes a total of nine patches A to I. The patches form patch images including dots of different sizes. Note that encoded additional information is known in advance by storing it for calibration. The pieces of additional information added to the patterns A to I can be identical. A dot group 407 indicates the dot structures of the LVBC dot patterns of the patterns A to I. For example, the patch A is formed from dots A. A barcode 405 represents the ID, serial number, and network IP address representing the machine that has output the image, and its model.

Figure 5:
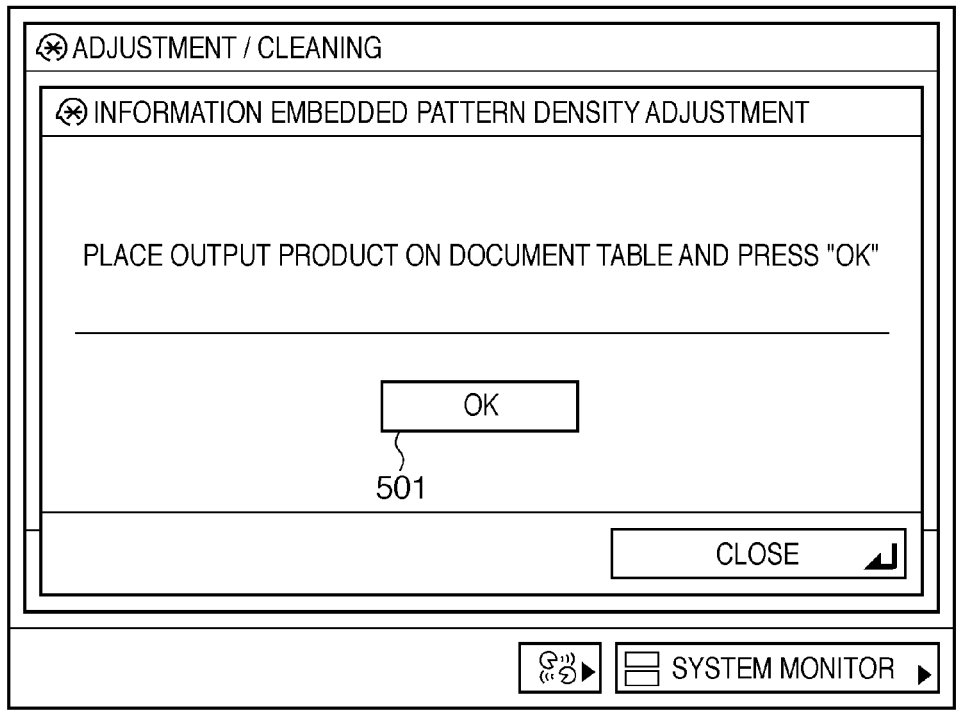
FIG. 5 is a view showing a GUI displayed upon pressing a start key.

In step S102, it is determined whether printing has ended. If printing has ended, an LVBC dot pattern test print read instruction is displayed on the UI (step S103). FIG. 5 shows a window to display the instruction operation in step S103. The operator places the printed test pattern sheet at a position where reading by the scanner is possible, and presses an OK button.

Figure 6:
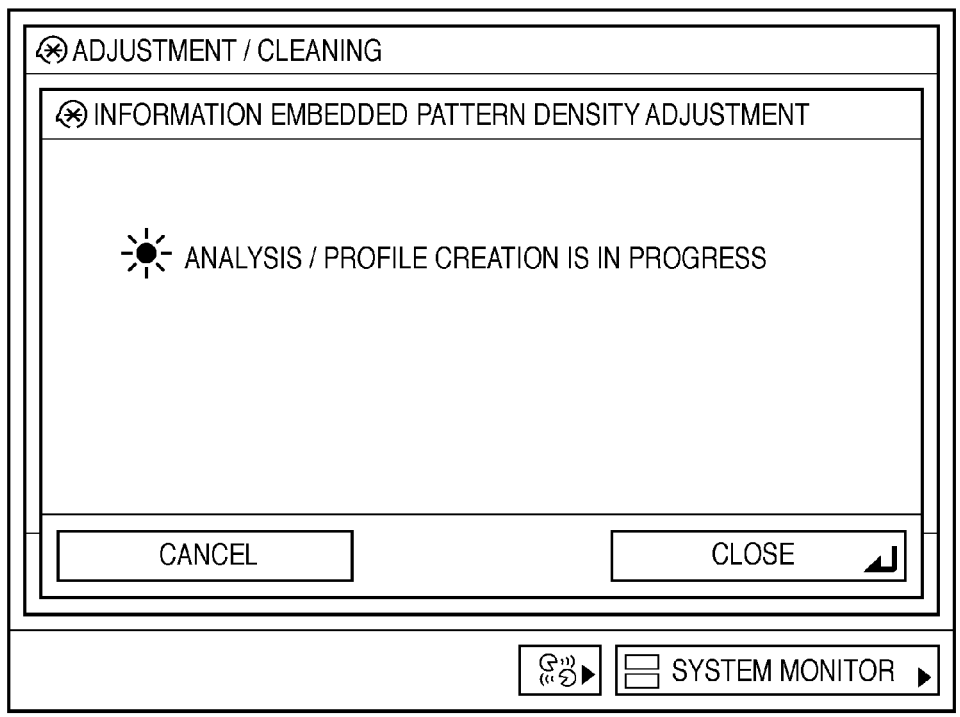
FIG. 6 is a view showing a GUI displayed upon pressing an OK key 501 shown in FIG. 5.

In step S104, it is determined whether the user has pressed an OK key 501 in FIG. 5. If the key is pressed, the LVBC dot pattern test print is scanned, and image data is input to the memory (step S105). In step S106, it is checked whether the reading direction is correct. This determination can be done using the patches 402 and 403 which are included in the LVBC dot pattern test print 401 to determine whether the reading direction is correct. If the patches 402 and 403 cannot be detected, the scanned image may be not an LVBC image. In this case, the UI in FIG. 5 is displayed again to request re-scanning (step S116). If it is determined in step S106 that the reading direction is correct, each LVBC dot pattern is analyzed, and its profile is created (step S107). FIG. 6 shows a window to display the operation in step S107. The operation in step S107 will be described later in detail with reference to FIG. 11.

It is possible to decide the LVBC dot pattern by executing the operation in steps S101 to S107.

In step S108, the user inputs an instruction via a UI to perform small dot pattern test print. FIG. 7 showing a window to display the operation of instructing small dot pattern density setting processing. When the user presses a start key 701, a preset small dot pattern test print image as shown in FIG. 8 is formed.

Referring to FIG. 8, an image 801 indicates the entire small dot test print image. Patches 802 and 803 are used to determine whether a document is correctly placed. The two patches are detected, and the top/bottom of the image is determined based on the shape difference between the patches 802 and 803. If an inverted document is scanned, the image is rotated by 180°, thereby reading a correct test print image. A pattern 804 is obtained by printing a small dot pattern 806 using a plurality of dot patterns held in advance. The test pattern includes a total of nine patterns a to i. A dot group 807 indicates the dot structures of the small dot patterns of the test patterns a to i. A barcode 805 represents the ID, serial number, and network IP address of the machine that has output the image, and its model.

In step S109, it is determined whether printing has ended. If printing has ended, a small dot pattern test print read instruction is displayed on the UI (step S110). FIG. 9 shows a window to display the instruction operation in step S110. The operator places the printed test pattern sheet at a position where reading by the scanner is possible, and presses an OK button. If the user has pressed an OK key 901 in FIG. 9 in step S111, the small dot pattern test print is scanned, and image data is input to the memory (step S112). In step S113, it is checked whether the reading direction is correct. This determination can be done using the patches 802 and 803 which are included in the small dot pattern test print 801 to determine whether the reading direction is correct. If the patches 802 and 803 cannot be detected, the scanned image may not be an LVBC image. In this case, the UI in FIG. 9 is displayed again to request re-scanning (step S115). If the reading position is correct in step S113, each small dot pattern is analyzed, and its profile is created (step S114). FIG. 10 shows a window to display the operation in step S114. The operation in step S114 will be described later in detail.

It is possible to decide the small dot pattern by executing the operation in steps S108 to S114.

If it is determined in step S106 that the patches cannot be read, a reading error is displayed on the UI to prompt the user to place the LVBC dot pattern test print image as the document again. The user is also prompted to correctly place the chart again if the barcode 405 of the LVBC dot pattern test print includes different model ID and serial number.

If it is determined in step S113 that the patches cannot be read, a reading error is displayed on the UI to prompt the user to place the small dot pattern test print image as the document again. The user is also prompted to correctly place the chart again if the barcode 805 of the small dot pattern test print includes different model ID and serial number.

With the above-described procedure, one of the patterns A to I in the dot pattern group 407 in FIG. 4 is decided as a dot pattern to be used to record dots encoded by the LVBC. Additionally, one of the patterns a to i in the dot pattern group 807 in FIG. 8 is decided as a dot pattern to be used to record dots that are not encoded by the LVBC.

<LVBC Dot Pattern Analysis and Profile Creation>

Figure 11:
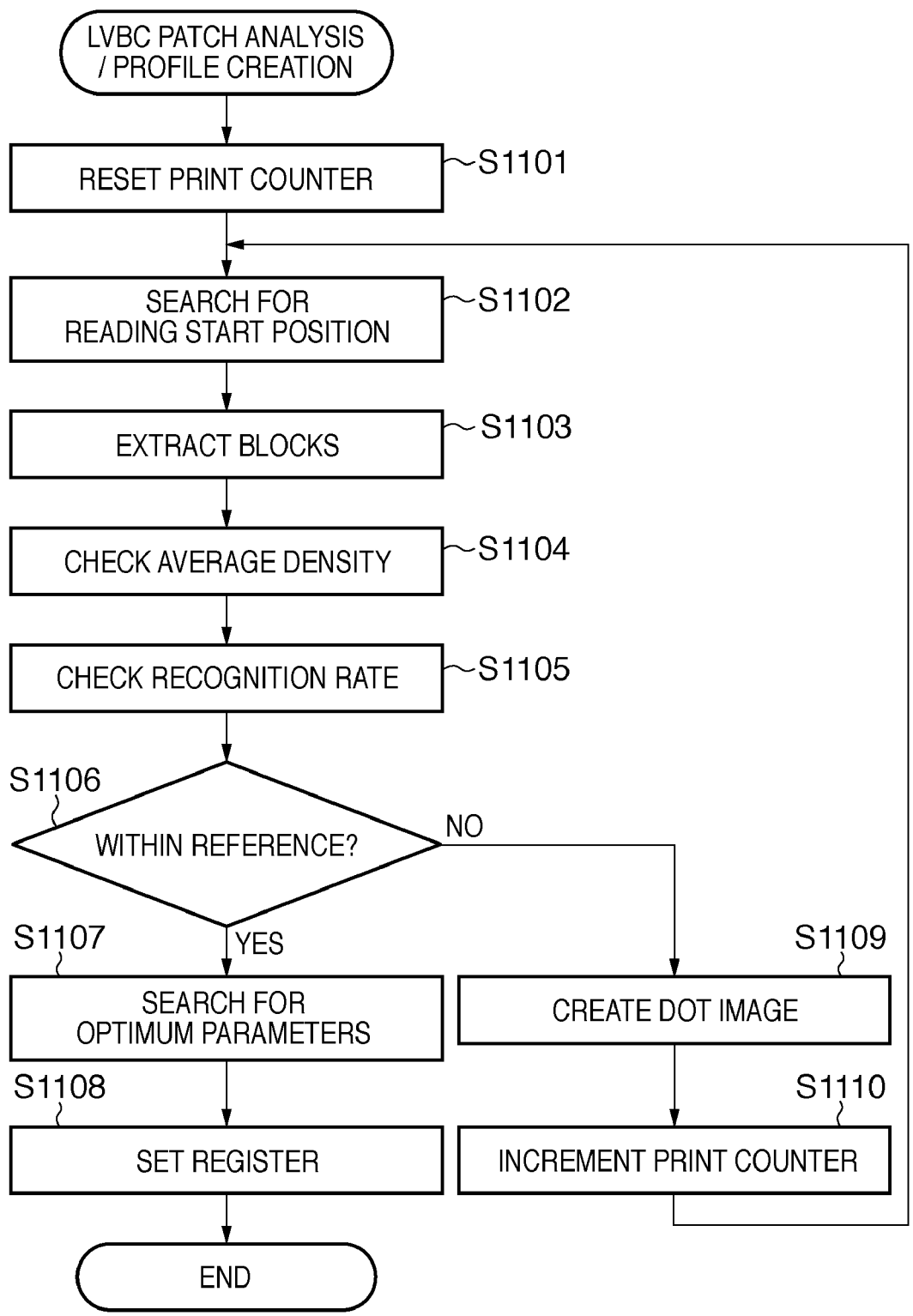
FIG. 11 is a flowchart for explaining an outline of an operation of executing LVBC dot pattern analysis and profile creation.

LVBC dot pattern analysis and profile creation in step S107 of FIG. 1 will be described in detail. FIG. 11 is a flowchart for explaining an outline of an operation of executing LVBC dot pattern analysis and profile creation. A control program to implement the processing in FIG. 11 is stored in the ROM 5103 and executed by the CPU 5101, as described above.

Figure 12:
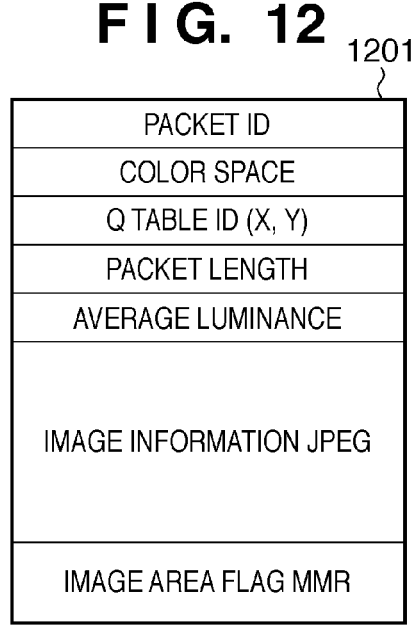
FIG. 12 is a view showing the structure of a packet image according to the first embodiment.
Figure 13:
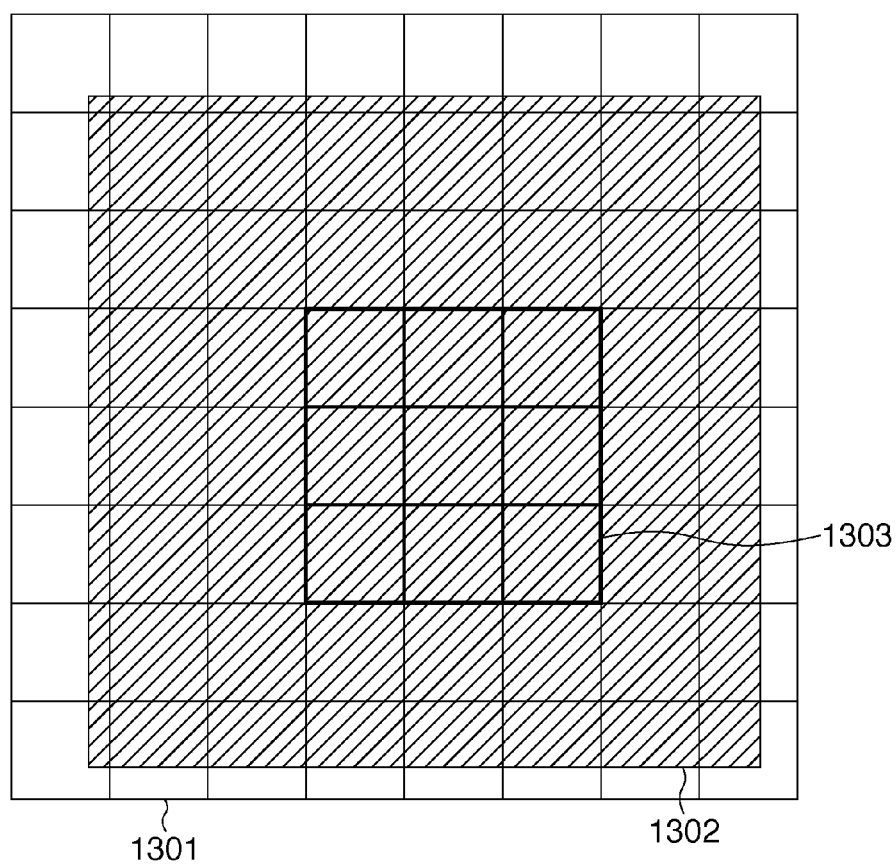
FIG. 13 is a view showing the relationship between a patch and a packet image according to the first embodiment.

In step S1101, a print counter is reset. Then, the reading start position is selected from the read image of the LVBC dot pattern test print 401 shown in FIG. 4 (step S1102). It is possible to logically determine the patch reading start position based on the arrangement of the patches 402 and 403 and the test pattern 404 in FIG. 4. The blocks of each patch pattern are extracted (step S1103). The average density of the LVBC dot pattern extracted in each block is checked (step S1104). The LVBC dot pattern test print 401 is held in the memory as image data having a packet structure for each image block as shown in FIG. 12. A packet 1201 in FIG. 12 includes the average luminance of a block. The density of a patch is measured using this information. The size of an image block stored in a packet is much smaller than the patch size. The position of each patch can logically be determined. Hence, the average density of the central portion of a patch is obtained based on average luminances stored in the packets of the plurality of blocks of the patch. FIG. 13 shows the relationship between a patch and block images stored in packets. One cell 1301 indicates one block. That is, the cell 1301 indicates an image area corresponding to one packet. A hatched area 1302 indicates a patch. Blocks 1303 indicated by a bold line correspond to packets located at the central portion of the patch. In step S1104, the average luminances of these blocks are simply arithmetically averaged, thereby calculating the average density of the patch.

The recognition rate of each LVBC dot pattern extracted for each block in step S1103 is checked in accordance with the LVBC analysis method shown in FIGS. 70 to 83 (step S1105). More specifically, additional information added to each dot pattern is decoded. The obtained additional information is compared with additional information stored in advance by trial. If the two pieces of additional information match each other, a recognition success is counted. If the pieces of additional information do not match each other, a failure is counted. Since a plurality of pieces of additional information can be embedded in each of the patterns A to I, additional information is decoded for different dots a predetermined number of times of trial. The ratio of count values of recognition success with respect to the total trial count is calculated as a recognition rate. The calculated recognition rate is stored. If three additional information bits are to be embedded, 1-bit additional information can be encoded per LVBC dot pattern. The additional information may be encoded for a plurality of dots, as a matter of course. The recognition rate is sometimes called a decoding success rate or a detection rate.

In step S1106, LVBC dot patterns that fall within a reference range are determined based on the average density of each LVBC dot pattern checked in step S1104 and the recognition rates checked in step S1105. FIG. 14 shows an example of average densities and recognition rates obtained for the LVBC dot patterns A to I in FIG. 4. In this example, the reference range is set to include a recognition rate of 85% to 100% and an average density of 0.13 to 0.17. If both the average density and the recognition rate of a dot pattern fall within the range of the reference density and reference recognition rate, the dot pattern is determined as appropriate (OK). Otherwise, the dot pattern is determined as inappropriate (NG). FIG. 14 shows patch numbers (identification names) obtained from the LVBC dot pattern test print in FIG. 4 and examples of determination results in correspondence with each other.

In step S1107, optimum parameters of each LVBC dot pattern determined as appropriate in step S1016 are searched for. Optimum parameters are the parameters of a dot pattern whose recognition rate and average density are closest to the ideal recognition rate (e.g., 100%) and ideal average density (e.g., 0.15). For example, the recognition rate and average density of each point are expressed by coordinates (recognition rate and average density). An ideal value Target is given by (Target_x, Target_y)=(1.0, 0.15). The distance between each patch pattern Patch and the ideal value is calculated by $$DM_{patch} = \sqrt{(Target\_x - Patch\_x)^2 + (Target\_y - Patch\_y)^2}$$

Out of the dot patterns whose distances are calculated by the above equation, a dot pattern having the minimum distance is determined as an optimum LVBC dot pattern. The identifier and average density of the pattern are set in a register (step S1108), and the processing ends. The obtained identifier and average density of the pattern are the necessary optimum parameters. The optimum LVBC dot pattern is used as a large dot pattern for recording.

Note that the optimum LVBC dot pattern need not always be the dot pattern having the minimum distance. It may be selected at random from a plurality of dot pattern within a predetermined distance from the ideal value Target.

On the other hand, if it is determined in step S1106 that no LVBC dot pattern falls within the reference range, LVBC dot pattern regeneration (i.e., patch regeneration) is executed (step S1109). After that, the print counter is incremented (step S1110), and the process returns to step S1102.

Figure 15:
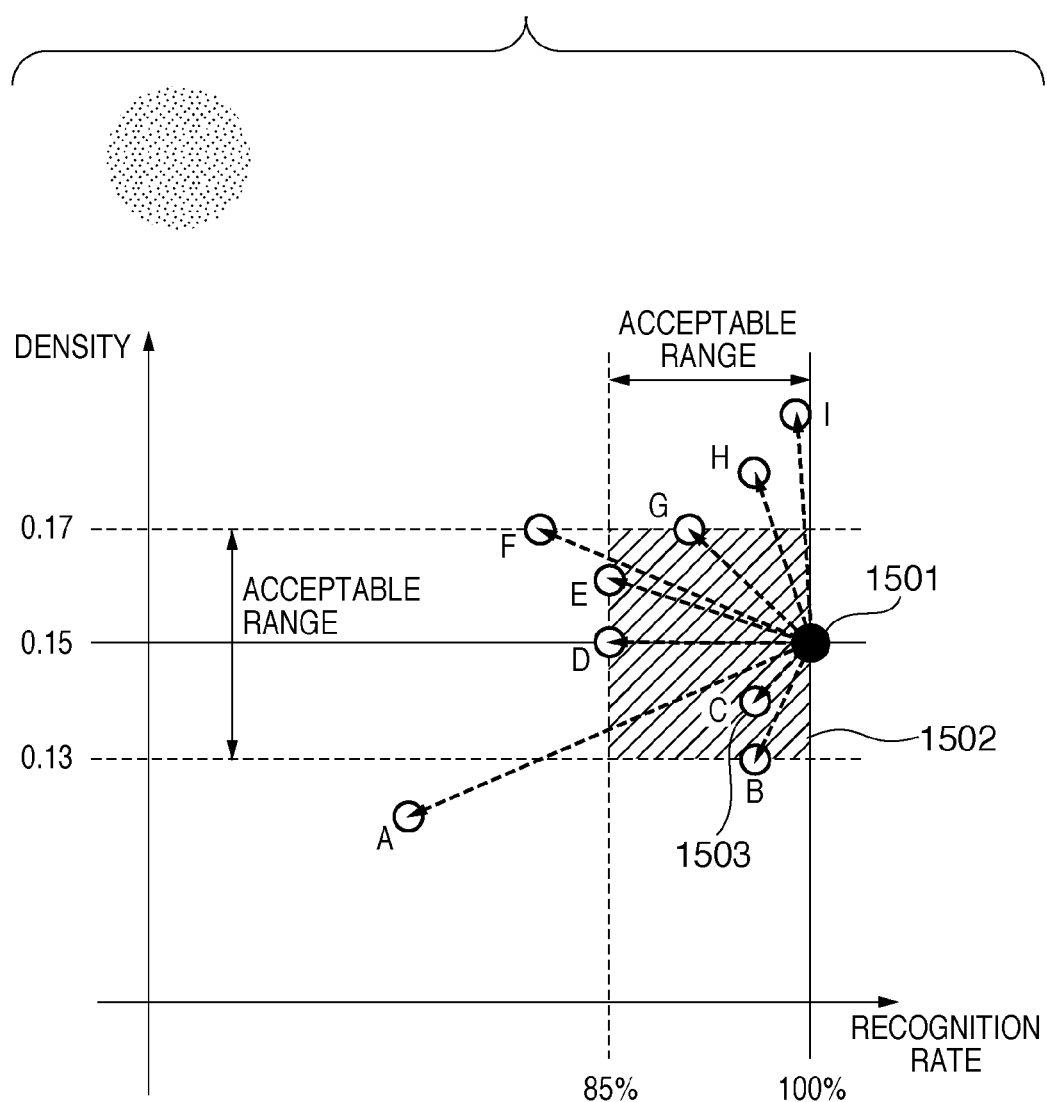
FIG. 15 is a conceptual view showing an optimum LVBC dot pattern selection operation according to the first embodiment.

FIG. 15 is a conceptual view showing the operation in step S1107. A position 1501 indicates the ideal value Target, an area 1502 indicates the reference range, and a position 1503 indicates the optimum LVBC dot pattern. Referring to FIG. 15, the dot pattern C of the LVBC dot pattern test print shown in FIG. 4 is closest to the ideal value Target. Hence, the dot pattern C is determined as the optimum dot pattern, and its parameters are stored (set).

<Small Dot Pattern Analysis and Profile Creation>

Figure 16:
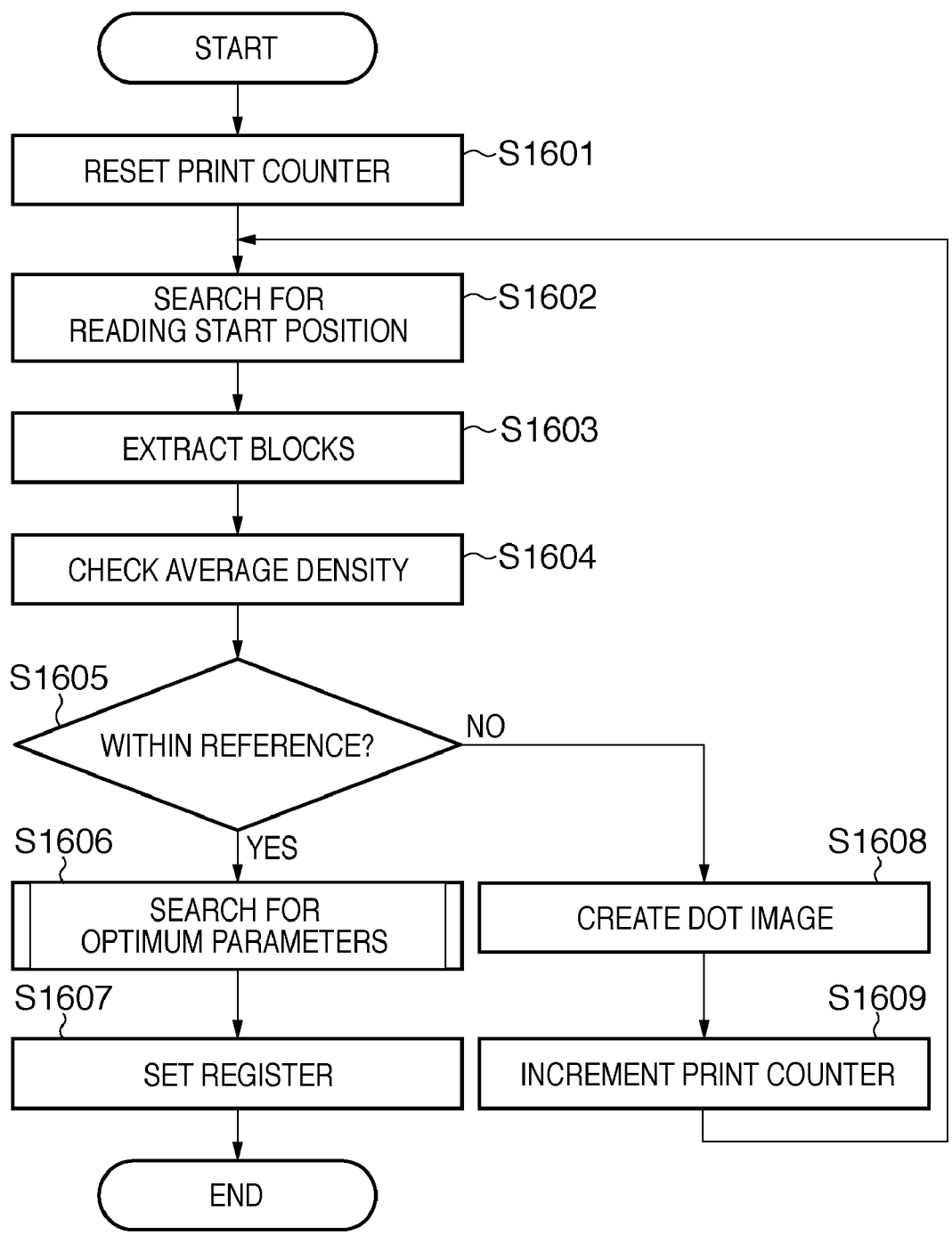
FIG. 16 is a flowchart for explaining an outline of an operation of executing small dot pattern analysis and profile creation.

Small dot pattern analysis and profile creation in step S114 of FIG. 1 will be described in detail. FIG. 16 is a flowchart for explaining an outline of an operation of executing small dot pattern analysis and profile creation. A control program to implement the processing in FIG. 16 is stored in the ROM 5103 and executed by the CPU 5101, as described above.

In step S1601, a print counter is reset. Then, the reading start position is selected from the read image of the small dot pattern test print 801 shown in FIG. 8 (step S1602). It is possible to logically determine the patch reading start position based on the arrangement of the patches 802 and 803 and the test pattern 804 in FIG. 4. The blocks of each patch pattern are extracted (step S1603). The average density of the small dot pattern extracted in each block is checked (step S1604). The average density measurement is the same as that in step S1104 of FIG. 11 described above, and a description thereof will not be repeated.

Figures 17, 18:
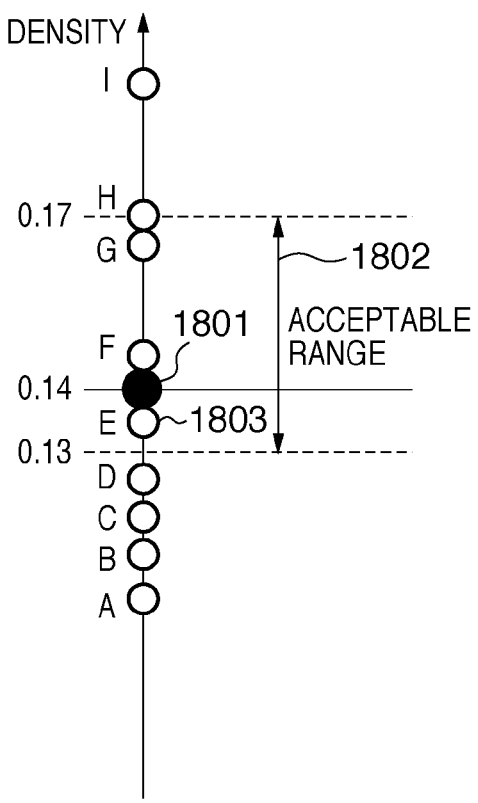
FIG. 17 is a view showing an example of patch numbers and determination results obtained from the small dot pattern test print in FIG. 8.
FIG. 18 is a conceptual view showing an optimum small dot pattern selection operation according to the first embodiment.

In step S1605, small dot patterns whose average densities are close to a predetermined density and, more particularly, a density of 0.15 that is suitable for a copy-forgery-inhibited pattern in this embodiment are extracted. FIG. 17 shows an example of patch numbers and determination results obtained from the small dot pattern test print in FIG. 8.

In step S1606, an optimum pattern is selected from the small dot patterns extracted in step S1605. When determining the optimum pattern, the average density of the optimum LVBC dot pattern calculated in FIGS. 11 to 15 is defined as the ideal average density. A dot pattern having a density lower than the ideal average density and a minimum distance is determined as the optimum dot pattern. For example, let Patch_d be the average density of each point, and Target_d be the ideal value. The distance from each patch pattern Patch is calculated by $$D_{patch} = |Target\_d - Patch\_d|$$

Out of the dot patterns whose distances are calculated by the above equation, a dot pattern having a low density (Target_d−Patch_d>0) and the minimum distance is determined as an optimum small dot pattern and set in a register (step S1607), and the processing ends.

On the other hand, if it is determined in step S1605 that no small dot pattern falls within the reference range, small dot pattern regeneration is executed (step S1608). After that, the print counter is incremented (step S1609), and the process returns to step S1602.

FIG. 18 is a conceptual view showing the operation in step S1606. A position 1801 indicates the ideal value Target_d, an area 1802 indicates the reference range, and a position 1803 indicates the optimum small dot pattern. Referring to FIG. 18, the small dot pattern e of the small dot pattern test print shown in FIG. 8 is set as the optimum pattern.

The above-described processing enables automatic copy-forgery-inhibited pattern attached LVBC pattern density setting. It is therefore possible to execute pattern setting that satisfies both the recognition rate of the LVBC dot pattern and the optimum density of the copy-forgery-inhibited pattern.

At the time of image formation, the image forming apparatus of this embodiment such as a digital MFP encodes a copy-forgery-inhibited pattern image using the LVBC to embed meta information such as an identifier to specify the user. The LVBC is particularly used to encode the large dot portion, that is, the foreground of the copy-forgery-inhibited pattern image. As the large dot pattern, a dot pattern having an identifier decided in accordance with the procedure in FIG. 1 is used. Meta information is encoded by changing the phase of a large dot with respect to the center of a grid point. A small dot portion, that is, the background area uses a dot pattern decided in accordance with the procedure in FIG. 1. Different pieces of meta information are embedded in dots of the first area and the second area.

In a thus formed copy-forgery-inhibited pattern image, that is, copy restraint image, the large dot portion (latent image) and the small dot portion (background) have almost the same average density. For this reason, a human eye can hardly recognize the copy-forgery-inhibited pattern image. On the other hand, an LVBC is encoded using large dots whose recognition rate is checked and guaranteed in advance. Hence, embedded meta information also has a high recognition rate. As described above, the image forming apparatus of this embodiment can meet two contradictory requirements, that is, raising the recognition rate of code information embedded in a meta information embedded image and improving the quality of a copy-forgery-inhibited pattern image. The copy-forgery-inhibited pattern image is combined as the background of a print target image, thereby generating a print image.

Second Embodiment

In the first embodiment, the LVBC dot patterns 404 in the LVBC dot pattern test print 401 and the small dot patterns 804 in the small dot pattern test print 801 are different patterns. An optimum patch is selected from the printed patterns. However, when different patterns are printed in one page, the density may vary due to uneven printing depending on the print position. In the second embodiment, a plurality of identical patterns are arranged in one page to reduce the influence of density variations caused by uneven printing.

Figure 19:
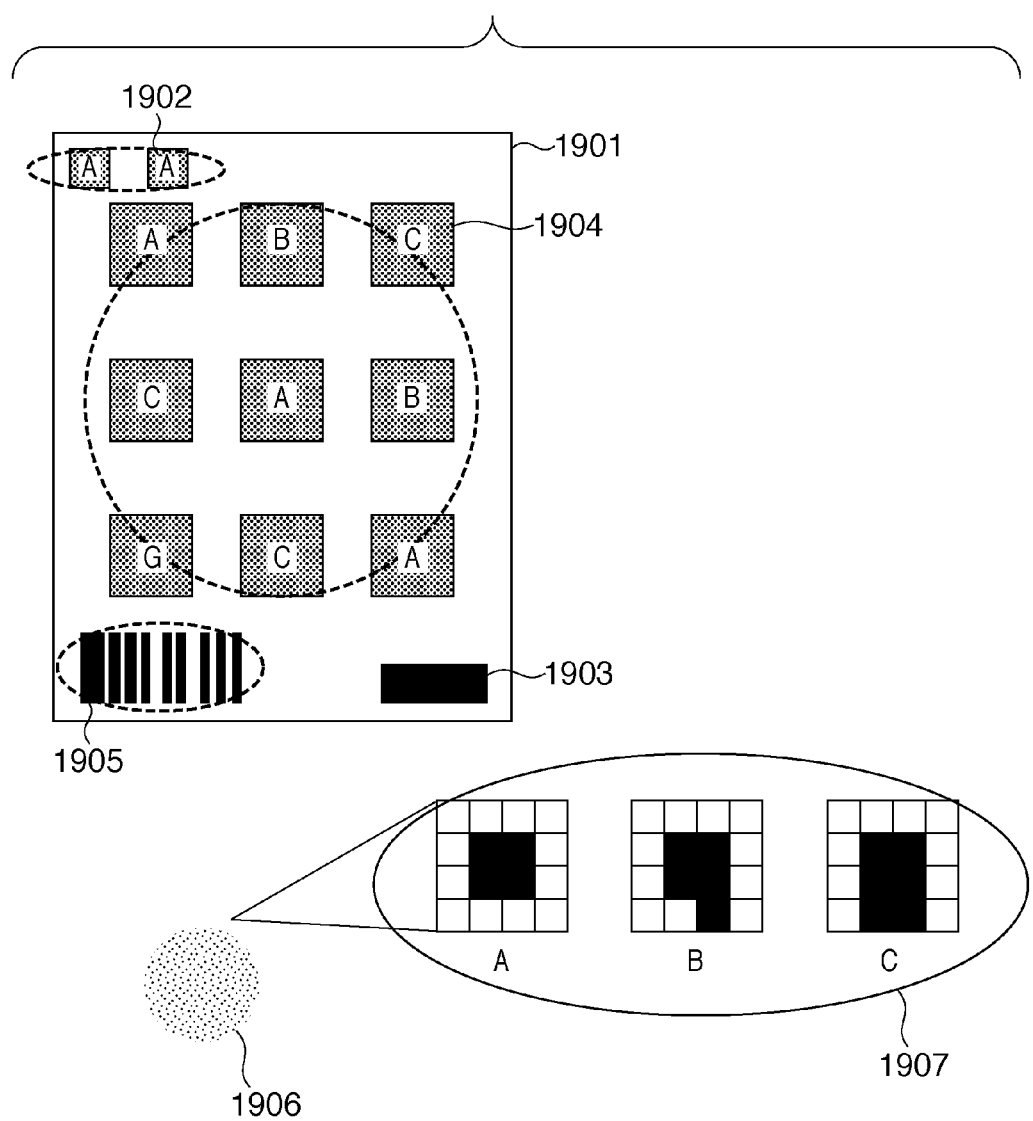
FIG. 19 is a view showing an example of an LVBC dot pattern test print according to the second embodiment.
Figure 20:
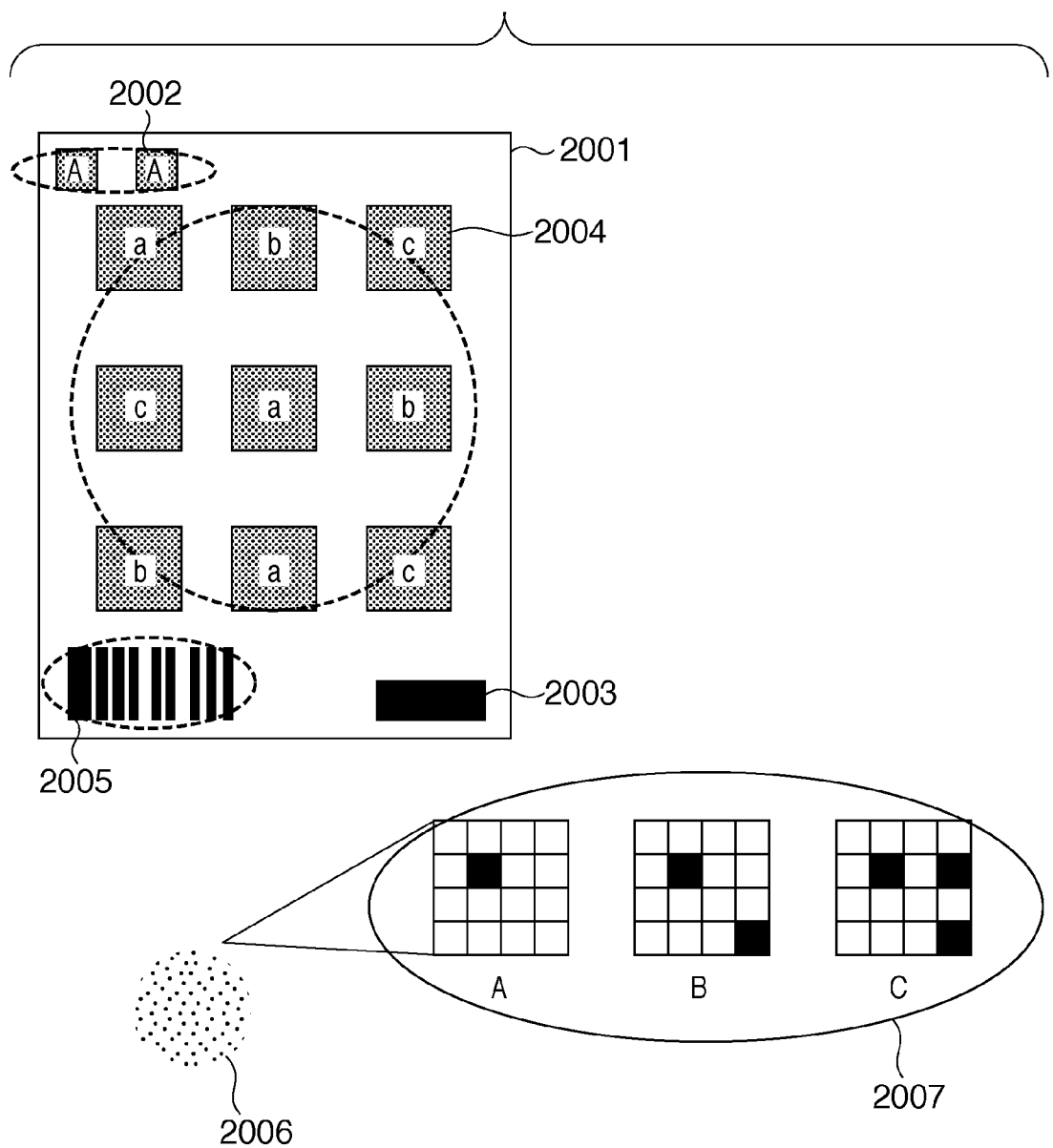
FIG. 20 is a view showing an example of a small dot pattern test print according to the second embodiment.

FIGS. 19 and 20 are views showing an LVBC dot pattern test print and a small dot pattern test print, respectively. Unlike the first embodiment, three patches of each of three kinds of dot patterns A to C or dot patterns a to c are arranged in one page. The calibration processing operation is the same as in the first embodiment, and a description of its outline will not be repeated.

The above-described operation allows calculating a recognition rate and average density by averaging a plurality of patches. It is therefore possible to reduce the influence of density changes caused by uneven printing.

Third Embodiment

In this embodiment, the user can select the test print used in the first embodiment or that used in the second embodiment as needed. The same step numbers as in the first and second embodiments denote the same processes in the third embodiment, and a description of its outline will be omitted.

Figure 21:
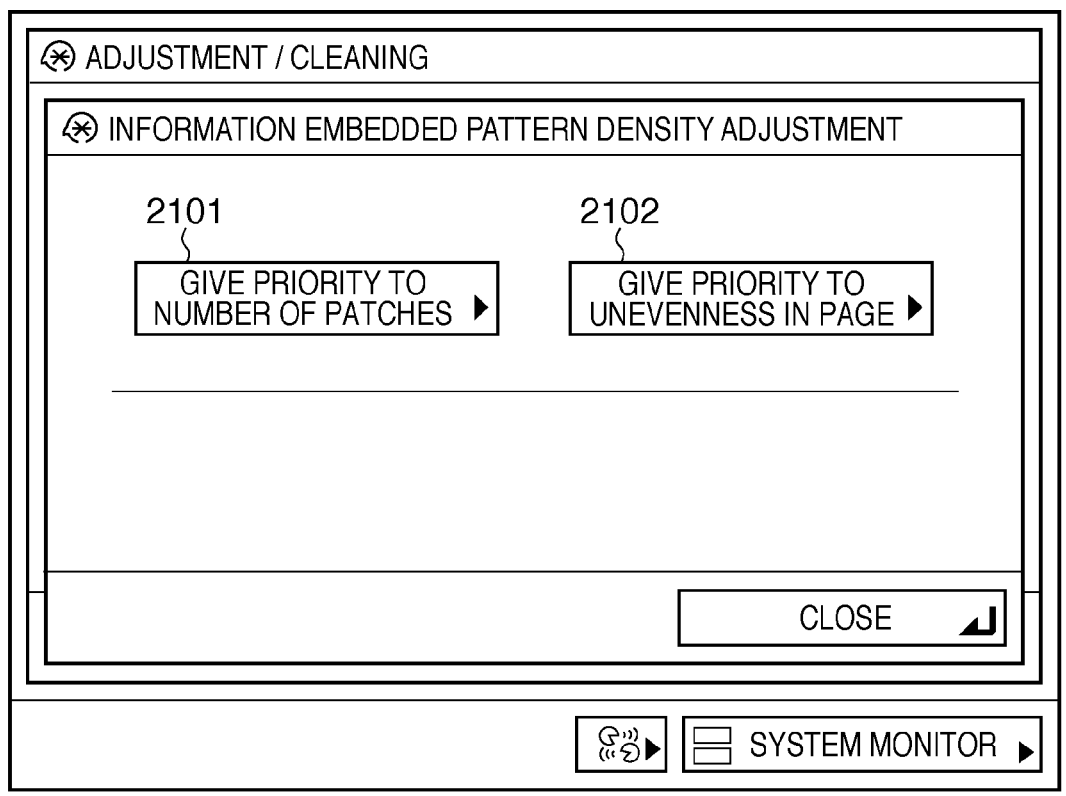
FIG. 21 is a view showing a GUI displayed upon pressing an automatic adjustment key according to the third embodiment.

FIG. 21 shows a window displayed by pressing an automatic adjustment key in the operation of step S101 described in the first embodiment. Referring to FIG. 21, to give priority to the patch count, a user presses a patch count priority key 2101. To give priority to absorption of unevenness in a page, the user presses an unevenness in page priority key 2102. When the user presses the patch count priority key 2101, the UI is displayed. When the user presses a start key 301, an LVBC dot pattern test print image shown in FIG. 4 with priority on the patch count is formed in step S102, and a small dot pattern test print image shown in FIG. 8 is formed in step S109.

When the user presses the unevenness in page priority key 2102 in FIG. 21, the UI is displayed. When the user presses the start key 301, an LVBC dot pattern test print image shown in FIG. 19 with priority on unevenness in a page is formed in step S102, and a small dot pattern test print image shown in FIG. 20 is formed in step S109.

The above-described operation allows the user to select a test print to be used as needed.

Fourth Embodiment

In this embodiment, a method will be described in which if one of image forming apparatuses 4404 and 4405 has no scanner function, automatic copy-forgery-inhibited pattern attached LVBC pattern density setting is implemented by cooperation with an image forming apparatus having a scanner function. In this embodiment, assume that the image forming apparatus 4405 has no scanner function. The same step numbers as in the first embodiment denote the same processes in the fourth embodiment, and a description of its outline will be omitted. The image forming apparatuses 4404 and 4405 can register print instructions and patch numbers via a LAN 4406.

Figure 22:
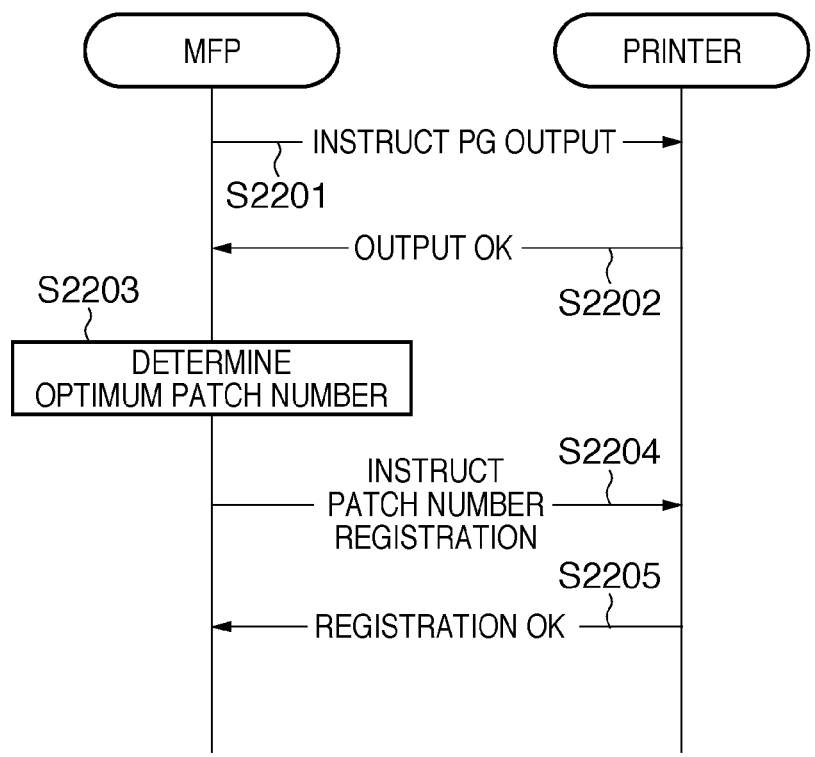
FIG. 22 is a sequence chart for explaining an outline of an operation according to the fourth embodiment.

FIG. 22 is a sequence chart for explaining an outline of an operation according to the fourth embodiment. In this embodiment, assume that the image forming apparatus 4404 is an MFP, and the image forming apparatus 4405 is a printer. A control program to implement the processing in FIG. 22 is stored in a ROM 5103 and executed by a CPU 5101, as described above.

In step S2201, the MFP 4404 sends an instruction from its UI to the printer 4405 in accordance with, for example, an operator instruction so that the printer executes test print.

In step S2202, the printer 4405 returns an output OK. Then, the MFP executes optimum patch number determination processing (step S2203). The processing operation in step S2203 is the same as that in FIG. 1 described in the first embodiment except printing and printing completion determination, and a description thereof will not be repeated. In the fourth embodiment, processing of large dots and that of small dots are executed at once.

When an optimum patch is selected from the processing result in step S2203, the MFP 4404 instructs the printer 4405 to register the patch pattern (step S2204). If the patch pattern is normally registered in the printer 4405 as a result of step S2204, the printer 4405 returns a registration OK to the MFP 4404 (step S2205), and the processing ends. On the other hand, if it is determined in the process of step S2203 that the IP address of the printer 4405 which has read the test print does not match the IP address in the barcode printed on the test print, a window is displayed.

Even when an image forming apparatus includes no scanner, the above-described operation enables automatic copy-forgery-inhibited pattern attached LVBC pattern density correction by cooperation with another image forming apparatus having a scanner function.

Fifth Embodiment

In the first embodiment, a search of an optimum LVBC dot pattern is executed based on an ideal value derived from the relationship between a preset average density and recognition rate. In the fifth embodiment, an ideal value Target is changed in accordance with an image quality priority mode or a recognition rate priority mode, and an optimum LVBC dot pattern corresponding to the mode is decided. The same step numbers as in the first embodiment denote the same processes in the fifth embodiment, and a description of its outline will be omitted.

Figure 27:
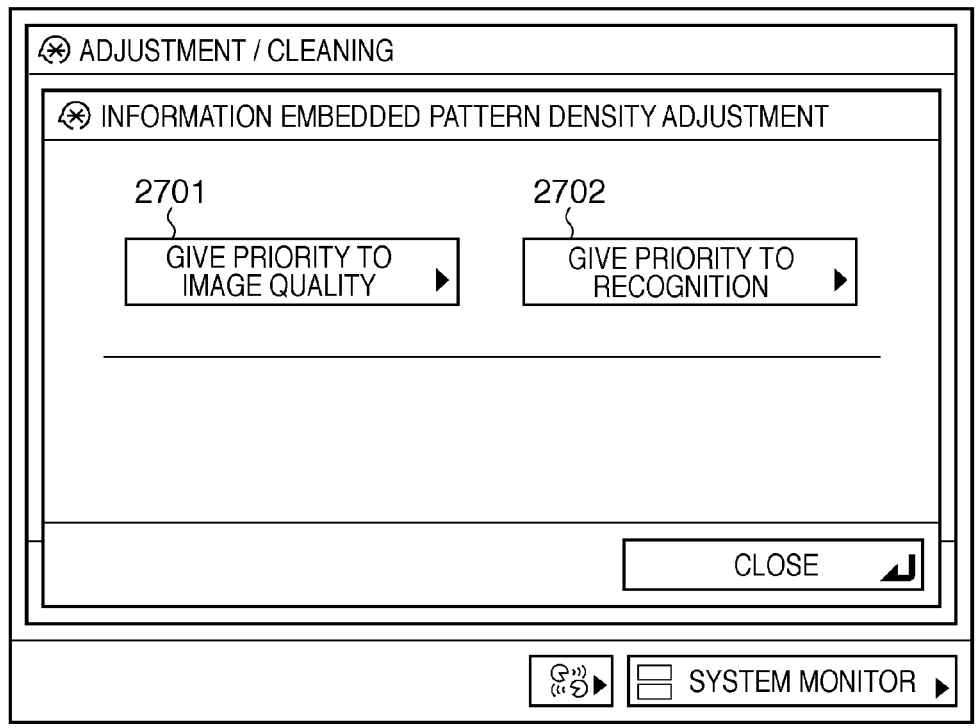
FIG. 27 is a view showing a GUI displayed upon pressing an automatic adjustment key according to the fifth embodiment.

FIG. 27 shows a window displayed by pressing an automatic adjustment key in the operation of step S101 in FIG. 1 described in the first embodiment. Referring to FIG. 27, to give priority to the image quality, that is, to print a copy-forgery-inhibited pattern attached LVBC pattern on a document as unnoticeable as possible, a user presses an image quality priority key 2701. To give priority to the detection rate, that is, to raise the recognition rate of a document in which a copy-forgery-inhibited pattern attached LVBC pattern is embedded, the user presses a recognition priority key 2702. After that, the operation in steps S102 to S114 of FIG. 1 described in the first embodiment is performed.

<LVBC Dot Pattern Analysis and Profile Creation in Image Quality Priority Mode>

Figure 28:
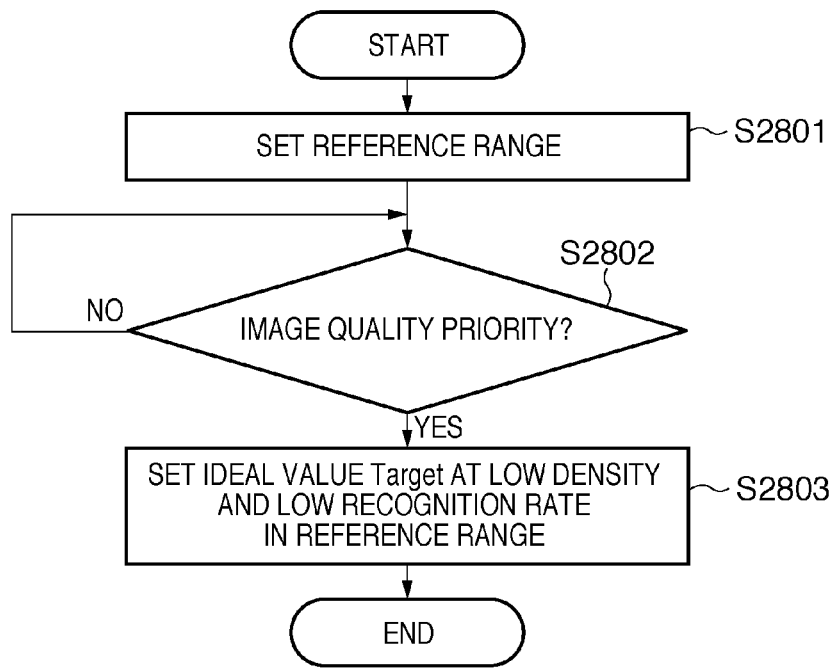
FIG. 28 is a flowchart for explaining an outline of an operation of executing an optimum LVBC dot parameter search in an image quality priority mode according to the fifth embodiment.

LVBC dot pattern analysis and profile creation when the user has pressed the image quality priority key 2701 in FIG. 27 will be described in detail. The fifth embodiment is different from the first embodiment in the optimum parameter search method in step S1107 of FIG. 11. FIG. 28 is a flowchart for explaining an outline of an operation of executing an optimum parameter search in step S1107 of this embodiment. A control program to implement the processing in FIG. 28 is stored in a ROM 5103 and executed by a CPU 5101, as described above.

In step S2801, a reference range is set. In this embodiment, an example of a reference range includes a recognition rate of 85% to 100% and an average density of 0.13 to 0.17. These values are merely examples. For example, image formation is attempted while changing the recognition rate and average density by trial and error. The acceptable range (predetermined range) of the recognition rate and average density determined to fall within a tolerance is set as the reference range. The recognition rate and average density of each point within the reference range are expressed by coordinates (recognition rate and average density). The reference range is defined by a polygon having four vertices represented by (Area$A\_x$,Area$A\_y$)=(0.85,0.17)

(Area$B\_x$,Area$B\_y$)=(0.85,0.13)

(Area$C\_x$,Area$C\_y$)=(1.0,0.13)

(Area$D\_x$,Area$D\_y$)=(1.0,0.17)

Next, it is determined whether the user has pressed the image quality priority key 2701 shown in FIG. 27 (step S2802). If the user has pressed the image quality priority key, the ideal value is set at a point having the lowest density and lowest recognition rate within the reference range (step S2803). As a result, the ideal value Target is set at AreaB which is expressed by (Target_x, Target_y)=(0.85, 0.13). The distance from each patch pattern Patch is calculated by $$DM_{patch}=\sqrt{(Target\_x-Patch\_x)^2+(Target\_y-Patch\_y)^2}$$

Out of the dot patterns whose distances from the ideal value are calculated by the above equation, a dot pattern having the minimum distance is determined as an optimum LVBC dot pattern.

Figure 29:
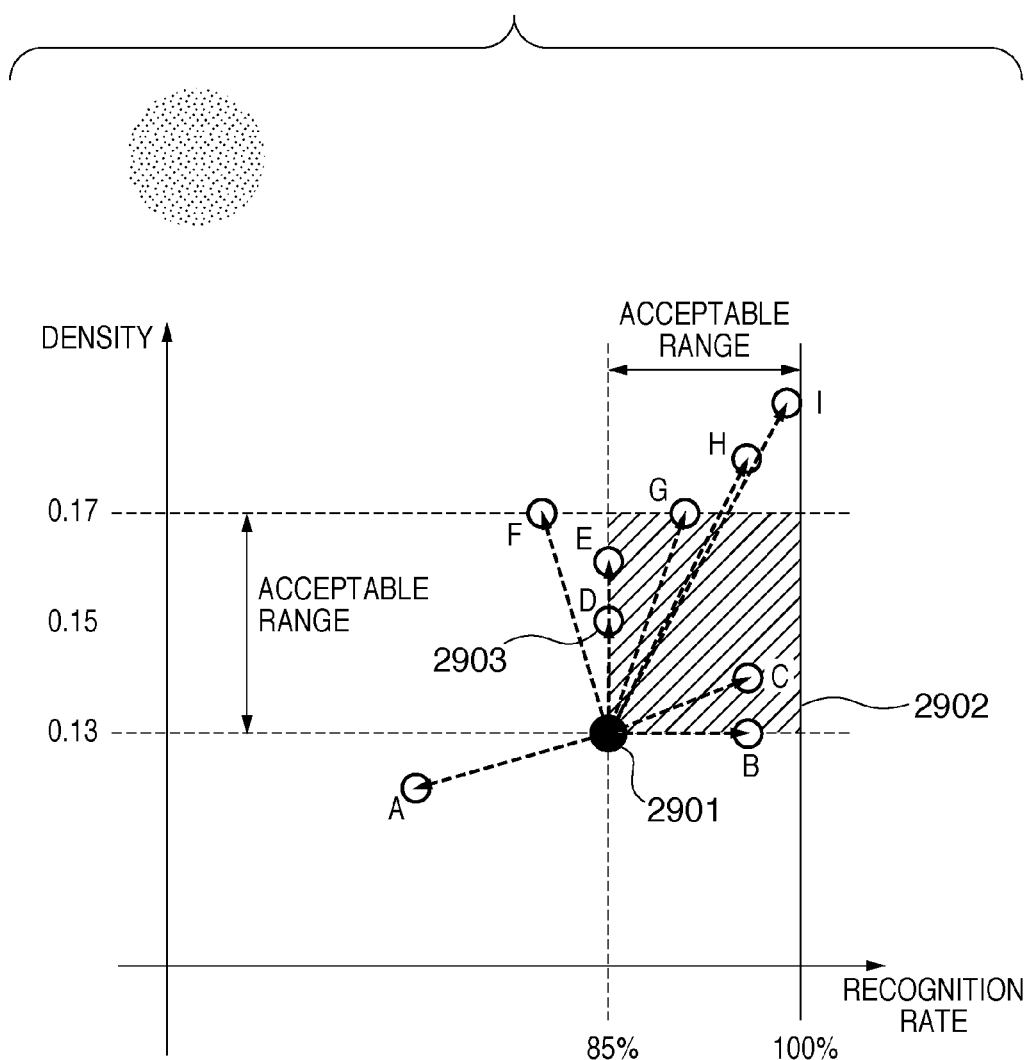
FIG. 29 is a conceptual view showing an optimum LVBC dot pattern selection operation in the image quality priority mode according to the fifth embodiment.

FIG. 29 is a conceptual view showing the operation in step S1107 of this embodiment. A point 2901 indicates the ideal value Target, an area 2902 indicates the reference range, and a point 2903 indicates the optimum LVBC dot pattern. Referring to FIG. 29, an LVBC dot pattern 404 generated based on a pattern D in an LVBC dot pattern test print shown in FIG. 4 is determined as the optimum pattern, and its parameters, in particular, the identifier of the dot pattern is stored.

<LVBC Dot Pattern Analysis and Profile Creation in Recognition Priority Mode>

LVBC dot pattern analysis and profile creation when the user has pressed the recognition priority key 2702 in FIG. 27 will be described in detail. The fifth embodiment is different from the first embodiment in the optimum parameter search method in step S1107 of FIG. 11.

Figure 30:
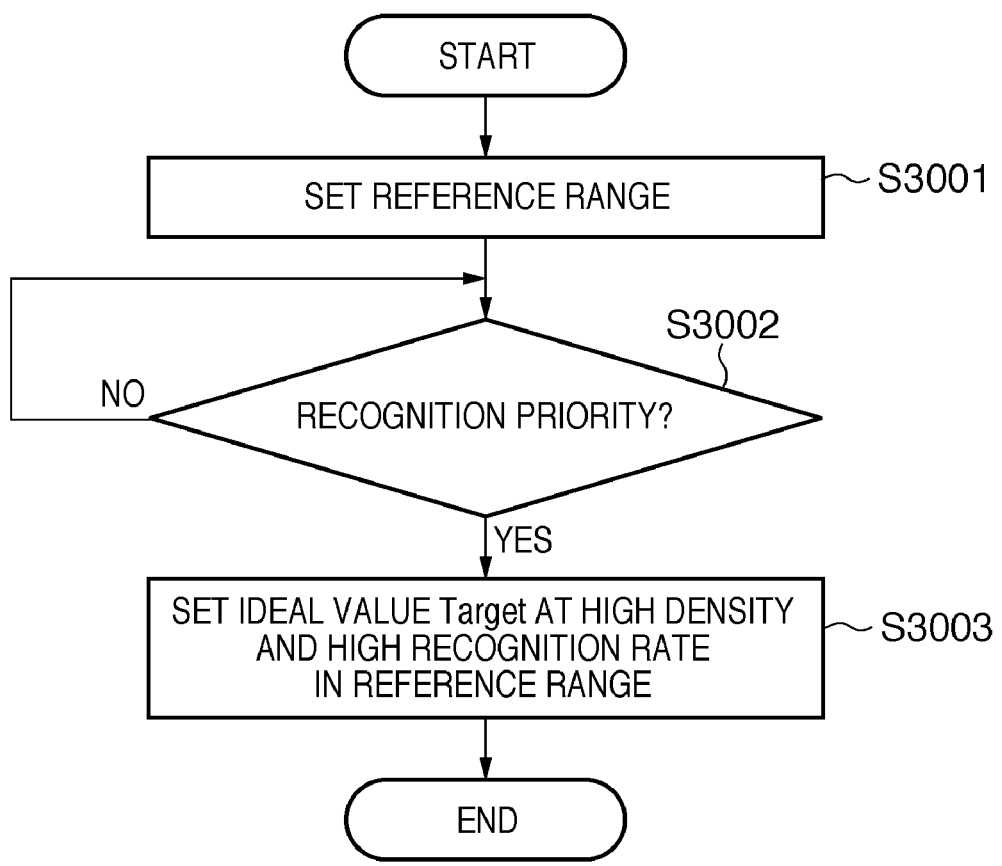
FIG. 30 is a flowchart for explaining an outline of an operation of executing an optimum LVBC dot parameter search in a recognition priority mode according to the fifth embodiment.

FIG. 30 is a flowchart for explaining an outline of an operation of executing an optimum parameter search in step S1107 of this embodiment. A control program to implement the processing in FIG. 30 is stored in the ROM 5103 and executed by the CPU 5101, as described above. In step S3001, a reference range is set. In this embodiment, an example of a reference range includes a recognition rate of 85% to 100% and an average density of 0.13 to 0.17. The recognition rate and average density of each point are expressed by coordinates (recognition rate and average density). The reference range is defined by four points represented by (Area$A\_x$,Area$A\_y$)=(0.85,0.17)

(Area$B\_x$,Area$B\_y$)=(0.85,0.13)

(Area$C\_x$,Area$C\_y$)=(1.0,0.13)

(Area$D\_x$,Area$D\_y$)=(1.0,0.17)

Next, it is determined whether the user has pressed the recognition priority key 2702 shown in FIG. 27 (step S3002). If the user has pressed the recognition priority key, the ideal value Target is set at a point having the highest density and highest recognition rate within the reference range (step S3003). As a result, the ideal value Target is set at AreaB which is expressed by (Target_x, Target_y)=(1.0, 0.17). The distance from each patch pattern Patch is calculated by $$DM_{patch}=\sqrt{(Target\_x-Patch\_x)^2+(Target\_y-Patch\_y)^2}$$

Out of the dot patterns whose distances from the ideal value are calculated by the above equation, a dot pattern having the minimum distance is determined as an optimum LVBC dot pattern.

Figure 31:
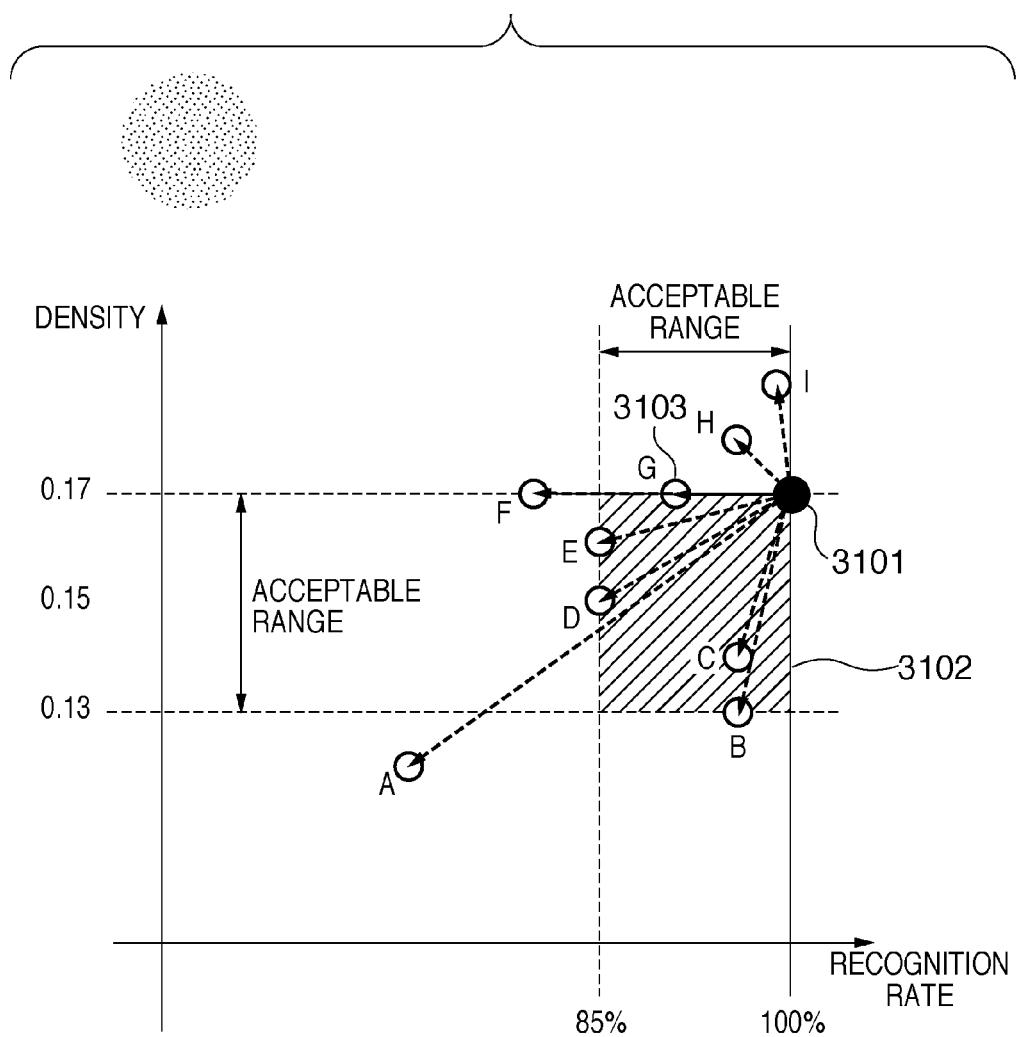
FIG. 31 is a conceptual view showing an optimum LVBC dot pattern selection operation in the recognition priority mode according to the fifth embodiment.

FIG. 31 is a conceptual view showing the operation in step S1107 of this embodiment. A position 3101 indicates the ideal value Target, an area 3102 indicates the reference range, and a position 3103 indicates the optimum LVBC dot pattern. Referring to FIG. 31, the LVBC dot pattern 404 generated based on a pattern G in the LVBC dot pattern test print shown in FIG. 4 is set as the optimum pattern.

<Small Dot Pattern Analysis and Profile Creation>

Small dot pattern analysis and profile creation are the same as in the first embodiment, and a description thereof will not be repeated.

The above-described operation allows the user to set different reference vales by switching between the image quality priority mode and the recognition priority mode as needed. It is possible to print an optimum copy-forgery-inhibited pattern attached LVBC pattern corresponding to the mode.

Sixth Embodiment

In the first to fifth embodiments, processes when the optimum dot pattern could be detected have been described. However, it is not always possible to detect an optimum dot pattern on a test print. In the sixth embodiment, a method of regenerating dot patterns on a test print when optimum dot pattern detection has failed will be explained. The same step numbers as in the first embodiment denote the same processes in the sixth embodiment, and a description of its outline will be omitted. If an LVBC dot pattern that satisfies the conditions of an optimum LVBC dot pattern cannot be detected in the first to fifth embodiments, LVBC dot patterns are regenerated according to the sixth embodiment. The regenerated LVBC dot patterns are printed as a test print, and the procedure of the first to fifth embodiments is repeated.

<LVBC Dot Pattern Regeneration>

Figure 32:
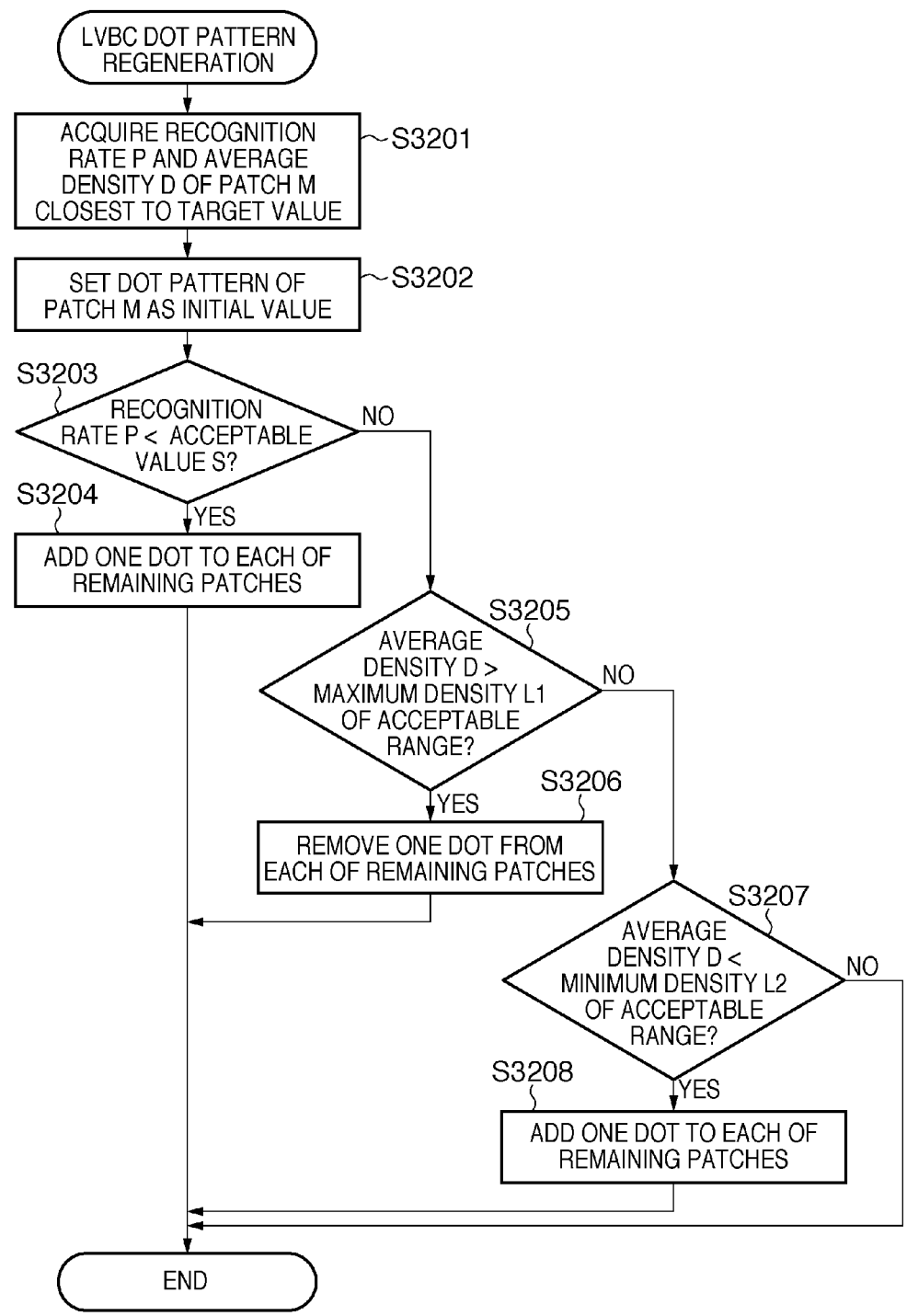
FIG. 32 is a flowchart for explaining an outline of an operation of executing LVBC dot pattern regeneration according to the sixth embodiment.

FIG. 32 is a flowchart for explaining an outline of an operation of executing LVBC dot pattern regeneration according to this embodiment. A control program to implement the processing in FIG. 32 is stored in a ROM 5103 and executed by a CPU 5101, as described above.

In step S3201, a closest patch M to a target value Target is decided in a test print of interest in which no optimum dot pattern can be detected, and a recognition rate P and an average density D of the closest patch M are acquired. The recognition rate P and average density D of each patch are obtained in accordance with the procedures in steps S1104 and S1105 of FIG. 11 described in the first embodiment. A patch having the shortest distance to the target value Target is determined as the closest patch M. The dot pattern of the closest patch M decided in step S3201 is set (stored) as an initial pattern (step S3202). The recognition rate P of the patch M is compared with an acceptable recognition rate S (also referred to as a reference recognition rate) (step S3203). In this embodiment, an example of a reference range includes a recognition rate of 85% to 100% and an average density of 0.13 to 0.17. The recognition rate and average density of each point are expressed by coordinates (recognition rate and average density). The reference range is defined by four points represented by $$(AreaA\_x, AreaA\_y) = (0.85, 0.17)$$

$$(AreaB\_x, AreaB\_y) = (0.85, 0.13)$$

$$(AreaC\_x, AreaC\_y) = (1.0, 0.13)$$

$$(AreaD\_x, AreaD\_y) = (1.0, 0.17)$$

The acceptable recognition rate S is the lowest recognition rate in the reference range and is therefore set at 85%. If it is determined in step S3203 that the recognition rate P of the patch M is lower than the acceptable recognition rate S, dot patterns are defined by adding one dot to each of the remaining dot patterns included in the test print of interest (step S3204). This is because the recognition rate of the patch M lowers due to the unstable or small dot shape of its dot pattern. The image data of the test print of interest is stored in the memory or the like. The process in step S3204 is performed for the image data.

If it is determined in step S3203 that the recognition rate P of the patch M is equal to or higher than the acceptable recognition rate S, the average density D of the patch M is compared with a maximum density L1 of the acceptable range (step S3205). The maximum density L1 of the acceptable range is the highest density in the reference range and is therefore set at 0.17 in the example of the embodiment. If it is determined in step S3205 that the average density D of the patch M is higher than the maximum density L1 of the acceptable range, dot patterns are defined by removing one dot from each of the remaining dot patterns (step S3206). This is because the density of the patch M rises due to its excessively large dot pattern.

If it is determined in step S3205 that the average density D of the patch M is equal to or lower than the maximum density L1 of the acceptable range, the average density D is compared with a maximum density L1 of the acceptable range (step S3207). If it is determined in step S3207 that the average density D of the patch M is lower than the minimum density L2 of the acceptable range, dot patterns are defined by adding one dot to each of the remaining dot patterns (step S3208). If it is determined in step S3207 that the average density D of the patch M is equal to or higher than the minimum density L2 of the acceptable range, the patch M itself exists in the reference range, and the processing ends.

Figure 33:
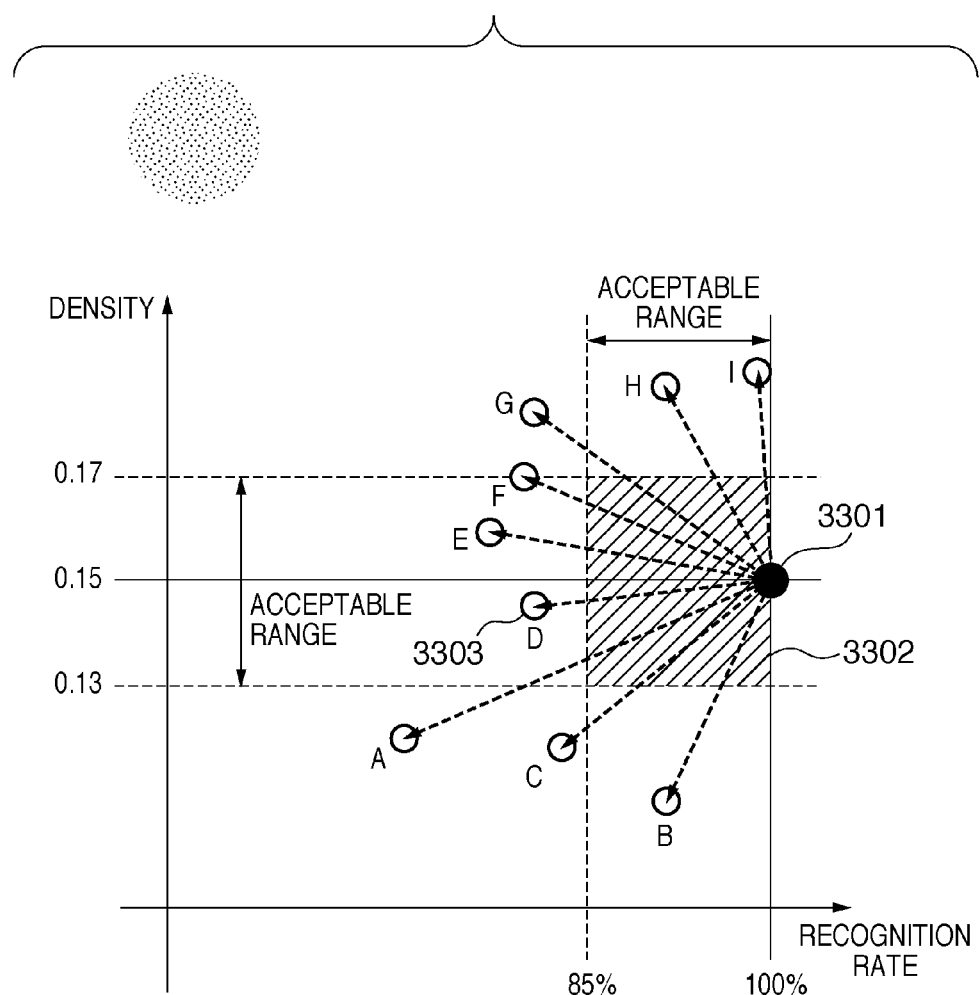
FIG. 33 is a conceptual view showing an initial LVBC dot pattern selection operation in step S3202 of FIG. 32.

FIG. 33 is a conceptual view showing the operation in step S3203 of this embodiment. A point 3301 indicates the ideal value Target, an area 3302 indicates the reference range, and a point 3303 indicates the closest LVBC dot pattern patch M. Referring to FIG. 33, a dot pattern D in an LVBC dot pattern test print shown in FIG. 4 is set as an initial closest pattern.

Figure 34:
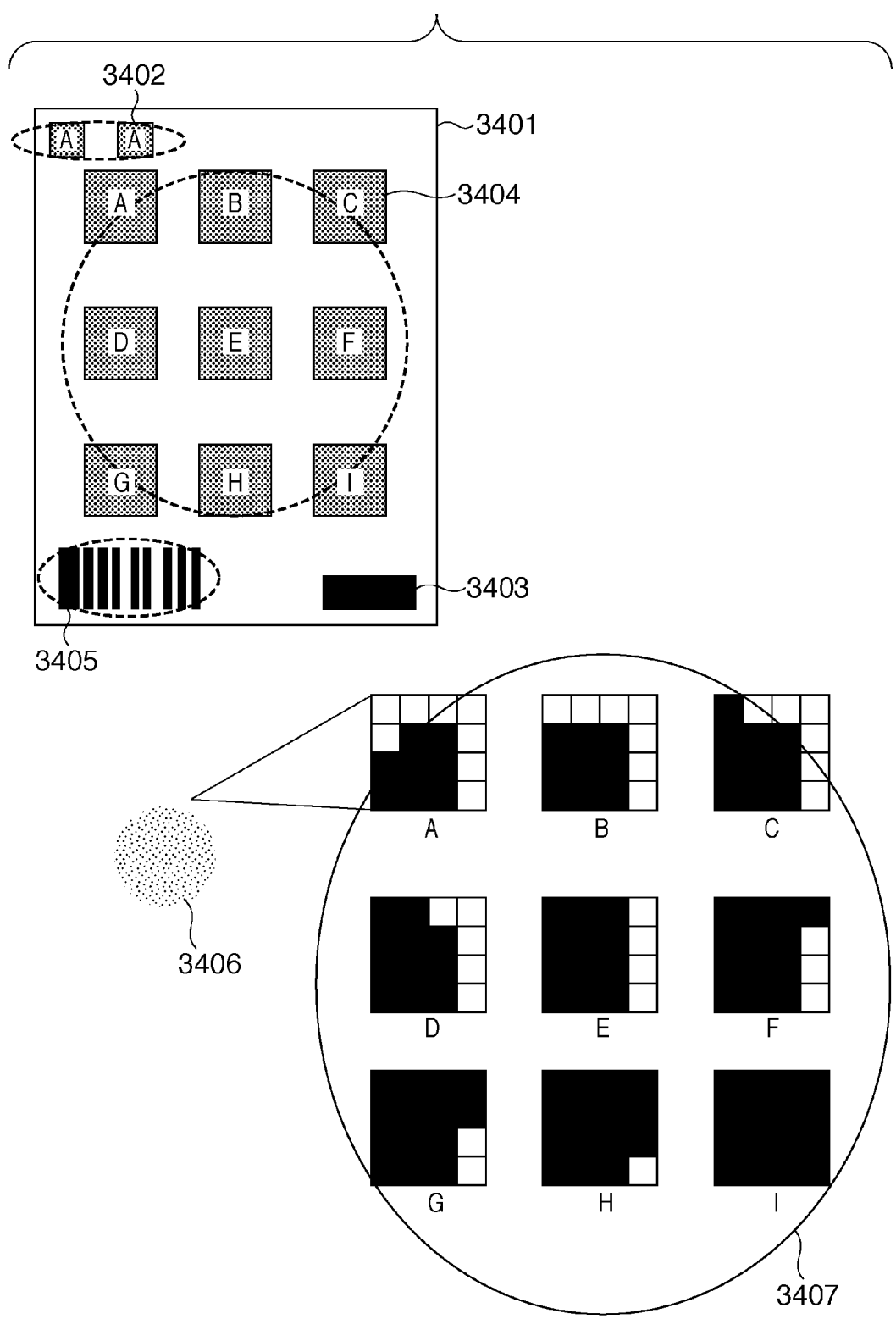
FIG. 34 is a view showing an example of an LVBC dot pattern test print regenerated in step S3204 of FIG. 32.

FIG. 34 shows an example of an LVBC dot pattern test print image regenerated by the operation in step S3204. The test print includes dot patterns A to I formed by adding four dots to each of corresponding patterns while setting the dot pattern D in FIG. 4 as the initial value.

Figure 35:
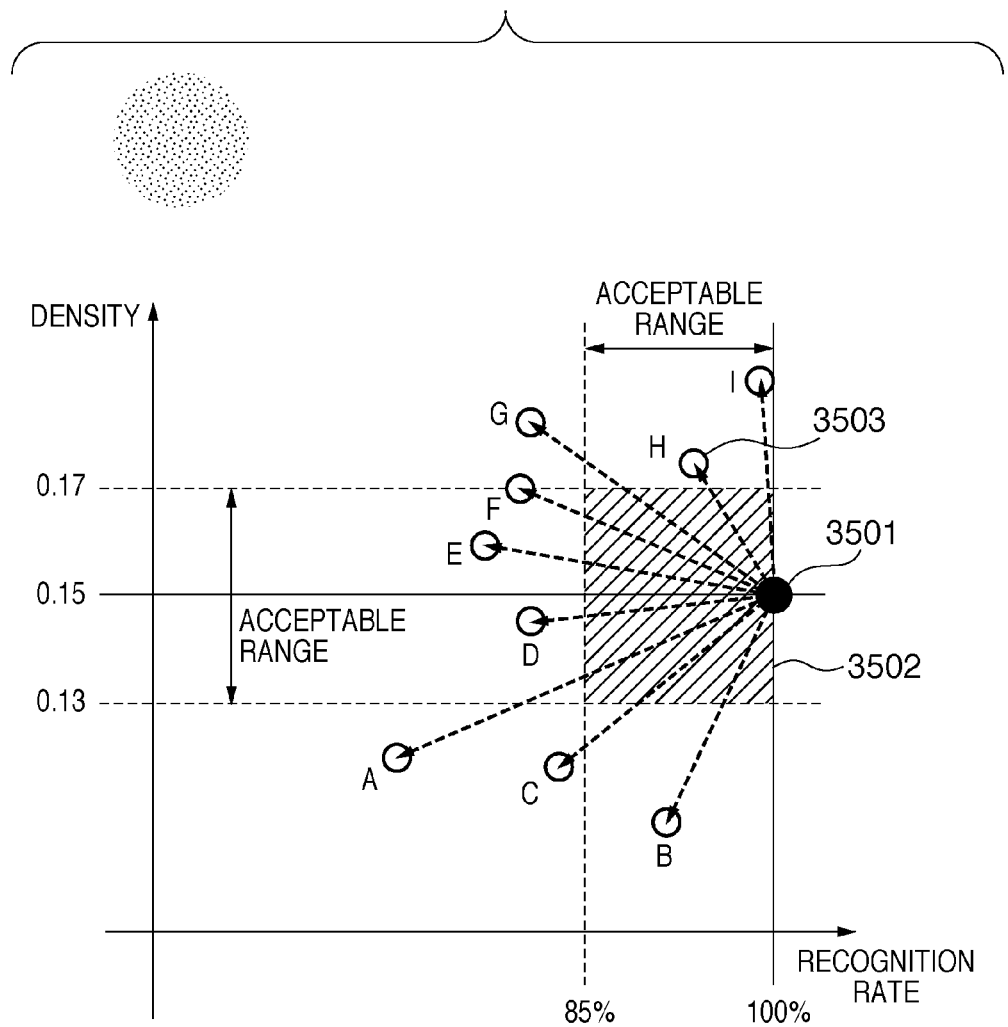
FIG. 35 is a conceptual view showing an initial LVBC dot pattern selection operation in step S3205 of FIG. 32.
Figure 36:
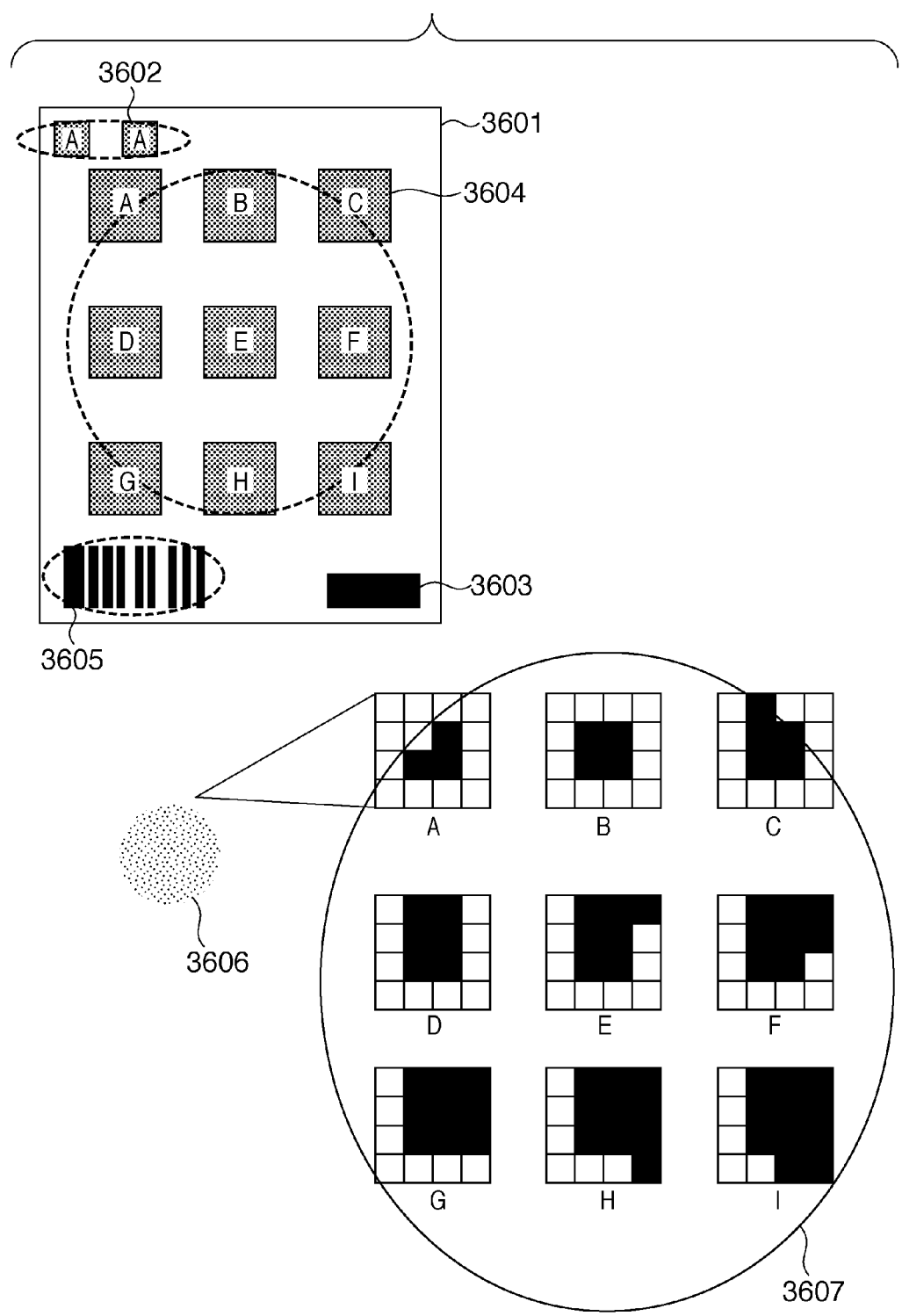
FIG. 36 is a view showing an example of an LVBC dot pattern test print regenerated in step S3206 of FIG. 32.

FIG. 35 is a conceptual view showing the operation in step S3205 of this embodiment. A position 3501 indicates the ideal value Target, an area 3502 indicates the reference range, and a position 3503 indicates the closest LVBC dot pattern patch M. Referring to FIG. 35, an LVBC dot pattern generated based on a pattern H in the LVBC dot pattern test print shown in FIG. 4 is set as an initial closest pattern. The pattern H undergoes the process in step S3206 because its density is determined in step S3205 to be higher than the reference value (maximum density L1 of the acceptable range). FIG. 36 shows an LVBC dot pattern test print image regenerated by the operation in step S3206. The test print includes dot patterns A to I formed by removing one dot from each of corresponding patterns while setting the dot pattern H in FIG. 4 as the initial value (i.e., closest pattern).

Figure 37:
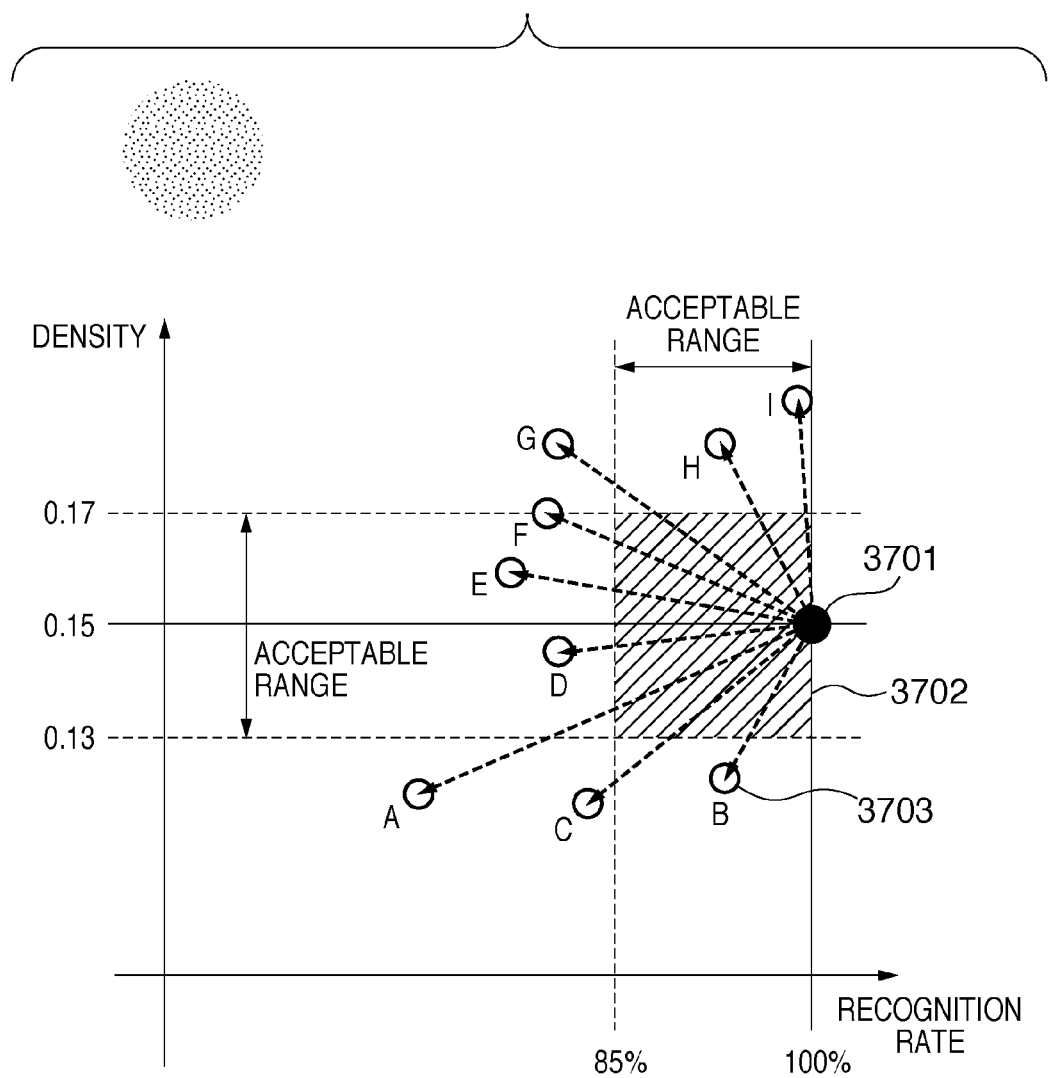
FIG. 37 is a conceptual view showing an initial LVBC dot pattern selection operation in step S3207 of FIG. 32.

FIG. 37 is a conceptual view showing the operation in step S3207 of this embodiment. A position 3701 indicates the ideal value Target, an area 3702 indicates the reference range, and a point 3703 indicates the closest LVBC dot pattern patch M. Referring to FIG. 37, an LVBC dot pattern 404 generated based on the pattern H in the LVBC dot pattern test print shown in FIG. 4 is set as an initial closest pattern. FIG. 38 shows an LVBC dot pattern test print image regenerated by the operation in step S3208. The test print includes dot patterns A to I formed by adding one dot to each of corresponding patterns while setting the dot pattern H in FIG. 4 as the initial value.

<Small Dot Pattern Regeneration>

Small dot pattern regeneration is the same as LVBC dot pattern regeneration except that the operations in steps S3203 and S3204 of FIG. 32 are omitted, and a description thereof will not be repeated.

Even when no optimum dot pattern can be detected on a test print, the above-described operation enable to set a closest dot pattern as an initial dot pattern and regenerate dot patterns on the test print in accordance with the state of the initial pattern.

Seventh Embodiment

In the first embodiment, the automatic copy-forgery-inhibited pattern attached LVBC pattern density setting processing is executed solely. The image forming apparatuses 4404 and 4405 have an automatic tone correction function (calibration) to reduce density variations caused by, for example, environment and endurance. When the automatic tone correction function is executed, the density is corrected. This may also affect the dot reproducibility of a copy-forgery-inhibited pattern attached LVBC pattern. In the seventh embodiment, a method of executing automatic copy-forgery-inhibited pattern attached LVBC pattern density setting processing simultaneously with execution of the automatic tone correction function will be described. The same step numbers as in the first embodiment denote the same processes in the seventh embodiment, and a description of its outline will be omitted.

Automatic Tone Correction Control>

Designation of automatic tone correction control will be described. An operator executes automatic tone correction processing in accordance with this window. First, the operator prints a test print 1 for automatic tone correction by pressing a test print 1 key. The operator places, on the document table, the printed test print 1 with its face down, and presses a reading start key. An image forming apparatus 4404 starts reading the document. When reading of the document of test print 1 has ended, a window to give the instruction to read a test print 2 is displayed. When the operator has performed the test print reading operation a predetermined number of times in accordance with the instruction, a window indicating that automatic tone correction processing is in progress is displayed, and the image data is held in a storage area of an output gamma correction unit 6113 in an output image processing unit 611.

When the operation has ended, an automatic copy-forgery-inhibited pattern attached LVBC pattern density setting operation window is displayed next. The series of processes in automatic copy-forgery-inhibited pattern attached LVBC pattern density setting described in the first embodiment is executed.

The above-described operation enables to follow density variations caused by, for example, environment and endurance by performing automatic copy-forgery-inhibited pattern attached LVBC pattern density setting processing at the timing of execution of the automatic tone correction function.

Other Embodiments

The present invention is also applicable to a system including a plurality of devices (e.g., computer, interface device, reader, and printer) or an apparatus (e.g., image forming apparatus, printer, or facsimile apparatus) including a single device.

The object of the present invention is achieved even by causing a computer or the like to read out, from a storage medium, program codes to implement the procedures of the flowcharts of the above-described embodiments and executes the program codes. In this case, the program codes read out from the storage medium implement the functions of the above-described embodiments by themselves. Hence, the program codes and the storage medium which stores them also constitute the present invention.

Examples of the storage medium usable to supply the program codes are a flexible disk, hard disk, optical disk, magnetooptical disk, CD-ROM, CD-R, magnetic tape, nonvolatile memory card, and ROM. The functions of the above-described embodiments are also implemented when the computer executes the readout program, and the OS running on the computer partially or wholly executes actual processing based on the instructions of the program.

The functions of the above-described embodiments are also implemented when the program read out from the storage medium is written in the memory of, for example, a function expansion board inserted into the computer, and the CPU of the function expansion board or the like executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-127377, filed May 14, 2008, which is hereby incorporated by reference herein in its entirety.

What is claimed is:

1. An image forming apparatus for generating a copy-forgery-inhibited pattern image which includes a latent image area drawn using a large dot pattern and a background area drawn using a small dot pattern, the latent image being encoded and embedded in the copy-forgery-inhibited pattern image as additional information, comprising:

a large dot pattern decision unit, configured to read a large dot test pattern image printed using a plurality of large dot test patterns, recognize encoded additional information embedded in each large dot test pattern by decoding the additional information, obtain a recognition rate of the additional information and an average density of each large dot test pattern, and select, as a large dot pattern for use in recording, a large dot pattern corresponding to a large dot test pattern whose recognition rate falls with a predetermined recognition rate range and is close to a predetermined recognition rate reference value and whose average density falls within a predetermined density range and is close to a predetermined density reference value;

a small dot pattern decision unit, configured to read a small dot test pattern image printed using a plurality of small dot test patterns, obtain an average density of each small dot test pattern, and select, as a small dot pattern for use in recording, a small dot pattern corresponding to a small dot test pattern whose average density falls within the predetermined density range and is close to the average density of the large dot pattern selected for use in recording; and a print image generator, configured to generate a copy-forgery-inhibited pattern image by drawing a foreground using the large dot pattern selected for use in recording by said large dot pattern decision unit, the foreground containing predetermined encoded additional information, and drawing a background using the small dot pattern selected for use in recording by said small dot pattern decision unit, and to combine the copy-forgery-inhibited pattern image with a print target image.

2. The apparatus according to claim 1, wherein
said small dot pattern decision unit comprises a selector, configured to receive selection of one of a mode which gives priority to image quality and a mode which gives priority to a detection rate, and
the large dot pattern and the small dot pattern are selected using different values within the predetermined ranges as the reference values in accordance with the selected mode.

3. The apparatus according to claim 2, wherein if said selector selects the mode which gives priority to image quality, the predetermined density reference value is set to a minimum density within the predetermined density range.

4. The apparatus according to claim 2, wherein if said selector selects the mode which gives priority to the detection rate, the predetermined recognition rate reference value is set to a maximum recognition rate within the predetermined recognition rate range.

5. The apparatus according to claim 1, wherein if a large dot pattern and/or a small dot pattern having values that fall within the respective predetermined ranges is not found, a size of the large dot pattern or the small dot pattern is changed, the test pattern image is regenerated and printed by printing means, and said large dot pattern decision unit and/or said small dot pattern decision unit attempts again to select the large dot pattern for use in recording or the small dot pattern for use in recording.

6. A dot pattern calibration method of calibrating a large dot pattern and a small dot pattern in an image forming apparatus for generating a copy-forgery-inhibited pattern image which includes a latent image area drawn using the large dot pattern and a background area drawn using the small dot pattern, the latent image being encoded and embedded in the copy-forgery-inhibited pattern image as additional information, comprising the steps of:

reading a large dot test pattern image printed using a plurality of large dot test patterns, recognizing encoded additional information embedded in each large dot test pattern by decoding the additional information, obtaining a recognition rate of the additional information and an average density of each large dot test pattern, and selecting, as a large dot pattern for use in recording, a large dot pattern corresponding to a large dot test pattern whose recognition rate falls within a predetermined recognition rate range and is close to a predetermined recognition rate reference value and whose average density falls within a predetermined density range and is close to a predetermined density reference value; and reading a small dot test pattern image printed using a plurality of small dot test patterns, obtaining an average density of each small dot test pattern, and selecting, as a small dot pattern for use in recording, a small dot pattern corresponding to a small dot test pattern whose average density falls within the predetermined density range and is close to the average density of the large dot pattern selected for use in recording.

7. A program stored in a non-transitory computer-readable storage medium to cause a computer to implement a method of calibrating a large dot pattern and a small dot pattern used in a copy-forgery-inhibited pattern image which includes a latent image area drawn using the large dot pattern and a background area drawn using the small dot pattern, the latent image being encoded and embedded in the copy-forgery-inhibited pattern image as additional information, the method comprising the steps of:

reading a large dot test pattern image printed using a plurality of large dot test patterns, recognizing encoded additional information embedded in each large dot test pattern by decoding the additional information, obtaining a recognition rate of the additional information and an average density of each large dot test pattern, and selecting, as a large dot pattern for ise in recording, a large dot pattern corresponding to a large dot test pattern whose recognition rate falls within a predetermined recognition rate range and is close to a predetermined recognition rate reference value and whose average density falls within a predetermined density range and is close to predetermined density reference value; and reading a small dot test pattern image printed using a plurality of small dot test patterns, obtaining an average density of each small dot test pattern, and selecting, as a small dot pattern for use in recording, a small dot pattern corresponding to a small dot test pattern whose average density falls within the predetermined density range and is close to the average density of the large dot pattern selected for use in recording.

* * * * *